(12) United States Patent  
Morimoto et al.

(10) Patent No.: US 8,204,476 B2
(45) Date of Patent: Jun. 19, 2012

(54) PORTABLE TELEPHONE AND ELECTRONIC DEVICE

(75) Inventors: Junji Morimoto, Saitama (JP); Kenji Shintani, Kanagawa (JP); Katsunori Ishii, Kanagawa (JP); Masashi Torimoto, Saitama (JP); Tsutomu Nagumo, Saitama (JP); Takashi Yamaguchi, Saitama (JP); Hidekazu Takahashi, Saitama (JP)

(73) Assignee: Sony Corporation, Tokyo (JP)

( * ) Notice: Subject to any disclaimer, the term of this patent is extended or adjusted under 35 U.S.C. 154(b) by 1488 days.

(21) Appl. No.: 11/690,551

(22) Filed: Mar. 23, 2007

(65) Prior Publication Data

US 2007/0223792 A1  Sep. 27, 2007

(30) Foreign Application Priority Data

Mar. 24, 2006  (JP) ................................ P2006-083905

(51) Int. Cl.
  H04M 1/66  (2006.01)
  H04M 1/68  (2006.01)
  H04M 3/16  (2006.01)
(52) U.S. Cl. ........ 455/411; 455/410; 382/115; 382/116; 382/124; 382/126
(58) Field of Classification Search ........................ None
  See application file for complete search history.

(56) References Cited

U.S. PATENT DOCUMENTS

| 7,606,400 B2 * | 10/2009 | Ryhanen et al. ............... 382/124 |
| 7,773,870 B2 * | 8/2010 | Naruse ............................. 396/15 |
| 2002/0083329 A1 * | 6/2002 | Kiyomoto ..................... 713/186 |
| 2003/0215117 A1 * | 11/2003 | Hata .............................. 382/124 |
| 2004/0184641 A1 | 9/2004 | Nagasaka et al. |
| 2004/0252867 A1 * | 12/2004 | Lan et al. ....................... 382/124 |
| 2005/0254690 A1 | 11/2005 | Nagasaka et al. |
| 2008/0007714 A1 * | 1/2008 | Kono et al. ...................... 356/71 |

FOREIGN PATENT DOCUMENTS

| JP | 07-021373 | 1/1995 |
| JP | 2004-265269 | 9/2004 |
| JP | 2004-290664 | 10/2004 |
| JP | 2005-312749 | 11/2005 |
| JP | 2006-011711 | 1/2006 |
| JP | 2007-215952 | 8/2007 |

OTHER PUBLICATIONS

Japanese Office Action for corresponding JP2006-083905 issued on Aug. 17, 2010.

* cited by examiner

*Primary Examiner* — Ajit Patel
(74) *Attorney, Agent, or Firm* — K&L Gates LLP

(57) ABSTRACT

A portable telephone and electronic device are provided. The portable telephone includes a casing having a first surface: a finger guide section that is provided in the first surface and guides a finger of a user to allow the finger to be placed so that a side portion of the finger faces the first surface; an illuminating section provided in the first surface so as to be adjacent to the finger guide section, the illuminating section being capable of radiating light of a predetermined wavelength that transmits through the placed finger; an imaging section provided in the casing so as to be spaced at a predetermined distance from the first surface with respect to a perpendicular direction, the imaging section being capable of imaging the light that has transmitted through the finger; and a control section that performs authentication of the user on the basis of an image obtained by the imaging.

31 Claims, 58 Drawing Sheets

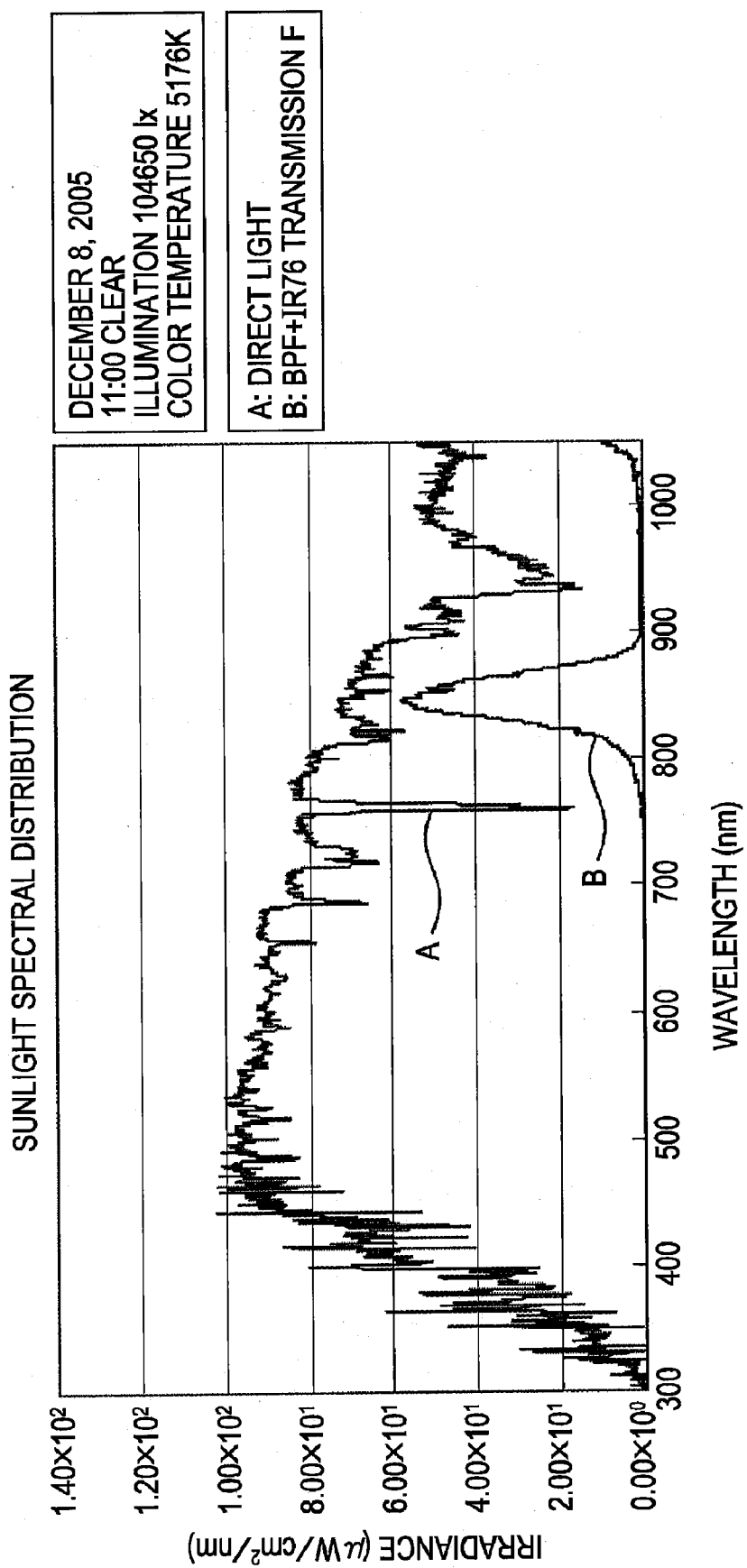

FIG. 28A
FIG. 28B
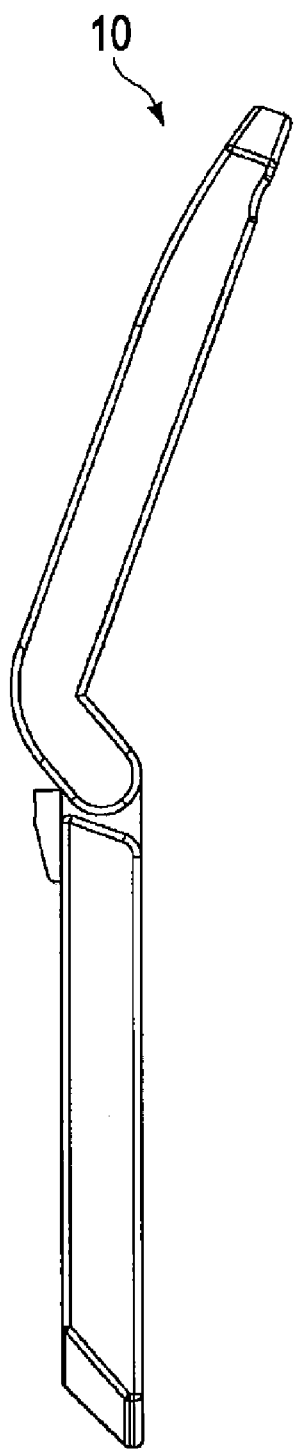
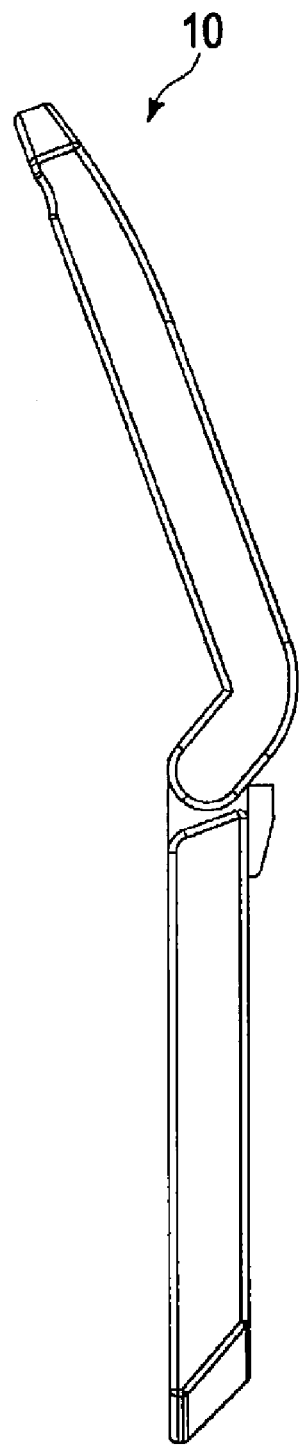

FIG. 33A
FIG. 33B
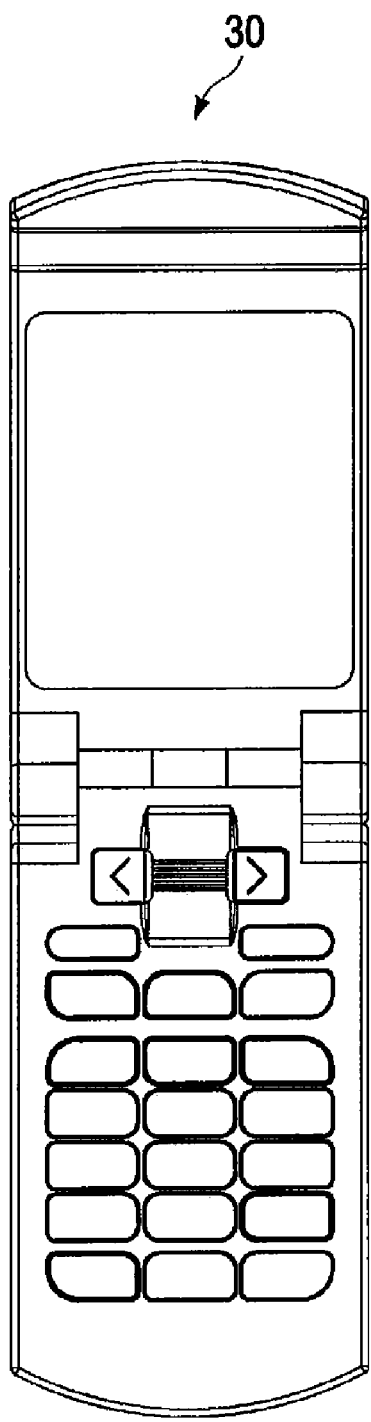
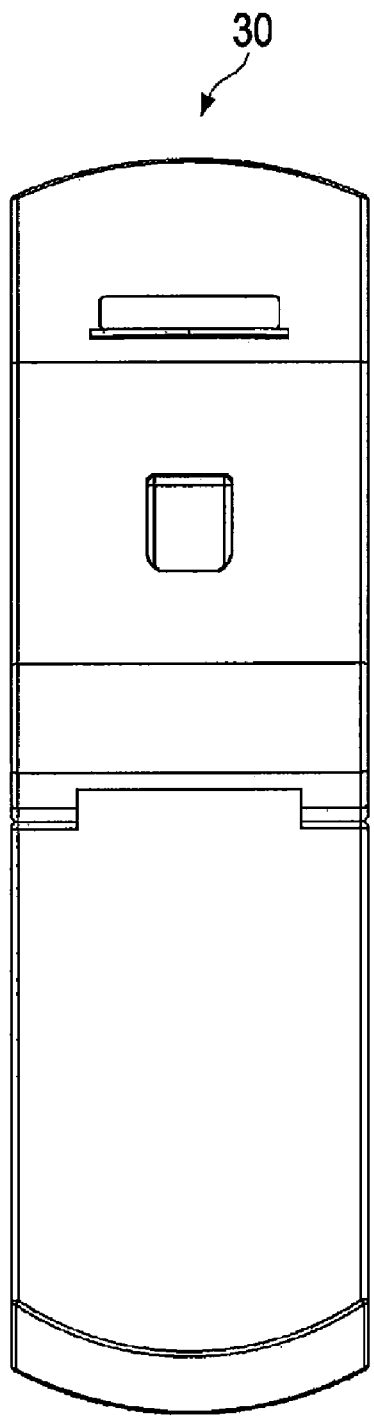

FIG. 36A
FIG. 36B
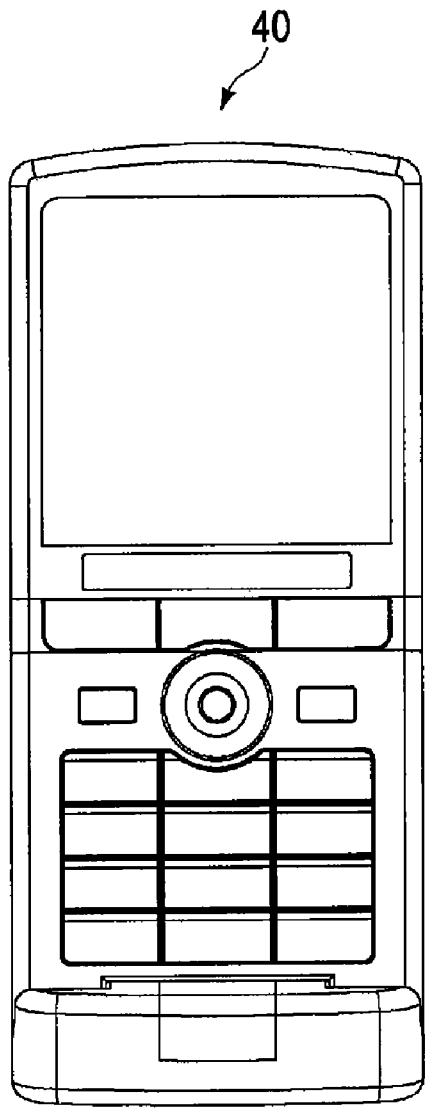
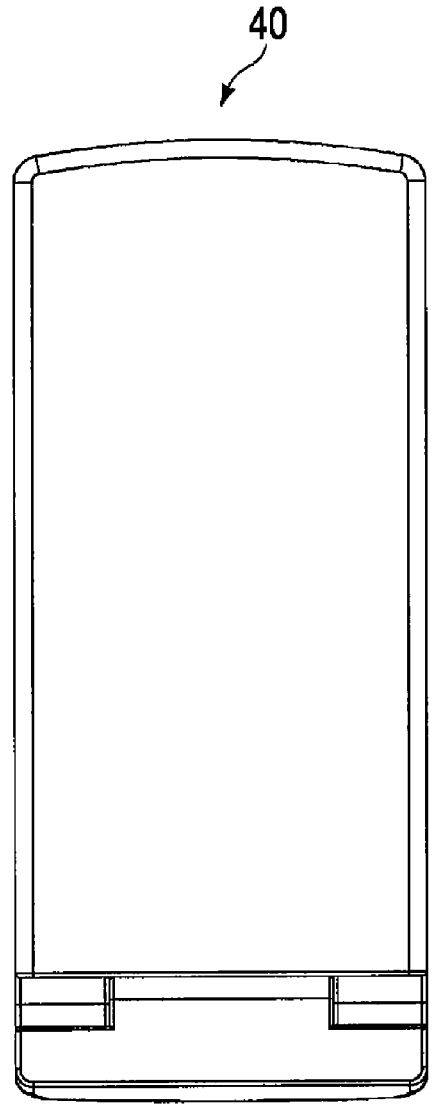

FIG. 40A
FIG. 40B
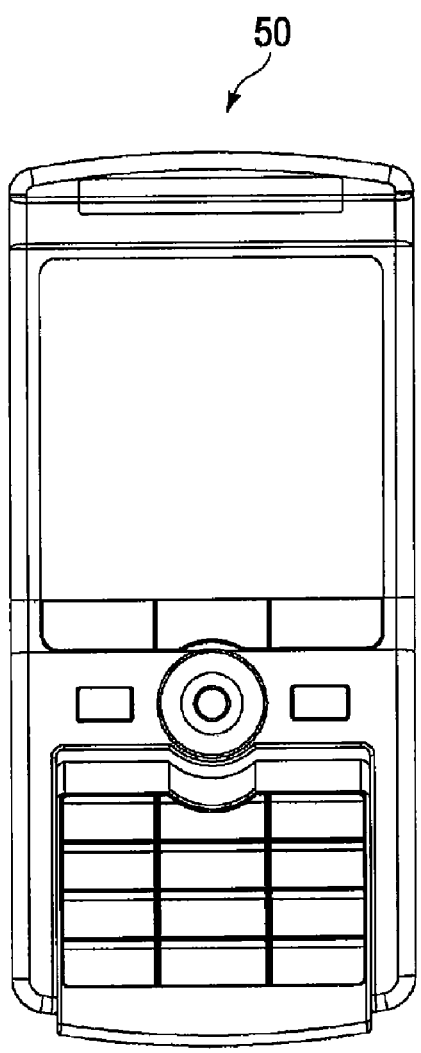
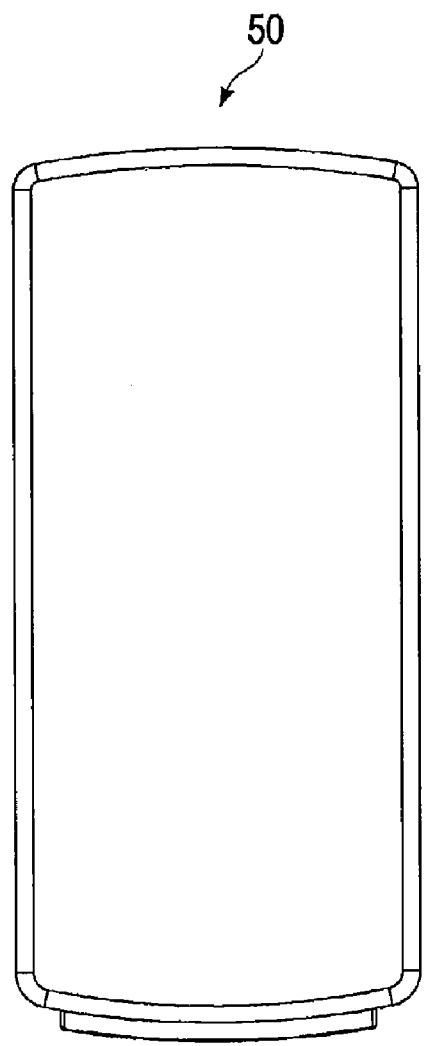

FIG. 43A
FIG. 43B
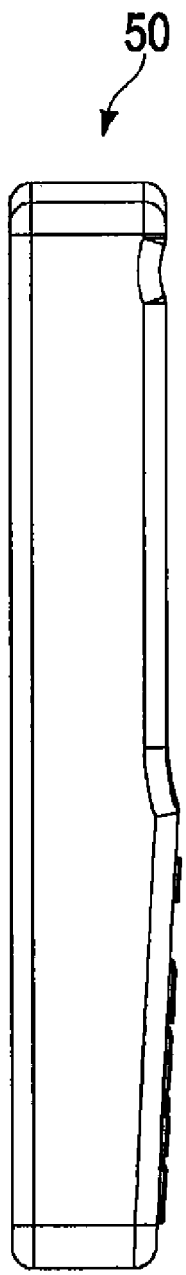

FIG. 44A
FIG. 44B
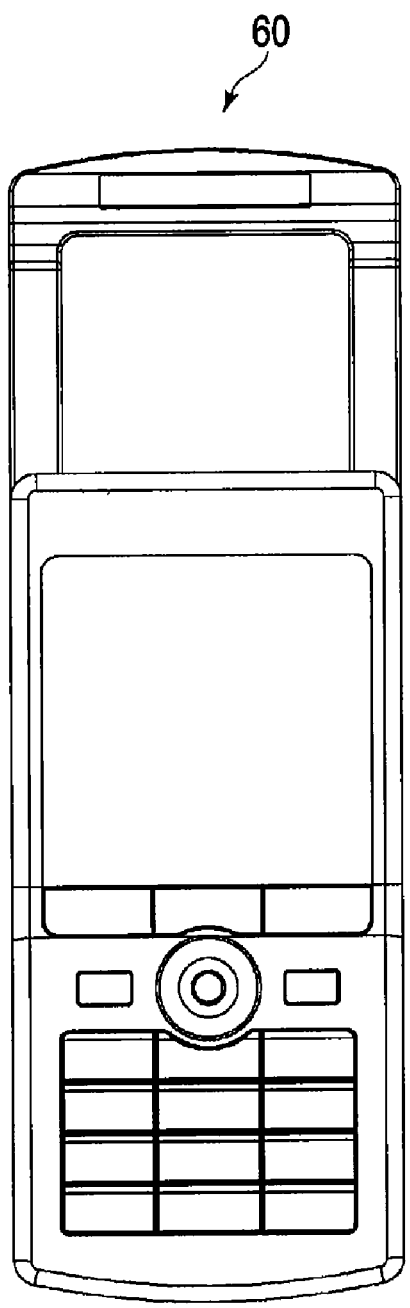
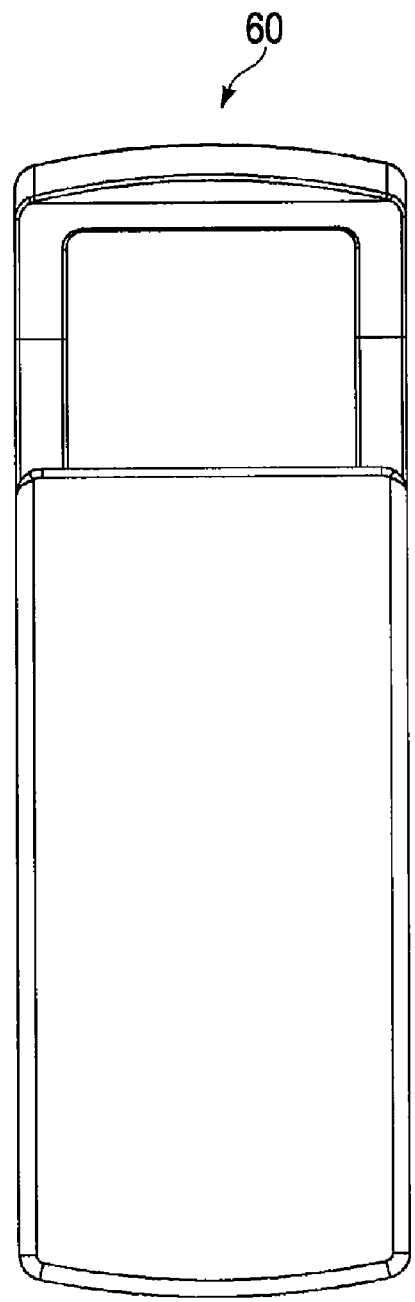

FIG. 48A
FIG. 48B
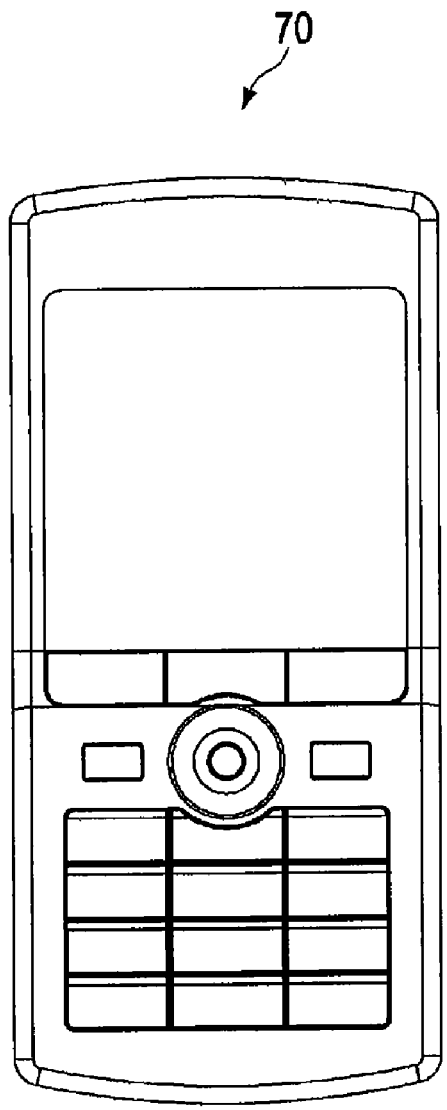
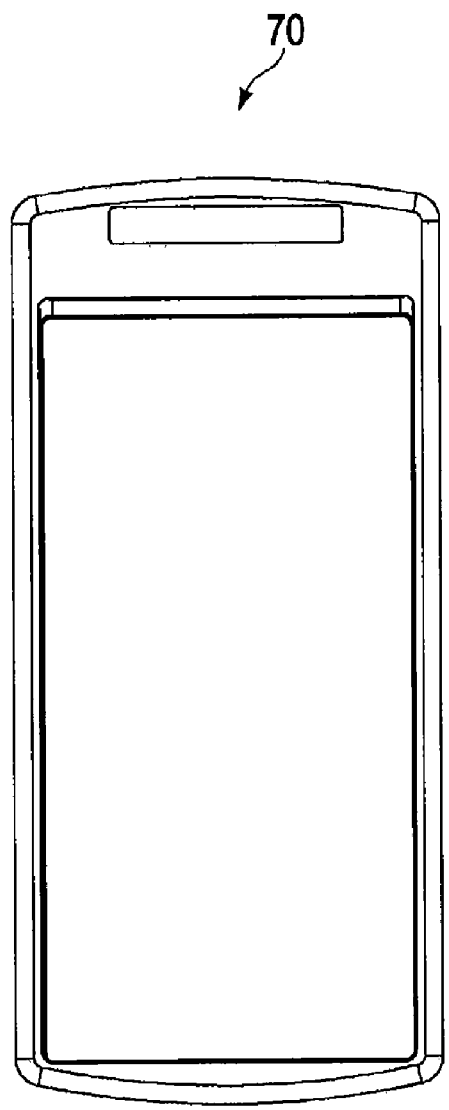

FIG. 49A
FIG. 49B
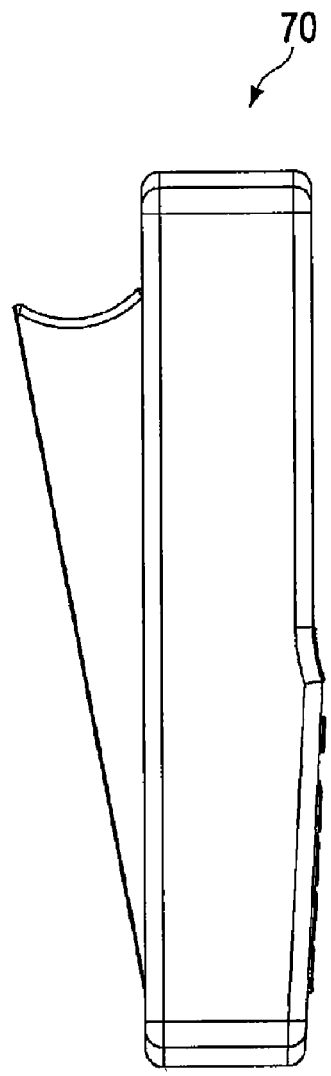
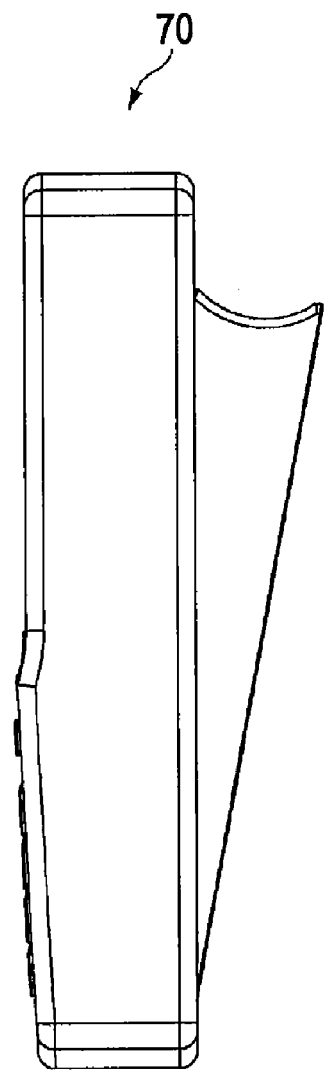

70

70

FIG. 55A
FIG. 55B
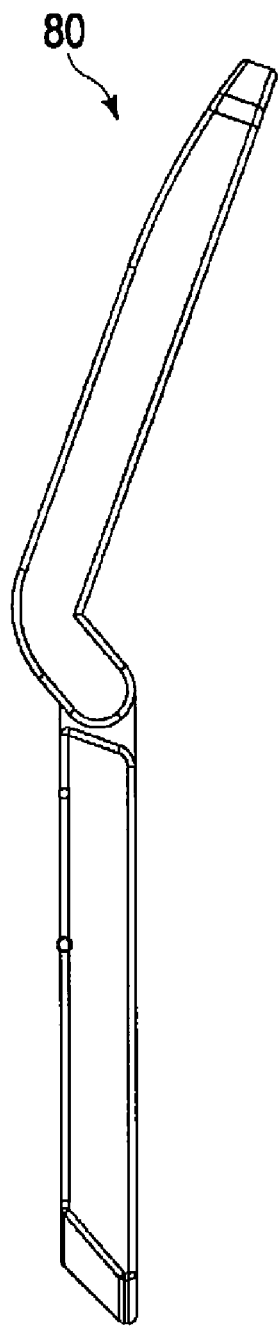
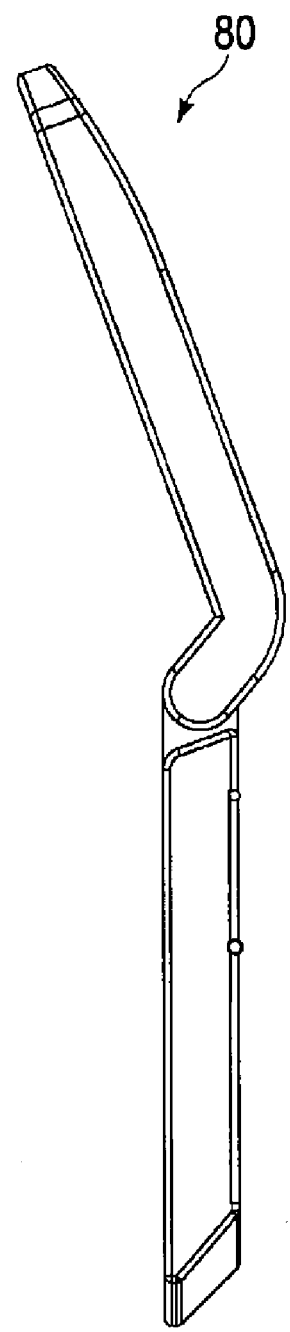

FIG. 56A
FIG. 56B
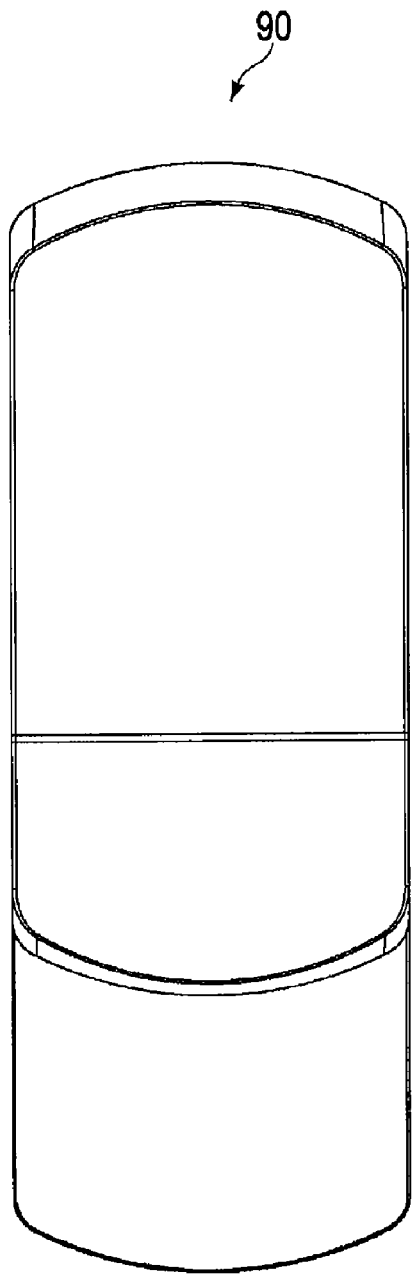
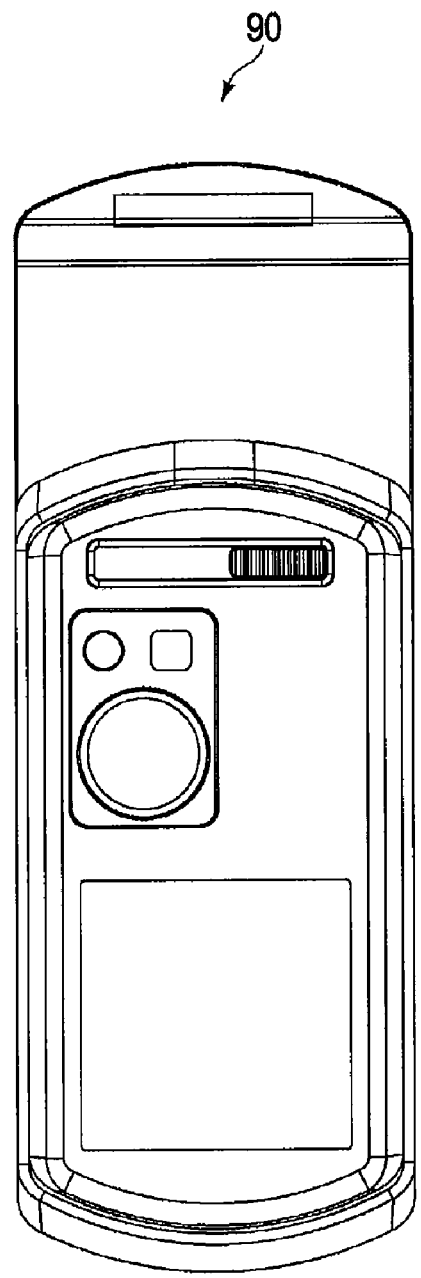

FIG. 59A
FIG. 59B
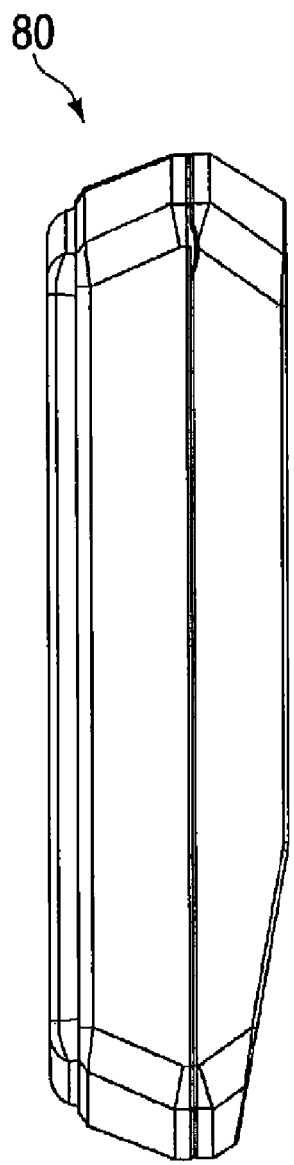
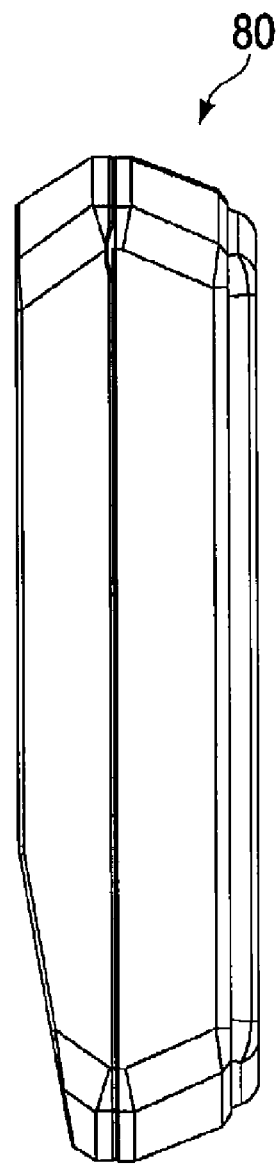

PORTABLE TELEPHONE AND ELECTRONIC DEVICE

CROSS REFERENCES TO RELATED APPLICATIONS

The present application claims priority to Japanese Patent Application JP 2006-6083905 filed in the Japanese Patent Office on Mar. 24, 2006, the entire contents of which are incorporated herein by reference.

BACKGROUND

The present application relates to a portable telephone and an electronic device that allow an individual to be authenticated by the vein pattern of a finger.

In recent years, as an authentication technique for performing authentication of an individual, much attention is being given to biometric authentication using biometric information. Among various types of such biometric authentication, in particular, authentication utilizing the vein pattern of a finger (hereinafter, referred to as the finger vein authentication) features low psychological resistance of the user in comparison to fingerprint authentication which is also used in criminal investigations and the like, and superior anti-forgery property due to the use of information not on the surface of but internal to the living body.

In finger vein authentication, by taking advantage of the characteristic of haemoglobin in the blood absorbing infrared light, infrared light is radiated from an illuminating section to a finger, and the palm portion of the finger is imaged by an image sensor section, thus making it possible to capture a vein pattern in which only the vein portion of the finger becomes a shadow. This pattern is subjected to image processing and registered as appropriate data for use in authentication. By finding the correlation between this pattern and the finger vein pattern obtained at the time of authentication, it is determined whether or not the vein pattern in question is that of a registered user, thereby performing authentication of an individual.

As an example of an individual authentication apparatus using the above-mentioned finger vein authentication technique, Japanese Unexamined Patent Application Publication No. 2004-265269 (paragraphs [0010], [0036], FIG. 1, FIG. 15, and the like) describes an apparatus having a light source provided in a horizontal or obliquely horizontal direction with respect to the imaging surface of a finger.

Further, Japanese Unexamined Patent Application Publication No. 2006-11711 (paragraphs [0040], [0047], FIG. 10, and the like) describes an authentication apparatus including photographing means provided on the inner side of the display surface of liquid crystal display means, and photographing auxiliary light emitting means provided so as to radiate photographing auxiliary light from further inside of the photographing means toward the outside of the display surface of the liquid crystal display means. In the authentication apparatus, when a predetermined pressing force is applied to the liquid crystal display means, the liquid crystal display means is shifted to a transmissive display, and photographing auxiliary light is lit, followed by photography by the photographing means, thereby obtaining an image pattern of a finger vein or the like to perform authentication.

According to Japanese Unexamined Patent Application Publication No. 2004-265269 mentioned above, the finger is imaged by placing the palm portion of the finger so as to face the casing. Accordingly, it is necessary to provide the imaging camera in a substantially perpendicular direction with respect to the palm portion, and since the light source is provided in the horizontal direction thereof, the casing is enlarged in size, making it difficult to mount the casing to a portable device such as a portable telephone. Further, although the publication also describes the use of a mirror to achieve downsizing, this leads to a narrow imaging range, resulting in poor authentication accuracy. Furthermore, in the case of a device used under an environment where it is exposed to external light such as sunlight or the like, the camera is susceptible to the influence of the external light, making it difficult to perform authentication in a proper manner.

On the other hand, according to Japanese Unexamined Patent Application Publication No. 2006-11711 mentioned above, the photographing means and the photographing auxiliary light radiating means are arranged side by side in a direction perpendicular to the liquid crystal display means, thereby realizing authentication in, for example, a so-called folding type portable telephone. Further, the photographing means is provided in the inner portion of the casing, thereby allowing usage under an environment involving exposure to external light.

However, this construction does not allow a sufficient focal length to be secured between the photographing means and the finger, so the imaging range inevitably becomes narrow, resulting in poor authentication accuracy. Further, the liquid crystal display means used is a so-called sub liquid crystal display of a folding type portable telephone, which means that this construction is not applicable to a portable terminal having only a main liquid crystal display.

SUMMARY

It is thus desirable to provide a portable telephone and a portable electronic device which allow finger vein authentication of high accuracy to be performed irrespective of the configuration of the casing, or the presence/absence and layout of mounted parts.

According to an embodiment, there is provided a portable telephone including: a casing having a first surface: a finger guide section that is provided in the first surface and guides a finger of a user to allow the finger to be placed so that a side portion of the finger faces the first surface; an illuminating section provided in the first surface so as to be adjacent to the finger guide section, the illuminating section being capable of radiating light of a predetermined wavelength that transmits through the placed finger; an imaging section provided in the casing so as to be spaced at a predetermined distance from the first surface with respect to a perpendicular direction, the imaging section being capable of imaging the light that has transmitted through the finger; and a control section that performs authentication of the user on the basis of an image obtained by the imaging.

In this case, the above-mentioned light of the predetermined wavelength refers to infrared light having a wavelength of, for example, about 600 to 980 nm. Further, the finger guide section has, for example, a concave portion or a convex portion and serves to indicate the use the finger placement position and direction. Further, the predetermined distance refers to a distance of, for example, about 0 to 1 cm. The above-mentioned control section performs authentication on the basis of the vein pattern of the user's finger within the above-mentioned image, for example. It should be noted that while the portable telephone used is of a so-called straight (stick) type, for example, other types of portable telephone may be used, such as a so-called folding type one in which the above-mentioned casing and another casing are pivotably coupled to each other via a hinge section, a so-called slide type one in which the above-mentioned casing and another casing are slidably coupled to each other, and a so-called rotary open type one in which the above-mentioned casing and another casing are coupled to each other so as to be pivotable about an axis perpendicular to the above-mentioned first surface.

According to the configuration as described above, a user's finger is placed such that the side portion of the finger faces the first surface, and is imaged by the imaging section provided at the predetermined distance from the first surface while radiating light to the side portion of the finger from the illuminating section. The imaging section thus images the palm portion of the finger in a direction along the first surface. Accordingly, as compared with the case where the palm portion of the finger is placed so as to face the first surface and imaged from a direction perpendicular to the first surface, the imaging range can be broadened without requiring a large space with respect to the above-mentioned perpendicular direction. Accordingly, finger vein authentication of high accuracy can be performed in accordance with any type of portable telephone while making effective use of a limited space.

The above-mentioned portable telephone may be configured such that the imaging section is provided so that when in a non-imaging state of not imaging the light, the imaging section is located on an inner side of the casing with respect to the first surface, and when in an imaging state of performing the imaging, the imaging section can be projected to a position spaced at the first distance from the first surface.

Accordingly, by allowing the imaging section to project at the time of imaging, it is possible to enhance the portability of the portable telephone by reducing the width in the above-mentioned perpendicular direction of the casing in the non-imaging state.

The above-mentioned portable telephone may further include a retaining block that is provided at a longitudinal end portion of the casing and retains the imaging section, the retaining block being configured to form a part of the first surface in the non-imaging state and to pivot about a lateral or longitudinal axis of the first surface in the imaging state to allow the imaging section to project.

Accordingly, by making the imaging section be retained by the retaining block pivotably provided at an end portion of the casing, the imaging section can be projected from the first surface at the time of imaging to enable imaging.

The above-mentioned portable telephone may be configured such that the portable telephone further includes a display section and an operating section that are provided in the first surface, and the finger guide section and the illuminating section are provided between the operating section and the display section.

Accordingly, by making efficient use of the space between the display section and the operating section, the finger guide section and the illuminating section can be placed to perform authentication.

The above-mentioned portable telephone may be configured such that the operating section has an operation-key block that retains the imaging section and includes a plurality of key groups arrayed in a surface that forms a part of the first surface in the non-imaging state, the operation-key block being provided so that the operation-key block can be projected to expose the image section by pivoting about a lateral axis of the casing in the imaging state.

Accordingly, by forming a part of the operating section as an operation-key block to be built in the imaging section, and allowing the operating key block to project from the first surface, it is possible to secure the installation space for the imaging section.

The above-mentioned portable telephone may be configured such that the portable telephone further includes: a display section and an operating section that are provided in a second surface opposed to the first surface; and a retaining block provided in the first surface so that one end of the retaining block is capable of pivotal movement about a lateral axis of the first surface, the retaining block retaining the imaging section and provided so that in the imaging state, the other end of the retaining block can be projected and exposed from the first surface through the pivotal movement, and that the finger guide section is provided at the other end.

Accordingly, the imaging section can be installed irrespective of the installation positions of the display section and operating section. Further, since the finger guide section is provided at the other end of the retaining block, the finger guide section can be accommodated into the casing in the non-imaging state to thereby maintain the aesthetic appearance of the casing.

The above-mentioned portable telephone may be configured such that: the portable telephone further includes a display section and an operating section that are provided in a second surface opposed to the first surface; the finger guide section has a projection member that becomes integral with the first surface in the non-imaging state and can be projected from the first surface in the imaging state, the projection member having a first plate having a first one end and a first other end, and a second plate having a second one end and a second other end, the first one end being connected to the first surface so as to be capable of pivotal movement about the lateral axis, the first other end and the second one end being coupled to each other so as to be capable of pivotal movement about the lateral axis, the second other end being capable of sliding in the longitudinal direction on the first surface in accordance with the pivotal movement; and the imaging section is provided integrally on a back surface of the first plate of the projection member and near the first one end so that the imaging section can be projected from the first surface as the projection member is projected.

Accordingly, in the non-imaging state, both the finger guide section and the imaging section can be accommodated into the inner side of the casing with respect to the above-mentioned first surface to thereby achieve improved portability, and in the imaging state, the projecting operation of the finger guide section and the projecting operation of the imaging section are performed in synchronization with each other, thus enabling smooth authentication processing. It should be noted that the portable telephone may include a tension member that supports the above-mentioned second plate when the above-mentioned projection member is projected.

The above-mentioned portable telephone may be configured such that the casing has a display section provided in the first surface, and that the finger guide section and the illuminating section, and the imaging section are provided in the first surface so as to be opposed to each other with the display section therebetween.

Accordingly, since the finger guide section and the illuminating section, and the imaging section are provided so as to sandwich the display section therebetween, a distance that provides a sufficient imaging range is secured between the finger placed on the finger guide section and the imaging section, thereby making it possible to perform high accuracy authentication.

The above-mentioned portable telephone may be configured such that the control section controls the display section to display information relating to a method of placing the finger and an authentication procedure.

Accordingly, by notifying the user of the finger placement method and authentication procedure, the operability for the user is improved, thereby allowing smooth authentication.

The above-mentioned portable telephone may be configured such that the finger guide section is provided so as to project from the first surface toward the imaging section with respect to the illuminating section.

Accordingly, it is possible to prevent light radiated from the illuminating section from leaking through a gap between the finger and the casing to adversely affect the optical system of the imaging section, thereby allowing the vein pattern of the finger to be reliably imaged to ensure reliable authentication.

The above-mentioned portable telephone may be configured such that the imaging section has a first filter that can transmit only the light of the predetermined wavelength.

Accordingly, even under an environment exposed to external light such as sunlight as in the outdoors or the like, external light entering the imaging section is shielded by the first filter to reliably image the vein pattern of the finger, thereby making it possible to prevent erroneous authentication to perform authentication with reliability. Further, it is also possible to prevent the influence of reflected external light from being exerted on the finger surface in situations such as when external light hits the fingerprint on the surface of the finger and scatters. It should be noted that the first filter is made of, for example, glass or resin.

The above-mentioned portable telephone may be configured such that the imaging section has a second filter that can absorb visible light.

Accordingly, even the external light that cannot be completely shielded by the above-mentioned first filter is reliably shielded, thereby allowing the finger vein pattern to be imaged more reliably.

The above-mentioned portable telephone may be configured such that the illuminating section has a lens that can adjust directivity of the radiated light.

Accordingly, it is possible to prevent noise from being introduced into the captured image as light radiated from the illuminating section directly enters the imaging section. It should be noted that examples of the above-mentioned lens include a cylindrical lens, a Fresnel lens, and an anamorphic lens.

The above-mentioned portable telephone may be configured such that the lens forms at least a part of the finger guide section.

Accordingly, since the above-mentioned lens also serves as at least a part of the finger guide section, it is possible to guide the finger to the placement position while simultaneously preventing noise from being introduced into the captured image. Further, light can be reliably radiated to the side portion of the finger. For example, the convex or concave portion of the lens exposed from the first surface may be used as the finger guide section.

According to another embodiment, there is provided a portable telephone including: a first casing having a first inner surface and a first outer surface opposed to the first inner surface; a second casing having a second inner surface and a second outer surface opposed to the second inner surface; a hinge section that pivotably couples the first casing and the second casing to each other so that the first casing and the second casing can be folded open and closed in half; a finger guide section that is provided in the first inner surface or the second inner surface and guides a finger of a user to allow the finger to be placed so that a side portion of the finger faces the first inner surface; an illuminating section provided in the first inner surface or the second inner surface so as to be adjacent to the finger guide section, the illuminating section being capable of radiating light that transmits through the placed finger; an imaging section provided in the hinge section and capable of imaging the light that has transmitted through the finger; and a control section that performs authentication of the user on the basis of an image obtained by the imaging.

In this case, the light of the predetermined wavelength refers to infrared light having a wavelength of, for example, about 600 to 980 nm. Further, the finger guide section has, for example, a concave portion or convex portion and serves to indicate the use the finger placement position and direction. Further, the predetermined distance refers to a distance of, for example, about 0 to 1 cm. The above-mentioned control section performs authentication on the basis of the vein pattern of the user's finger within the above-mentioned image, for example. It should be noted that the portable telephone used is a so-called folding type one.

According to the configuration as described above, a user's finger is placed such that the side portion of the finger faces the first surface, and is imaged by the imaging section provided in the hinge section while radiating light to the side portion of the finger from the illuminating section. The imaging section thus images the palm portion of the finger in a direction along the first surface. Accordingly, as compared with the case where the palm portion of the finger is placed so as to face the first surface and imaged from a direction perpendicular to the first surface, the imaging range can be broadened without requiring a large space with respect to the above-mentioned perpendicular direction. Accordingly, finger vein authentication of high accuracy can be performed while making effective use of a limited space.

The above-mentioned portable telephone may be configured such that the first casing has a first display section provided in the first inner surface, the second casing has an operating section provided in the second inner surface, and the finger guide section and the illuminating section are provided in the first inner surface so as to be opposed to the imaging section with the first display section therebetween.

Accordingly, by utilizing the space where the display section is provided in the first inner surface, a distance that provides a sufficient imaging range is secured between the finger placed on the finger guide section and the imaging section, thereby making it possible to perform high accuracy authentication.

The above-mentioned portable telephone may be configured such that in a state where the first casing is open, the control section controls the first display section to display information relating to a method of placing the finger and an authentication procedure.

Accordingly, in the state where the first casing is open, the user is notified of the finger placement method and authentication procedure by the first display section, thereby allowing the user to smoothly perform authentication while looking at the displayed contents.

The above-mentioned portable telephone may be configured such that the first display section has a liquid crystal panel, and a protective plate that covers the liquid crystal panel and whose end face is processed so as to be capable of shielding the light.

Accordingly, since radiated light is first made incident on the protective plate and enters the imaging section via the protective plate, it is possible to prevent noise from being introduced into the captured image. Examples of processing represented by the expression "processed so as to be capable of shielding the light" include coating of a light-shielding material and affixing of a light-shielding tape.

The above-mentioned portable telephone may be configured such that the first casing has a second display section provided in the first outer surface, and the control section controls the second display section to display information relating to a method of placing the finger and an authentication procedure.

As opposed to the above-mentioned first display section that functions as a main display, the second display section functions as a so-called sub display. Accordingly, the user is notified of the finger placement method and authentication procedure not only by the first display section but also by the second display section, thereby allowing smooth authentication. Further, when the user places a finger on the finger guide section in the first inner surface while looking at the second display section in the first outer surface, external light such as sunlight entering the imaging section is shielded by the first casing, thereby making it possible to perform authentication with reliability by reliably imaging the vein pattern of the finger free from the influence of external light.

The above-mentioned portable telephone may be configured such that the first casing has a first display section provided in the first inner surface, the second casing has an operating section provided in the second inner surface, and the finger guide section and the illuminating section are provided in the second inner surface so as to be opposed to the imaging section with the operating section therebetween.

Accordingly, by utilizing the space where the operating section is provided in the second inner surface, a distance that provides a sufficient imaging range is secured between the finger placed on the finger guide section and the imaging section provided in the hinge section, thereby making it possible to perform high accuracy authentication.

The above-mentioned portable telephone may be configured such that the imaging section is provided so as to be capable of pivotal movement in accordance with pivotal movement of the first or second casing.

Accordingly, the imaging section can image the finger for authentication in accordance with both the open and closed states of the first or second casing.

The above-mentioned portable telephone may be configured such that the hinge section has a locking member for temporarily locking the pivotal movement in a state where the first casing is closed by a predetermined angle so that the first inner surface contacts the placed finger.

Accordingly, due to the provision of the locking member mentioned above, it is not necessary for the user to hold the first casing in the state where it is closed by a predetermined angle (in a so-called half-open state), thereby allowing authentication to be performed easily. It should be noted that the predetermined distance refers to such an angle that allows the side portion of the user's finger to be sandwiched between the first casing and the second casing, that is, for example, an angle that makes the angle formed between the first inner surface and the second inner surface be about 10 to 15 degrees. However, the predetermined angle is not limited to one within this range.

The above-mentioned portable telephone may be configured such that the first casing has a skirt section provided in each of side surfaces in a lateral direction of the first inner surface so as to project in a substantially perpendicular direction from the first inner surface.

Accordingly, due to the provision of the shirt section, external light entering from the side surfaces of the first casing and second casing can be shielded, thereby making it possible to perform authentication with reliability by reliably imaging the vein pattern of the finger free from the influence of external light.

The above-mentioned portable telephone may be configured such that the imaging section has a first filter that can transmit only the light of the predetermined wavelength.

Accordingly, since external light entering the imaging section can be shielded by the first filter, the vein pattern of the finger can be imaged reliably and hence authentication can be performed reliably. Further, it is also possible to prevent the influence of reflected external light from being exerted on the finger surface.

The above-mentioned portable telephone may be configured such that the imaging section has a second filter that can absorb visible light.

Accordingly, the external light that cannot be completely shielded by the above-mentioned first filter can be shielded, thereby making it possible to image the vein pattern of the finger more reliably.

The above-mentioned portable telephone may be configured such that the illuminating section has a lens that can adjust directivity of the radiated light.

Accordingly, it is possible to prevent noise from being introduced into the captured image as light radiated from the illuminating section directly enters the imaging section.

The above-mentioned portable telephone may be configured such that the lens forms at least a part of the finger guide section.

Accordingly, since the above-mentioned lens also serves as at least a part of the finger guide section, it is possible to guide the finger to the placement position while simultaneously preventing noise from being introduced into the captured image. Further, light can be reliably radiated to the side portion of the finger.

According to still another embodiment, there is provided a portable telephone including: a first casing having a first inner surface having a first display section, and a first outer surface having a second display section and opposed to the first inner surface; a second casing having a second inner surface having an operating section, and a second outer surface opposed to the second inner surface; a hinge section that pivotably couples the first casing and the second casing to each other so that the first casing and the second casing can be folded open and closed in half, a finger guide section that is provided in the first outer surface, and guides a finger of a user to allow the finger to be placed so that a side portion of the finger faces the first outer surface; an illuminating section provided in the first outer surface so as to be adjacent to the finger guide section, the illuminating section being capable of radiating light that transmits through the placed finger; an imaging section provided in the first outer surface so as to be opposed to the finger guide section and the illuminating section with the second display section therebetween and project from the first outer surface, the imaging section being capable of imaging the light that has transmitted through the finger; and a control section that performs authentication of the user on the basis of an image obtained by the imaging, and controls the first display section to display information relating to a method of placing the finger and an authentication procedure.

The above-mentioned portable telephone is a so-called folding type portable telephone which has a so-called main display (first display section) and a so-called sub display (second display section). Due to this configuration, by taking advantage of the installation space for the second display section, the distance between the finger placed on the finger guide section and the imaging section can be broadened to a distance that provides an imaging range allowing high accuracy authentication. Further, imaging is performed by the user placing a finger on the finger guide section in the outer surface while looking at the information displayed on the first display section in the first inner surface, thereby allowing smooth authentication. Furthermore, since the user looks at the first display section, the imaging section tends to be located at a position where external light is shielded by the first casing, it is possible to perform authentication with reliability by reliably imaging the vein pattern of the finger free from the influence of external light.

According to still another embodiment, there is provided a portable telephone including: a first casing having a first front surface and a first back surface opposed to the first front surface; a second casing having a second front surface and a second back surface opposed to the second front surface, the second casing being coupled to the first casing so as to be capable of sliding movement so that the first back surface and the second front surface face each other; a finger guide section that is provided in the second front surface, and guides a finger of a user to allow the finger to be placed so that a side portion of the finger faces the second front surface; an illuminating section provided in the second front surface so as to be adjacent to the finger guide section, the illuminating section being capable of radiating light of a predetermined wavelength that transmits through the placed finger; an imaging section provided in a side surface between the first front surface and the first back surface in a direction of the sliding movement of the first casing, the imaging section being capable of imaging the light that has transmitted through the finger; and a control section that performs authentication of the user on the basis of an image obtained by the imaging.

The above-mentioned portable telephone is a so-called slide type one. The portable telephone may have the display section in the above-mentioned first front surface, and the operating section in the second front surface, or may have the operating section in the first back surface, and the display section in the second back surface. In this case, the operating section can be made to become exposed or covered by the above-mentioned sliding movement.

According to the configuration as described above, since the finger guide section and the illuminating section are provided in the second casing, and the imaging section is provided in the first casing, by utilizing the slidability of the above-mentioned first and second casings to expose or cover the operating section, for example, the distance between the finger placed on the finger guide section and the imaging section can be varied so as to broaden the imaging range of the imaging section. That is, by taking advantage of the existing configuration that the first and second casings are slidable, the vein pattern of the finger can be imaged over a wide range to allow high accuracy authentication.

According to still another embodiment, there is provided a portable telephone including: a casing having a side surface; an antenna section provided to the casing and can be projected from the side surface through sliding movement in a longitudinal direction, the antenna section having a first surface; a finger guide section that is provided in the first surface of the antenna section, and guides a finger of a user to allow the finger to be placed so that a side portion of the finger faces the first surface; an illuminating section provided in the first surface of the antenna section so as to be adjacent to the finger guide section, the illuminating section being capable of radiating light of a predetermined wavelength that transmits through the placed finger; an imaging section provided in the side surface and capable of imaging the light that has transmitted through the finger; and a control section that performs authentication of the user on the basis of an image obtained by the imaging.

According to the configuration as described above, by making the antenna section be slidable in order to increase the reception sensitivity or to alleviate the influence of radio waves on the human body, and by taking advantage of this slidability, the distance between the finger placed on the finger guide section and the imaging section can be varied to a distance that provides an imaging section allowing accurate authentication.

According to still another embodiment, there is provided a portable electronic device including: a casing having a first surface; a finger guide section that is provided in the first surface, and guides a finger of a user to allow the finger to be placed so that a side portion of the finger faces the first surface; an illuminating section provided in the first surface so as to be adjacent to the finger guide section, the illuminating section being capable of radiating light of a predetermined wavelength that transmits through the placed finger; an imaging section provided in the casing so as to be spaced at a predetermined distance from the first surface with respect to a perpendicular direction, the imaging section being capable of imaging the light that has transmitted through the finger; and a control section that performs authentication of the user on the basis of an image obtained by the imaging.

Examples of the portable electronic device used include a portable telephone, a PDA (Personal Digital Assistance), a notebook PC (Personal Computer), an electronic dictionary, a camera, a portable audio/visual device, or a portable game device.

As described above, according to an embodiment, high accuracy finger vein authentication can be performed irrespective of the configuration of the casing or the presence/absence and layout of mounted parts.

Additional features and advantages are described herein, and will be apparent from, the following Detailed Description and the figures.

BRIEF DESCRIPTION OF THE FIGURES

FIG. 7 is a diagram showing the results of an experiment on the effects of a band-pass filter and IR transmission filter according to the first embodiment;

FIGS. 28A and 28B are a left side view and a right side view, respectively, of the portable telephone according to the first embodiment when opened;

FIGS. 33A and 33B are a front view and a back view, respectively, of the portable telephone according to the third embodiment when opened;

FIGS. 36A and 36B are a front view and a back view, respectively, of the portable telephone according to the fourth embodiment with a retaining block projected;

FIGS. 40A and 40B are a front view and a back view, respectively, of the portable telephone according to the fifth embodiment with a key block projected;

FIGS. 43A and 43B are a left side view and a right side view, respectively, of the portable telephone according to the fourth embodiment with the key block accommodated;

FIGS. 44A and 44B are a front view and a back view, respectively, of the portable telephone according to the sixth embodiment with an antenna projected;

FIGS. 48A and 48B are a front view and a back view, respectively, of the portable telephone according to the seventh embodiment with a retaining block projected;

FIGS. 49A and 49B are a left side view and a right side view, respectively, of the portable telephone according to the seventh embodiment with the retaining block projected;

FIGS. 55A and 55B are a left side view and a right side view, respectively, of the portable telephone according to the eighth embodiment when opened and with the finger guide section accommodated;

FIGS. 56A and 56B are a front view and a back view, respectively, of the portable telephone according to the ninth embodiment when opened;

FIGS. 59A and 59B are a left side view and a right side view, respectively, of the portable telephone according to the ninth embodiment when closed.

DETAILED DESCRIPTION

Embodiments of the present application will now be described with reference to the drawings.

Figure 1:
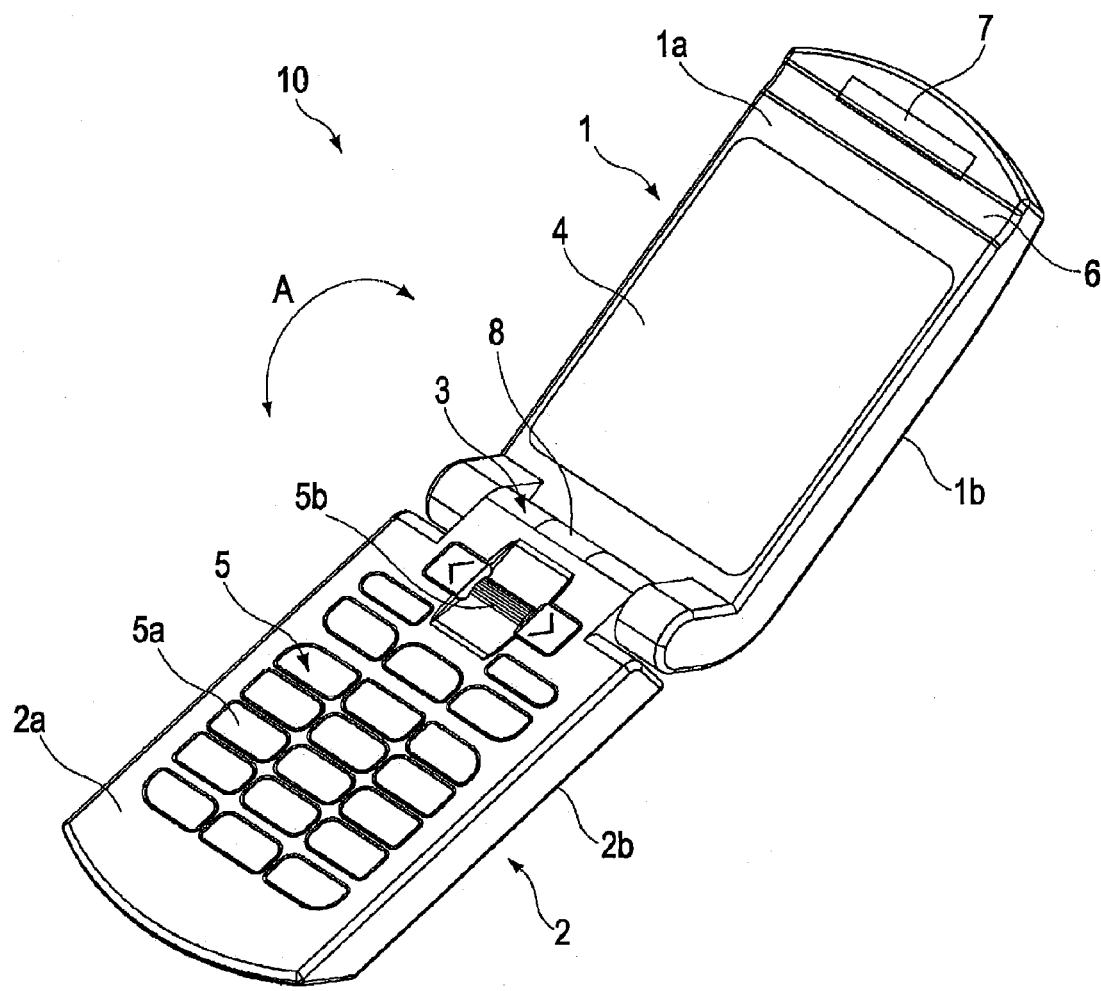
FIG. 1 is a perspective view showing the outward appearance of a portable telephone according to a first embodiment.
Figure 2:
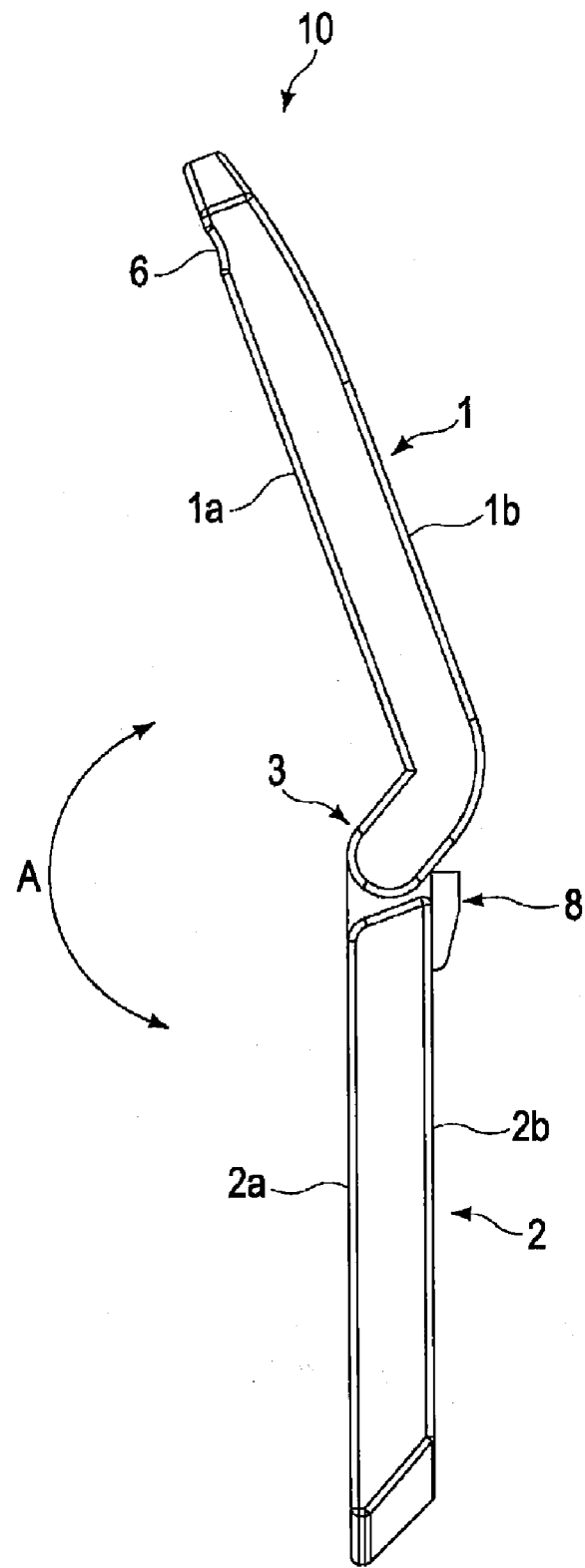
FIG. 2 is a side view of the portable telephone shown in FIG. 1.

FIG. 1 is a perspective view showing the outward appearance of a portable telephone 10 according to a first embodiment. FIG. 2 is a side view of the portable telephone 10 shown in FIG. 1.

As shown in FIGS. 1 and 2, the portable telephone 10 is of a so-called folding type configuration with a first casing 1 and a second casing 2 being pivotably coupled together through a hinge section 3. The two casings open/close in the direction indicated by the arrow A in FIGS. 1 and 2 as they pivot, allowing the portable telephone 10 to be folded in half.

A main display section 4 having a liquid crystal panel such as a TFT (Thin Film Transistor), for example, is provided in an inner surface 1a of the first casing 1. Further, although not shown in FIGS. 1 and 2, similarly, a sub display section having a liquid crystal panel is provided in an outer surface 1b of the casing 1.

An operating section 5 for inputting an operation of a user is provided in an inner surface 2a of the second casing. The operating section 5 has, for example, a ten key section 5a with an array of multiple number keys, a jog dial section 5b, and also buttons such as a cross key.

A finger guide section 6 for guiding a user's finger so as to allow placement of the finger thereon is provided at an end portion (hereinafter, referred to as the upper end portion) of the inner surface 1a of the first casing 1 opposite to the hinge section 3 with respect to the longitudinal direction. The finger guide section 6 has, for example, a concave portion formed in the lateral direction of the casing 1, and allows the side portion of the user's finger to be placed thereon so as to fit along the concave portion. That is, the width of the concave portion of the finger guide section 6 is not so large as to fit the shape of the palm portion of the finger but is so sized as to fit the side portion of the finger as placed on the finger guide section 6.

On the side of the inner surface 1a further toward the end portion than the above-mentioned finger guide section 6, an illuminating section 7 capable of radiating infrared light that transmits through the above-mentioned finger is provided so as to be adjacent to the finger guide section 6. Further, the hinge section 3 includes an imaging section 8 that can image infrared light radiated from the illuminating section 7 and transmitted through a finger, that is, the image of the vein of the finger. The illuminating section 7 and the imaging section 8 will be described later in detail.

Figure 3:
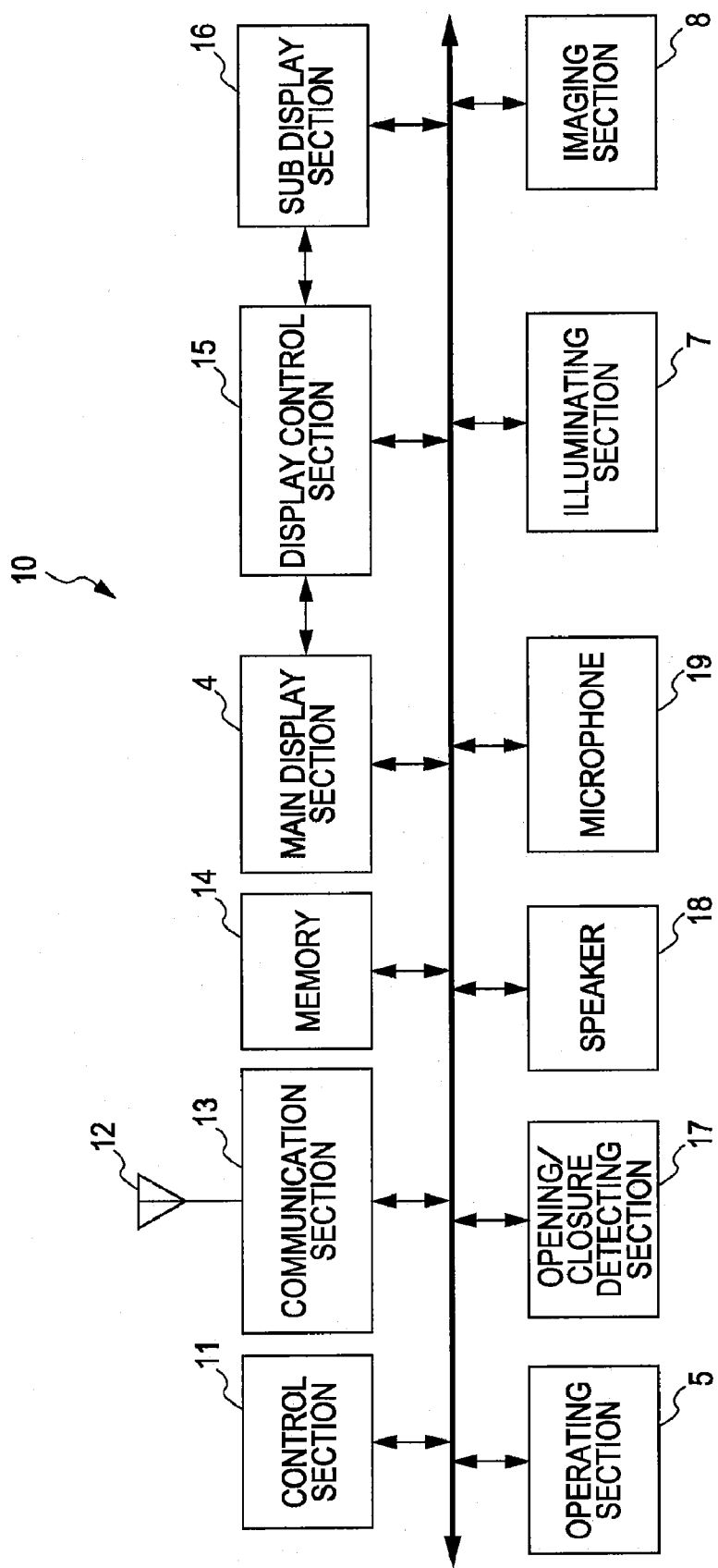
FIG. 3 is a block diagram showing the internal configuration of the portable telephone shown in FIG. 1.

FIG. 3 is a block diagram showing the internal configuration of the portable telephone 10. As shown in the FIG. 3, in addition to the main display section 4, the operating section 5, the illuminating section 7, and the imaging section 8 mentioned above, the portable telephone 10 has a control section 11, an antenna 12, a communication section 13, a memory 14, a display control section 15, a sub display section 16, an opening/closure detecting section 17, a speaker 18, and a microphone 19.

The antenna 12 is, for example, a built-in antenna, and performs transmission/reception of radio waves for calls or packet communications. The communication section 13 performs frequency conversion, modulation, demodulation, and the like of the radio waves transmitted/received by the antenna 12. It should be noted that examples of data to be transmitted/received via packet communications include image data, e-mail data, program data, and other such various kinds of data.

The memory 14 is formed by, for example, a ROM (Read Only Memory) or a RAM (Random Access Memory), a flash memory, or the like. In this embodiment, in particular, in addition to various kinds of programs and data necessary for a portable telephone, such as control programs for controlling respective sections by the control section 11, various initial setting data, telephone directory data, applications for performing creation of e-mails and the like, e-mail data, and mail address data, the memory 14 stores a program and data for authentication of a vein pattern or the like, which are used for performing authentication of a specific user. Further, the memory 14 stores data as required as the work area at the time of various data processing by the control section 11.

On the basis of a user operation with respect to the operating section 5, the display control section 15 controls, under the control by the control section 11, the main display section 4 provided in the inner surface 1a of the first casing 1 mentioned above, and the sub display section 16 provided in the outer surface 1b thereof. It should be noted that in this embodiment, in particular, the display control section 5 controls the main display section 4 and the sub display section 16 to display, at the time of user authentication based on a finger vein pattern, information relating to the placement position of the finger with respect to the finger guide section 6, the authentication procedure, and the like.

The above-mentioned operating section 5 is used for inputting an operation of the user with respect to the above-mentioned ten key section 5a, the jog dial section 5b, or the like, and transmitting the inputted signal to the control section 11 to cause the control section 11 to perform processing according to the inputted operation.

The opening/closure detecting section 17 is formed by, for example, a switch. The opening/closure detecting section 17 detects whether or not the portable telephone 10 according to this embodiment is in the opening state as shown in FIGS. 1 and 2 or in a folded state due to pivotal movement in the direction indicated by the arrow A in FIGS. 1 and 2, and transmits to the control section 11 a display switching signal indicating the switching of display between the main display section 4 and the sub display section 16, or the like, for example.

The speaker 18 has a digital/analog converter, an amplifier, and the like. The speaker 18 performs digital/analog conversion and amplification with respect to voice data for a call conversation (call reception) or voice data for a ringing tone (incoming call alert sound) inputted via the communication section 13, and outputs the voice data.

The microphone 19 has a digital/analog converter, an amplifier, and the like. The microphone 19 converts analog voice data for a call conversation (call reception) inputted from the user into digital voice data and sends the digital voice data to the control section 11. The digital voice data sent to the control section 11 is encoded before being transmitted via the communication section 13 and the antenna 12.

The control section 11 is formed by, for example, a CPU (Central Processing Unit). The control section 11 performs centralized control of the portable telephone 10, such as encoding and decoding of voice data during a call conversation, by exchanging signals with respective components of the portable telephone 10. Further, in this embodiment, in particular, the control section 11 performs processing relating to the authentication of a specific user, such as the analysis of image data as imaged by the imaging section 8.

Figure 4:
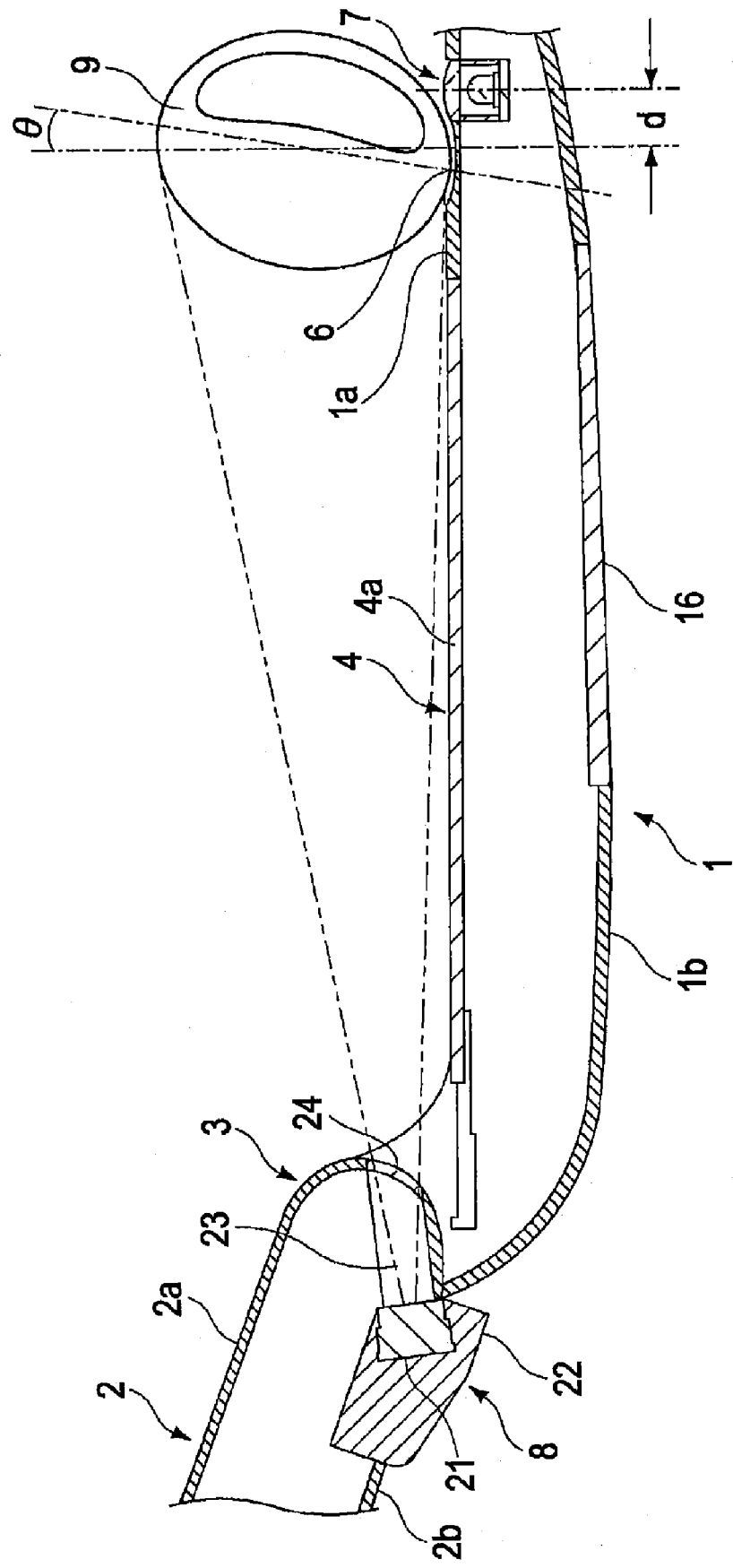
FIG. 4 is a schematic sectional view of the vicinity of a first casing and a hinge section with respect to the longitudinal direction of the portable telephone according to the first embodiment.
Figure 5A:
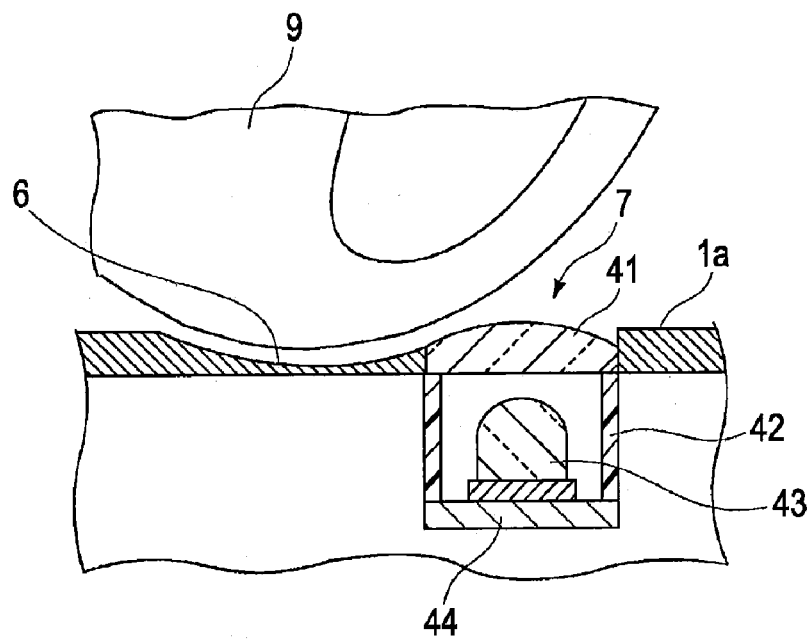
FIGS. 5A and 5B are views showing an illuminating section in detail.
Figure 5B:
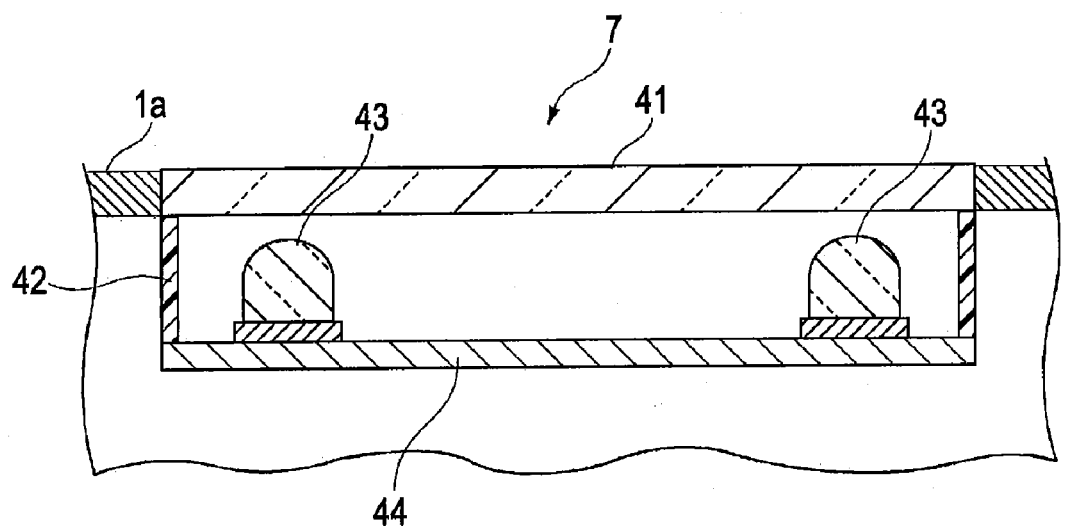
Figure 6:
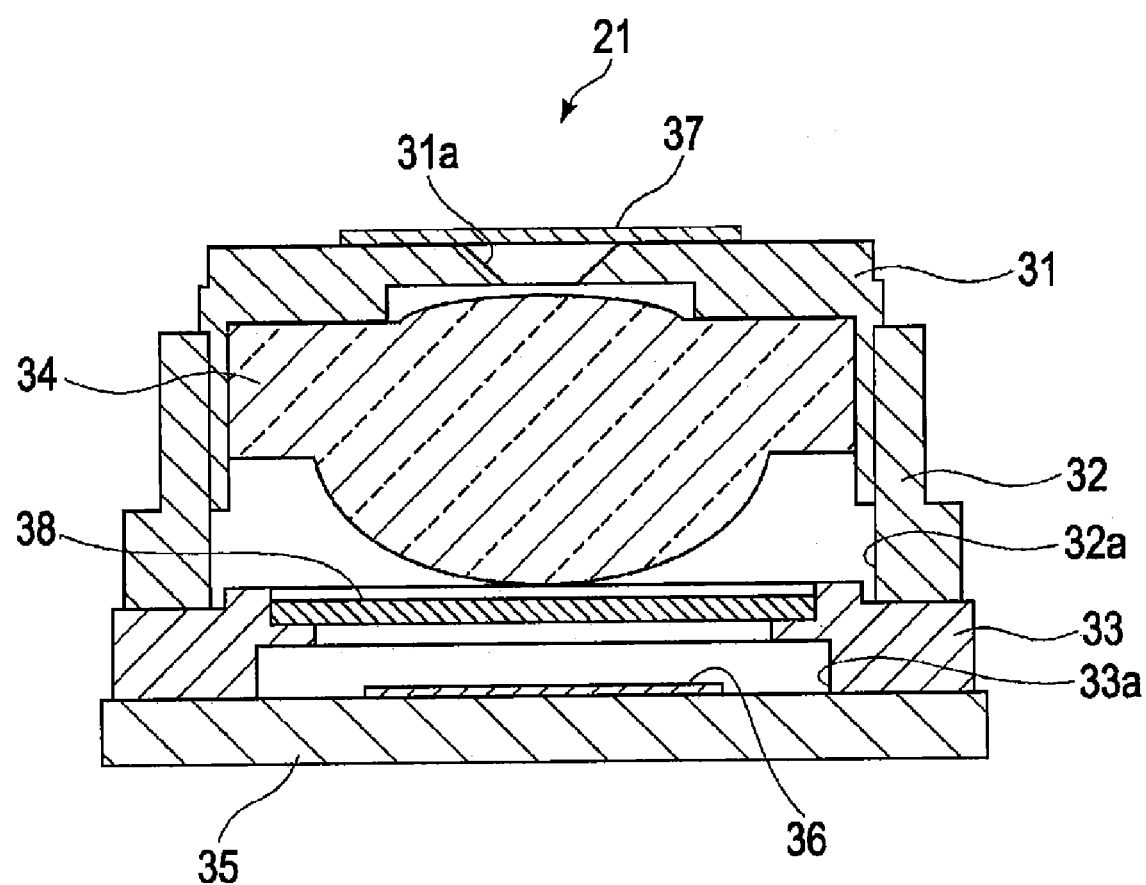
FIG. 6 is a sectional view of a camera module of the imaging section shown in FIG. 4.

Next, the illuminating section 7 and the imaging section 8 will be described in detail. FIG. 4 is a schematic sectional view of the vicinity of the first casing 1 and hinge section 3 with respect to the longitudinal direction of the first casing 1, FIGS. 5A and 5B are views showing the illuminating section 7 in detail, and FIG. 6 is a sectional view of a camera module 21 of the imaging section 8 shown in FIG. 4. In these figures, detailed illustration of the internal mechanisms of the casing 1 and casing 2 is omitted. Further, FIG. 5A is a sectional view of the illuminating section 7 as seen in the same direction (longitudinal direction) as FIG. 4, and FIG. 5B is a sectional view of the illuminating section 7 as seen in the lateral direction substantially perpendicular to FIG. 5A.

As described above, on the side of the first casing 1 toward the upper end portion of the casing 1 with respect to the finger guide section 6, the illuminating section 7 is provided so as to be adjacent to the finger guide section 6. As shown in FIGS. 5A and 5B, the illuminating section 7 has an infrared LED (light emitting diode) 43 capable of radiating infrared light, a substrate 44 connected to the infrared LED 43, a light guide 41 for optically controlling the directivity of the infrared LED, and a retaining tube 42 made of, for example, resin for retaining the light guide 41.

As shown in FIG. 5B, for example, two infrared LEDs 43 are provided in the lateral direction of the first casing, that is, in the same direction as the direction in which the finger guide section 6 is formed. The infrared LEDs 43 can radiate, toward a finger 9 placed on the finger guide section 6, near infrared light having a wavelength of, for example, about 600 to 980 nm that transmits through the finger. However, the wavelength of the near infrared light is not limited to one within the above-mentioned range.

Further, the light guide 41 has a convex curved surface in an upper surface thereof, for example. While a cylindrical lens, for example, is used as the light guide 41, other kinds of lens such as a Fresnel lens or anamorphic lens may also be used. The directivity of infrared light is controlled by means of the light guide 41, which makes it possible to prevent infrared light from directly entering the imaging section 8 and prevent noise from being introduced into the imaged by the imaging section 8 to adversely affect the accuracy of authentication.

Further, as shown in FIG. 4 and FIGS. 5A and 5B, the light guide 41 is formed such that an end portion of its convex-shaped portion becomes integral with a part of the concave-shaped portion of the light guide section 6. Accordingly, like the finger guide section 6, the light guide 41 also serves to guide a finger of the user so as to allow the placement of the finger.

As shown in FIG. 4, the imaging section 8 has the camera module 21, a retaining cover 22 that retains the camera module, and an optical path 23 for guiding light into the camera module 21. The camera module 21 is provided such that the optical axis of its optical system extends toward the palm portion of the finger 9 while being slightly inclined with respect to the inner surface 1a. As shown also in FIG. 2, the retaining cover 22 is provided so as to project from an outer surface 2b of the second casing 2, for example. The optical path 23 is formed so as to extend through the second casing 2 and the hinge section 3 from, for example, the camera module 21 to the surface of the hinge section 3, with an opening being formed in the surface of the hinge section 3. As shown in FIG. 4, a protective cover 24 made of, for example, acrylic resin may be provided over the opening.

As shown in FIG. 6, the camera module 21 has a tubular configuration. The camera module 21 has a tube section formed by an upper tube section 31, an intermediate tube section 32, and a lower tube section 33 each having an optical path, a lens 34 provided inside the tube section, a substrate 35 provided under the tube section, and an image sensor 36 provided on the substrate 35. Further, in this embodiment, in particular, an IR transmission filter 37 is provided o the upper tube potion 31 so as to cover the opening thereof, and a band-pass filter 38 is provided between the lens 34 and the image sensor 36 inside the lower tube section 33. The image sensor 36 used is, for example, a CCD (Charge Coupled Devices) sensor or CMOS (Complementary Metal Oxide Semiconductor) sensor.

The band-pass filter 38 transmits only infrared light of a specific wavelength in accordance with the wavelength of infrared light radiated by the above-mentioned illuminating section 7. Further, of the light entering the image sensor 36, the IR transmission filter 37 transmits infrared light and shields (absorbs) visible light. While it is assumed that the specific wavelength is, for example, 870 nm, and the IR transmission filter 37 transmits light with a wavelength of, for example, 760 nm or more, these wavelengths should not be interpreted restrictively.

The present inventors conducted an experiment on the effects of the band-pass filter 38 and IR transmission filter 37. FIG. 7 is a diagram showing the results of the experiment. It should be noted that this experiment was conducted from 11 a.m. on Dec. 8, 2005. The weather at this time was clear, the irradiance of sunlight was 104,650 lx, and the color temperature was 5,176 K. Further, the graph A in FIG. 7 indicates the spectrum of the sunlight that is directly incident on the image sensor 36, and the graph B indicates the spectrum of the light incident on the image sensor 36 in the case where the band-pass filter 38 and the IR transmission filter 37 are used. It should be noted that the irradiance of the sunlight that is actually incident on the image sensor 36 is the integral of the value indicated by the graph A in FIG. 7.

As shown in FIG. 7, in the state where neither of the above-mentioned filters is used as indicated by the graph A, the image sensor 36 is extremely susceptible to the influence of sunlight, which makes it difficult for the vein pattern of a finger to be captured as an image, or even when it is successfully captured as such, it is difficult to obtain a clear vein pattern, so the authentication is rejected even when the captured image of the finger is that of the user himself/herself.

In view of this, as indicated by the graph B in FIG. 7, the intensity of sunlight is suppressed to $\frac{1}{10}$ or less by means of the above-mentioned band-pass filter 38 and IR transmission filter, so the difference in irradiance between the infrared light radiated from the illuminating section 7 and the sunlight can be made small, thereby making it possible to accurately capture the vein pattern of a finger. Accordingly, false rejection of a genuine user is avoided, thereby allowing authentication to be performed with reliability.

Further, as indicated by the graph A, the irradiance of sunlight becomes particularly small in the vicinity of the wavelengths of about 760 nm and about 950 nm. Accordingly, by designing both the filters in accordance with these wavelengths, the influence of sunlight can be suppressed most efficiently.

Figure 8A:
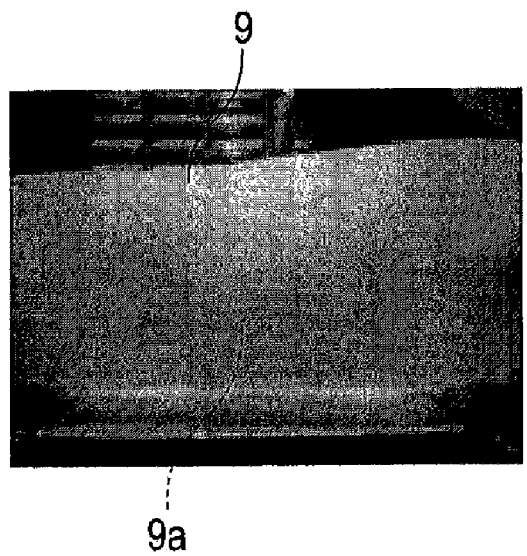
FIGS. 8A and 8B are views respectively showing the images of a finger as imaged in the case where the band-pass filter and the IR transmission filter are not mounted to the imaging section and in the case where both the filters are mounted according to the first embodiment.
Figure 8B:
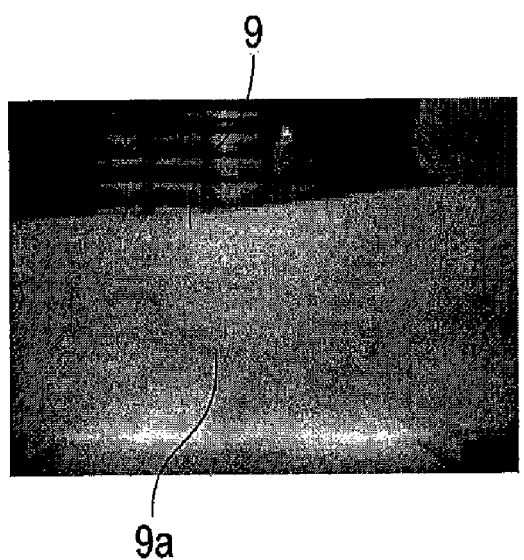

FIGS. 8A and 8B are views showing the images of the same finger as imaged in the case where the above-mentioned band-pass filter 38 and IR transmission filter 37 are not mounted to the imaging section 8 (FIG. 8A) and in the case where both the filters are mounted (FIG. 8B). As shown in FIG. 8A, when the two filters are not used, external light is scattered on the surface (fingerprint) of the finger 9 and noise is introduced, making it difficult to clearly capture a vein pattern 9a. In contrast, as shown in FIG. 8B, by using the two filters, it is possible to suppress the influence of external light and hence clearly capture the vein pattern 9a.

With the use of double filters in this way, even if light of a wavelength (visible light) that cannot be completely shielded by the band-pass filter 38 exists, such light can be shielded by the IR transmission filter 37 with reliability. Although a portable telephone like the portable telephone 10 according to this embodiment is frequently used under an environment involving exposure to external light such as sunlight as in the outdoors or the like, the use of both the filters allows a finger vein to be reliably imaged even under an environment involving exposure to external light, thereby making it possible to perform finger vein authentication of high accuracy.

Figure 9:
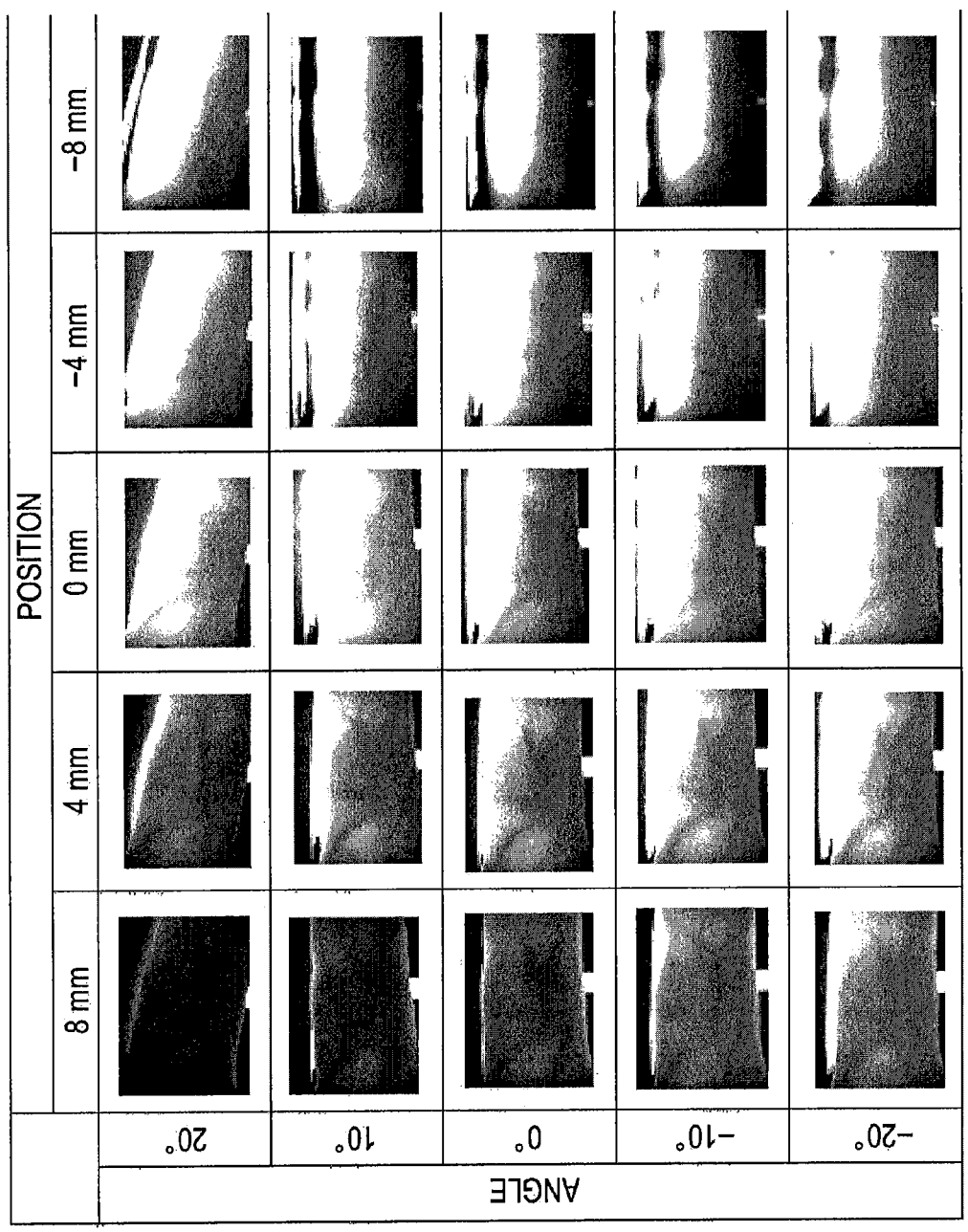
FIG. 9 is a view showing respective images as imaged while varying the position and angle of the illuminating section with respect to a finger according to the first embodiment.

Further, the installation angle and installation position of the above-mentioned illuminating section 7 with respect to a finger placed on the finger guide section 6 can be changed as appropriate. The present inventors conducted imaging of a finger while varying an angle θ formed between a centerline on the equatorial plane which passes through the center of the finger and divides the finger into the palm side and the back side (nail side), and the normal of the inner surface 1a, and also varying the distance d from the illuminating section 7 to the center of the finger on the plane parallel to the inner surface 1a. The present inventors then compared the captured image against each other. FIG. 9 is a view showing the imaging results. It should be noted that in FIG. 9, as for the angle, the state in which the centerline of the finger mentioned above is in parallel to the above-mentioned normal is taken as the origin (0), and a tilt toward the palm side (imaging section side; the left side in FIG. 4) of the finger is indicated as +, and a tilt toward the back side (the upper end side of the first casing 1; the right side in FIG. 4) of the finger is indicated as −. As for the distance, with the state in which a finger lies on the centerline of the illuminating section 7 taken as the origin (0), the state in which the finger is located on the imaging section 8 side (the left side in FIG. 9) with respect to the illuminating section 7 is indicated as +, and the state in which the finger is located on the upper end side (the right side in FIG. 9) of the casing 1 is indicated as −.

As shown in FIG. 9, as for the angle and the distance, the vein pattern of a finger is captured with greater clarity as the finger is tilted toward the back side (−) from the origin, and as the finger moves toward the imaging section side (+) from the origin, respectively. As a result of a comparison between the images obtained by performing imaging in the same manner with respect to angle and distance ranges outside those shown in FIG. 9, it was found that by setting the illuminating section 7 at an angle θ of −40° to 0° (0° to 40° toward the back side of the finger) and at a distance d of 0 mm to 20 mm with respect to the finger, and radiating infrared light from the back side of the finger to image the finger, the vein pattern can be captured with the level of clarity allowing authentication. Accordingly, in this embodiment, the illuminating section 7 and the finger guide section 6 are provided so that they are positioned within the above-mentioned range of the distance d from each other, and at the time of user authentication, a finger placement method is displayed in, for example, the main display section 4 or sub display section 16 so that the side portion of the finger is placed at an angle within the above-mentioned angle θ range, thereby making it possible to capture the optimum vein pattern for authentication.

It should be noted that in this embodiment, a distance of, for example, 10 mm or more is required as the distance between the imaging section 8 and the finger. The reason for this is as follows. Since there is a trade-off relation between the imaging range (field of view) and the authentication accuracy, if the distance between the imaging section 8 and the finger is smaller than 10 mm, the imaging range becomes narrow, so the vein pattern of only a part of the finger is captured, resulting in a reduction in authentication accuracy. In this embodiment, the imaging section 8 is provided in the hinge section 3, and the finger guide section 6 is provided at the upper end portion of the inner surface 1a of the first casing 1 across the main display section 4. It is thus possible to secure the above-mentioned distance of 10 mm or more by utilizing the width of the main display section 4 in the longitudinal direction, thereby enabling high accuracy authentication.

It should be noted that when a finger is placed on the concave portion of the finger guide section 6, it is possible to prevent infrared light from leaking to the imaging section 8 side due to the finger, thereby preventing noise from being introduced into the captured image by the infrared light.

The above-mentioned main display section 4 has a liquid crystal panel (not shown) provided therein. As shown in FIG. 4 and FIGS. 5A and 5B mentioned above, the main display section 4 has, on a plane substantially parallel to the inner surface 1a, a protective plate 4a made of, for example, acrylic resin for protecting the liquid crystal panel. If infrared light leaks from a gap between the finger and the finger guide section 6 to be incident from the end face of the protective plate 4a, this may adversely affect imaging, such as noise being introduced into the captured image as described above as the infrared light is transmitted through the inner portion of the protective plate 4a to emerge from a portion in the vicinity of the imaging section 8. In view of this, light shielding against infrared light may be applied to the end face of the above-mentioned protective plate 4a. Examples of such light shielding include affixing of a light-shielding tape or coating of a light-shielding material.

Further, although not shown, an authentication button is provided in a side surface of the first casing 1 or second casing 2, for example. The authentication button is used to start a series of authentication processing such as radiation of infrared light by the illuminating section 7, imaging by the imaging section 8, and display of the authentication procedure by the main display section 4.

Next, a user authentication operation in the portable telephone 10 configured as described above will be described.

The user authentication is performed to cancel various restrictions being placed on the functions of the portable telephone 10, such as the locking of access or operations with respect to data within the portable telephone 10. When the above-mentioned authentication button, for example, is depressed by the user, in the portable telephone 10, first, the display control section 15 causes the main display section 4 to display information relating to the placement position of a finger with respect to the finger guide section 6, the authentication procedure, and the like. More specifically, for example, it is also possible to adjust the placement position and placement angle of a finger by displaying, in the state with the user placing his/her finger on the finger guide section 6, the image of the finger as captured by the imaging section 8 and information relating to the optimum placement position and placement angle of the finger. Once the placement position and placement angle becomes optimum (are determined to be optimum by the user), when, for example, the above-mentioned authentication button is depressed again, the portable telephone 10 causes the imaging section 8 to perform imaging of the finger while illuminating the infrared LED 43 of the illuminating section 7. It should be noted that a button for imaging may be provided in addition to the authentication button. Further, instead of the authentication button, for example, a sensor for sensing the placement of a user's finger on the finger guide portion 6 may be provided so that the infrared LED 43 is automatically illuminated for imaging after the elapse of a predetermined period of time from the sensing of the finger placement.

The control section 11 analyzes the above-mentioned captured image to obtain a vein pattern, and verifies this vein pattern against the vein pattern of a registered user that is stored in advance in the memory 14. If the two patterns match, the control section 11 determines that the user being authenticated is a legitimate user, and cancels the above-mentioned function restrictions. If the two patterns do not match, the control section 11 does not cancel the function restrictions. At this time, an indication that the function restrictions cannot be canceled due to a mismatch between the vein patterns, for example, may be displayed on the main display section 4.

It should be noted that the vein pattern of a registered user used for the above-mentioned verification is imaged by the imaging section 8 at the time of initial setting of the portable telephone 10, for example, while illuminating the infrared LED 43 by the illuminating section 7 in the state with the finger of the registered user being placed on the finger guide section 6 in the same manner as when performing the above-mentioned authentication. The vein pattern is then stored into the memory 14 together with information relating to the characteristics of the vein pattern, and the like.

As described above, the finger guide section 6 and the illuminating section 7 are provided at the upper end portion of the first casing 1, the imaging section 8 is provided in the hinge section 3 so as to sandwich the main display section 4 of the first casing 1 between the imaging section 8, and the finger guide section 6 and the illuminating section 7, and the finger is imaged with the side portion of the user's finger being placed on the finger guide section 6. Accordingly, by making effective use of a free space, a clear image of the vein pattern of the user's finger can be obtained without changing the layout of existing components of the folding type portable telephone 10, such as the main display section 4 and the operating section 5, while also securing the focal length. It is thus possible to perform high accuracy authentication.

Next, a second embodiment will be described. It should be noted that in this and subsequently described embodiments, the portions whose configuration and operation are the same as those of the portable telephone 10 according to the above-mentioned first embodiment are denoted by the same reference numerals in the drawings, and description thereof is omitted or simplified.

Figure 10:
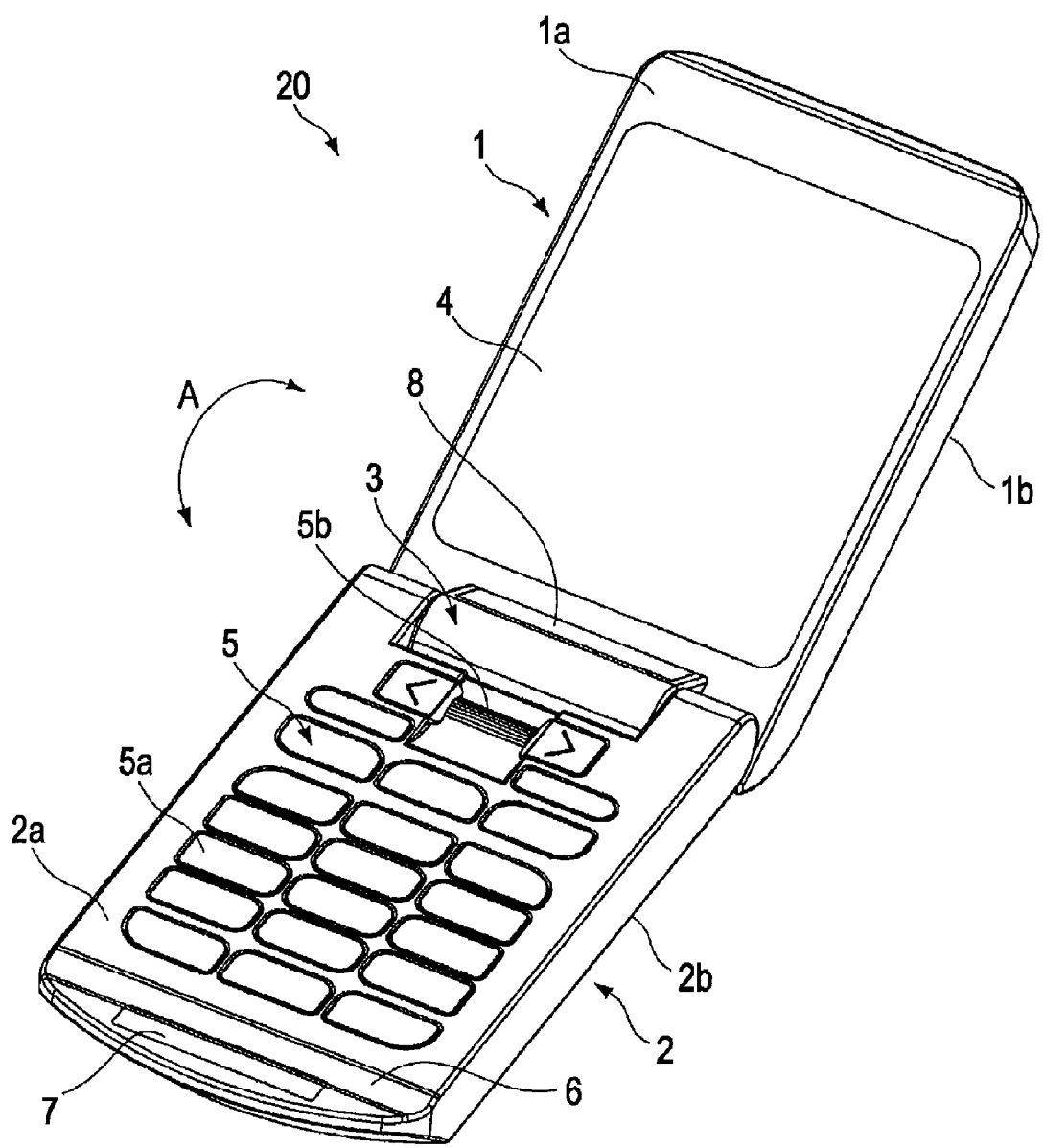
FIG. 10 is a perspective view showing the outward appearance of a portable telephone according to a second embodiment when opened.
Figure 11:
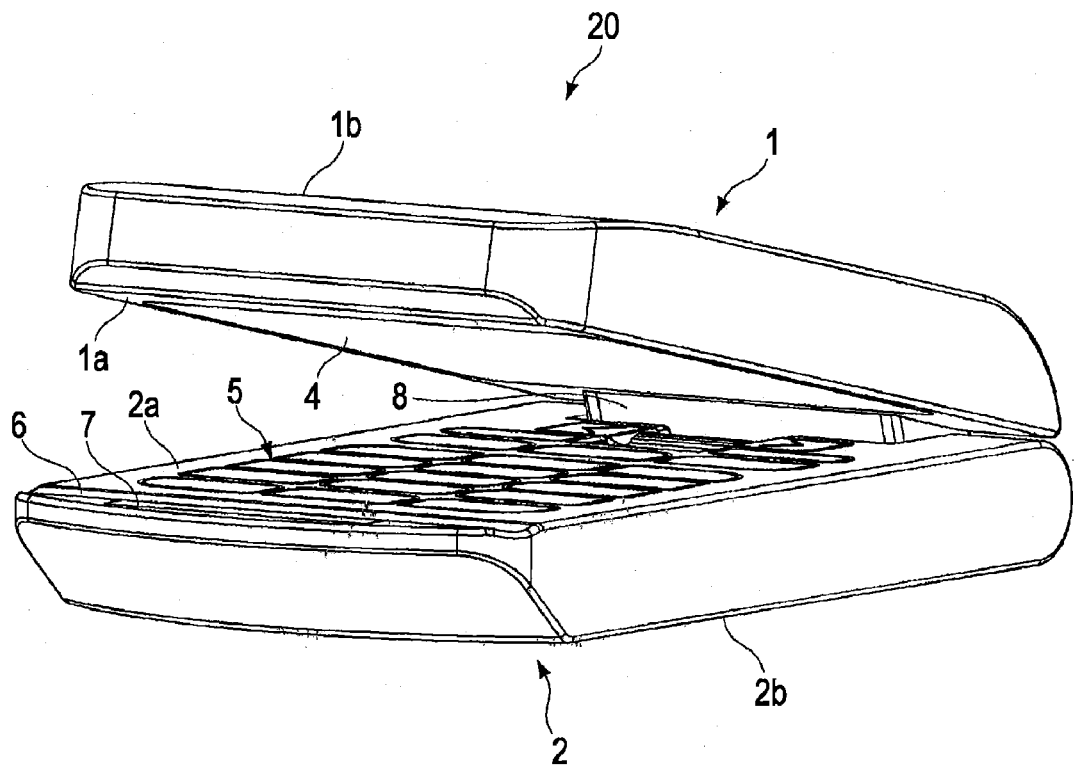
FIG. 11 is a perspective view showing the outward appearance of the portable telephone shown in FIG. 10 when closed by a predetermined angle.
Figure 12:
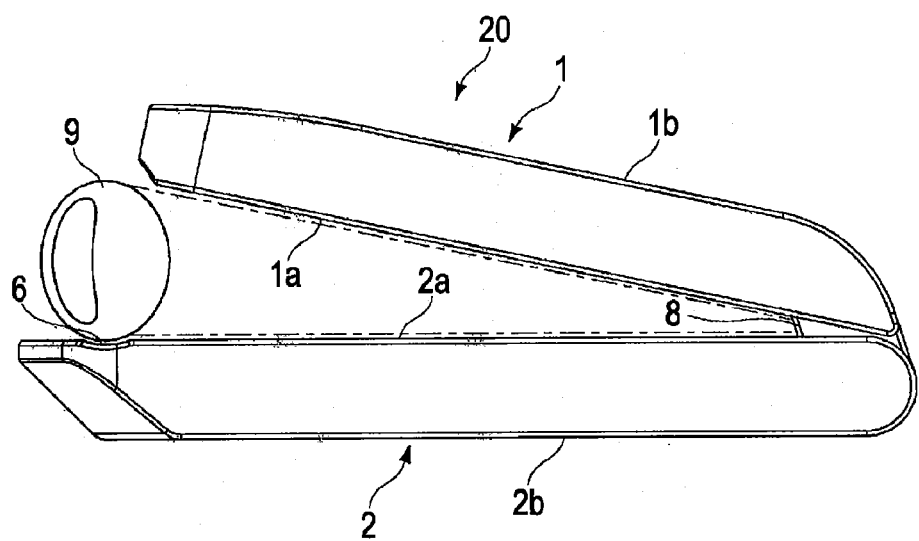
FIG. 12 is a view showing the portable telephone at the time of authentication, as seen from the side surface.

In this embodiment, in the same folding type portable telephone as that of the above-mentioned first embodiment, the positions where the finger guide section 6 and the illuminating section 7 are provided are changed. FIG. 10 is a perspective view showing the outward appearance of a portable telephone 20 according to this embodiment when opened, and FIG. 11 is a perspective view showing the outward appearance of the portable telephone 20 shown in FIG. 10 when closed by a predetermined angle. FIG. 12 is a view showing the portable telephone 20 at the time of authentication, as seen from the side surface.

In the above-mentioned first embodiment, the finger guide section 6 and the illuminating section 7 are provided at the upper end portion of the first casing 1. However, in this embodiment, as shown in FIGS. 10 and 11, in the folding type portable telephone 20 that can be similarly opened and closed in the direction indicated by the arrow A in FIG. 10, the finger guide section 6 and the illuminating section 7 are provided at an end portion (hereinafter, referred to as the lower end portion) of the inner surface 2a of the second casing 2 on the side opposite to the hinge section 3. That is, the finger guide section 6 and the illuminating section 7, and the imaging section 8 provided in the hinge section 3 are in such a positional relation as to sandwich the operating section 5 therebetween.

Further, while the imaging section 8 is provided in the hinge section 3 as in the above-mentioned first embodiment, in this embodiment, as shown in FIG. 11, the imaging section 8 is provided so as to face a finger in the state when the first casing 1 or second casing 2 is closed by a predetermined angle, thereby making it possible to perform imaging of the finger. Accordingly, as shown in FIG. 12, authentication is performed with the user placing the side portion of his/her finger on the finger guide section 6 and closing the first casing and the second casing by a predetermined angle so that the finger is sandwiched between the upper end portion of the first casing 1 and the lower end portion of the second casing 2.

It should be noted that while the pivotal movement of both the casings may be locked by the finger being sandwiched between the first casing 1 and the second casing 2, it is also possible to provide the hinge section 3 with a locking mechanism that temporarily locks the pivotal movement of both the casings at such an angle as to sandwich the finger (for example, at an angle that makes the angle formed between the inner surface 1a and the inner surface 2a be about 10 to 15 degrees). Otherwise, the configuration and operation of the portable telephone 20 are the same as those of the first embodiment mentioned above.

Due to the configuration as described above, by providing the finger guide section 6 and the illuminating section 7, and the imaging section 8 so as to sandwich the operating section 5 therebetween, it is possible to secure the focal length by utilizing the installation area of the operating section 5 and perform high accuracy authentication in the same manner as in the first embodiment. In this embodiment, in particular, since the first casing 1 and the second casing 2 are closed by a predetermined angle at the time of authentication, external light incident on the finger or imaging section 8 is shielded by the first casing 1, thereby making it possible to suppress the influence of external light to enable high accuracy authentication.

Figure 13:
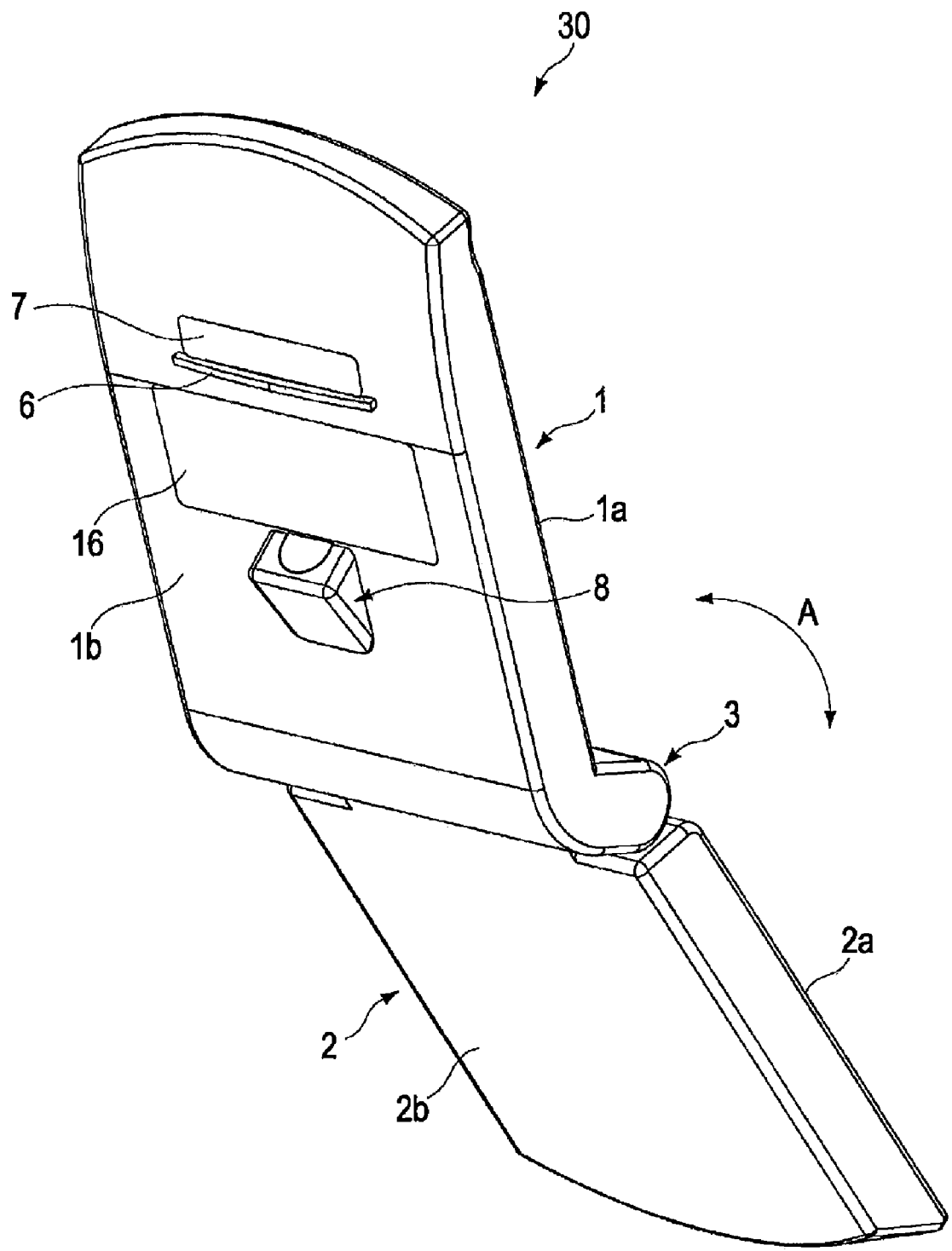
FIG. 13 is a perspective view showing the outward appearance of a portable telephone according to a third embodiment.

Next, a third embodiment will be described. FIG. 13 is a perspective view showing the outward appearance of a portable telephone 30 according to this embodiment, and FIG. 14 is a sectional view, taken along the longitudinal direction of the first casing 1, of the portable telephone 30 shown in FIG. 13 when performing authentication.

According to the two embodiments mentioned above, in the folding type portable telephone, the finger guide section 6 and the illuminating section 7 are provided in the inner surface of the first casing 1 or second casing 2, and the imaging section 8 is provided in the hinge section 3. In this embodiment, however, as shown in FIGS. 13 and 14, the finger guide section 6 and the illuminating section 7 are provided in the outer surface 1b of the first casing 1.

Figure 14:
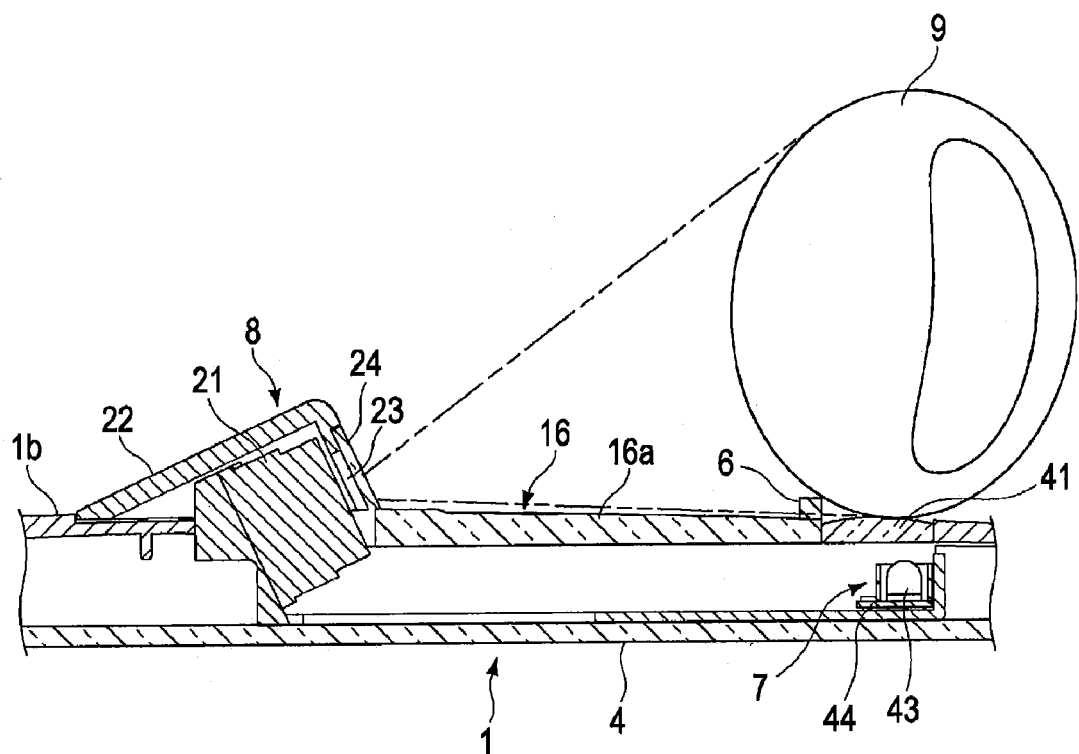
FIG. 14 is a sectional view, taken along the longitudinal direction of the first casing, of the portable telephone shown in FIG. 13 when performing authentication.

That is, as shown in FIG. 14, the finger guide section 6 and the illuminating section 7, and the imaging section 8 are provided so as to sandwich therebetween the sub display section 16 provided in the outer surface 1b of the first casing 1. In this embodiment, the finger guide section 6 is provided not as a concave portion as in the embodiments mentioned above, but as a convex portion that projects from the outer surface 1b. As shown in FIG. 14, the user places a finger such that the side portion of the finger touches the finger guide section 6 formed as a convex portion.

Further, the imaging section 8 is provided so as to project from the outer surface 1b. As shown in FIG. 14, in the same manner as described above with reference to the first embodiment, the imaging section 8 has the camera module 21, the retaining cover 22 that retains the camera module, the optical path 23 for guiding light into the camera module 21, and the protective cover 24 that covers the opening of the optical path 23. The camera module 21 is provided such that the optical axis of its optical system extends toward the palm portion of the finger 9 while being slightly inclined with respect to the outer surface 1b. The imaging section 8 may be provided such that the imaging section 8 can be accommodated into the first casing in a non-imaging state, by making one end of the retaining cover 22 pivotable about the lateral axis of the outer surface 1b, for example.

Further, due to its convex shape, the finger guide section 6 shields infrared light that leaks from a gap between the finger guide section 6 and a finger placed on the finger guide section 6. This makes it possible to prevent infrared light from affecting the imaging by the imaging section 8.

The authentication operation in the portable telephone 30 according to this embodiment is the same as that in each of the embodiments mentioned above. Due to this configuration, by providing the finger guide section 6 and the illuminating section 7, and the imaging section 8 so as to sandwich the sub display section 16 therebetween, it is possible to secure the focal length by utilizing the installation area of the sub display section 16, thereby enabling high accuracy authentication.

Further, in this case, since the finger placement method and the authentication procedure are displayed on the main display section 4 so that the user performs authentication while looking at the main display section 4, the imaging section 8 tends to lie in the shadow of the first casing 1 away from external light, thereby also making it possible to suppress the influence of external light on the imaging section 8.

Figure 15:
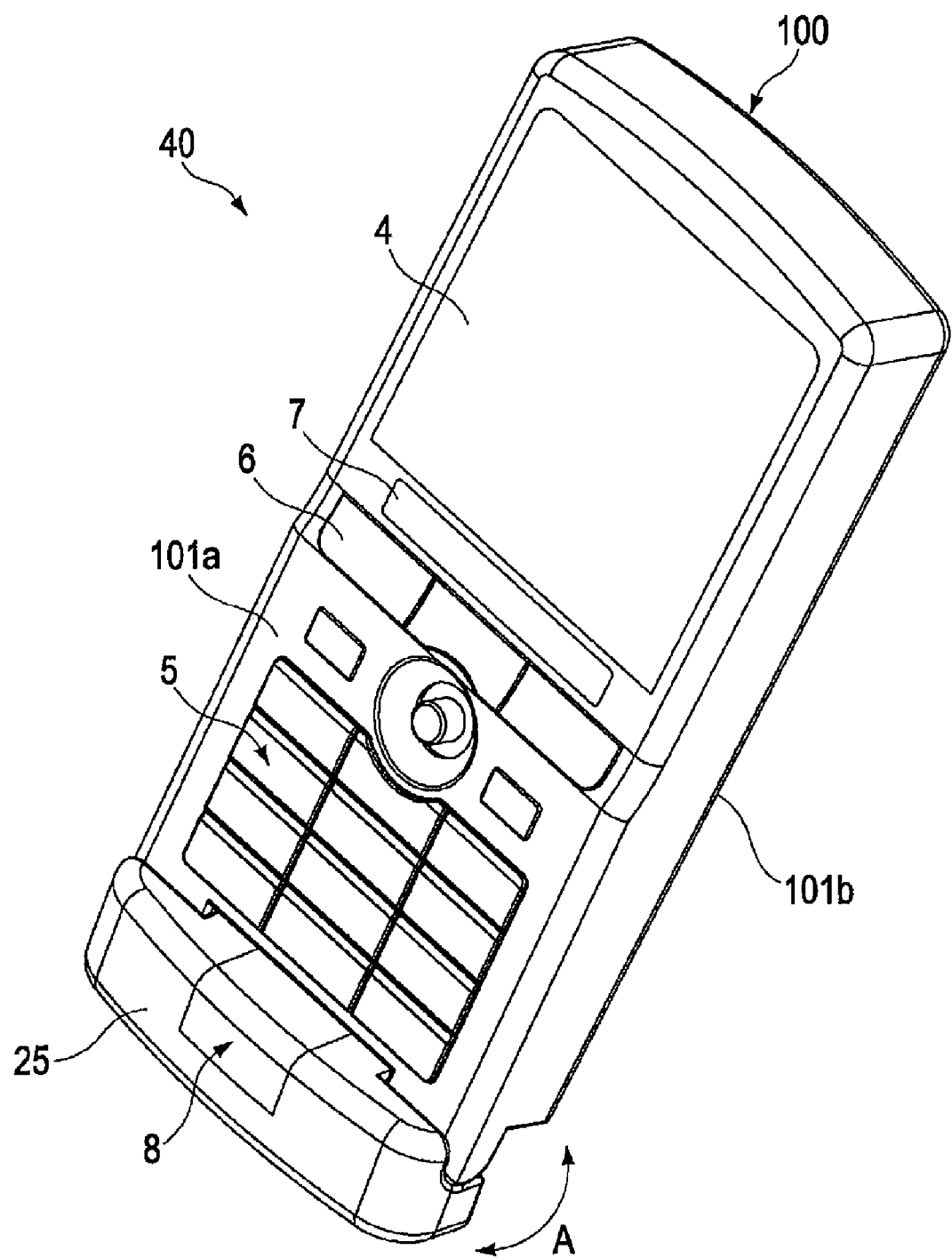
FIG. 15 is a perspective view showing the outward appearance of a portable telephone according to a fourth embodiment.

Next, a fourth embodiment will be described. FIG. 15 is a perspective view showing the outward appearance of a portable telephone 40 according to this embodiment, and FIG. 16 is a side view of the portable telephone 40 when performing authentication in the portable telephone 40 shown in FIG. 15.

Figure 16:
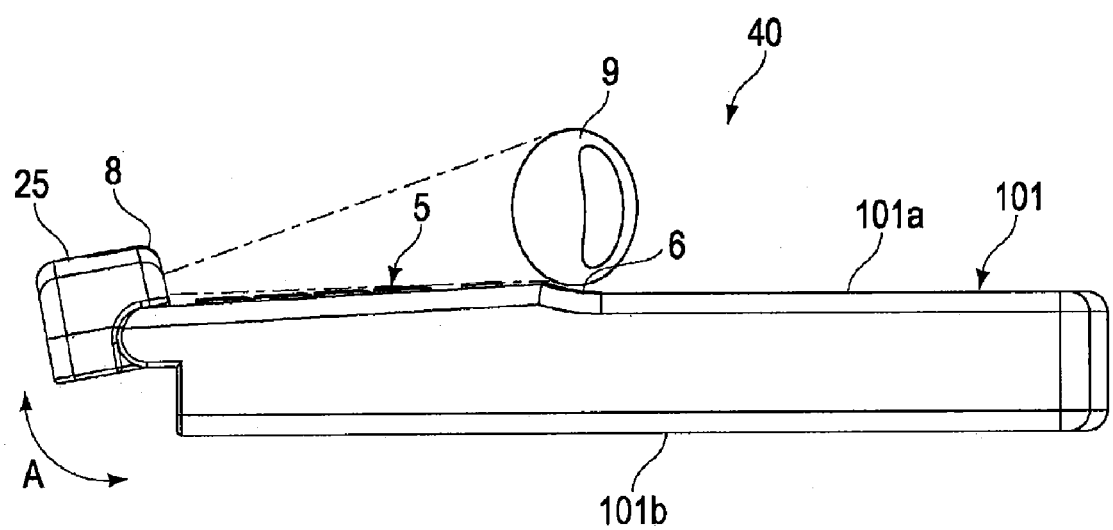
FIG. 16 is a side view of the portable telephone when performing authentication in the portable telephone shown in FIG. 15.

As shown in FIGS. 15 and 16, the portable telephone 40 according to this embodiment is a so-called straight type (stick type) one, and has the display section 4 and the operating section 5 provided in an upper surface 101a of a casing 101.

Further, the finger guide section 6 and the illuminating section 7 are provided between the display section 4 and the operating section 5 in the upper surface 101a, and a retaining block 25 for retaining the imaging section 8 is provided at the lower end portion of the casing 101. The finger guide section 6 has, for example, a concave portion in which the side portion of a user's finger can be placed. The configuration of the illuminating section 7 is the same as that in each of the embodiments mentioned above. As shown in FIGS. 15 and 16, the retaining block 25 is connected to the casing 101 so as to be pivotable in the direction indicated by the arrow A in FIGS. 15 and 16 about the lateral axis of the upper surface 101a. At the time of user authentication, due to the above-mentioned pivotal movement, the retaining block 25 projects from the upper surface 101a together with the imaging section 8, and the optical axis of the imaging section 8 is directed toward the palm portion of a finger placed on the finger guide section 6. FIG. 15 shows the state of the retaining block 25 at the time of authentication. When not performing authentication, the surface of the retaining block 25 which faces the palm portion of the finger at the time of authentication becomes flush with the upper surface 101a of the casing 101, and the optical axis of the imaging section 8 is directed substantially perpendicular to the upper surface 101 a. The authentication operation in the portable telephone 40 is the same as that described with reference to each of the above-mentioned embodiments.

It should be noted that the above-mentioned retaining block 25 may be provided so as to be pivotable about not the lateral direction but the longitudinal direction of the upper surface 101a. In this case, the imaging section 8 is provided at a predetermined distance in the above-mentioned lateral direction from the pivot axis, so that the imaging section 8 faces a side surface on the lower end side of the casing 101 in a non-imaging state, and is made to face the above-mentioned palm portion of the finger upon pivotal movement.

Due to the configuration as described above, in the so-called straight type portable telephone 40 as well, by providing the finger guide section 6 and the illuminating section 7 between the display section 4 and the operating section 5 in the upper surface 101a, and providing the imaging section 8 at the lower end portion so as to be capable of projecting from the upper surface 101a, high accuracy authentication can be performed without changing the layout of the existing display section 4 and operating section 5, while also securing the focal length by utilizing the installation area of the operating section 5.

Figure 17:
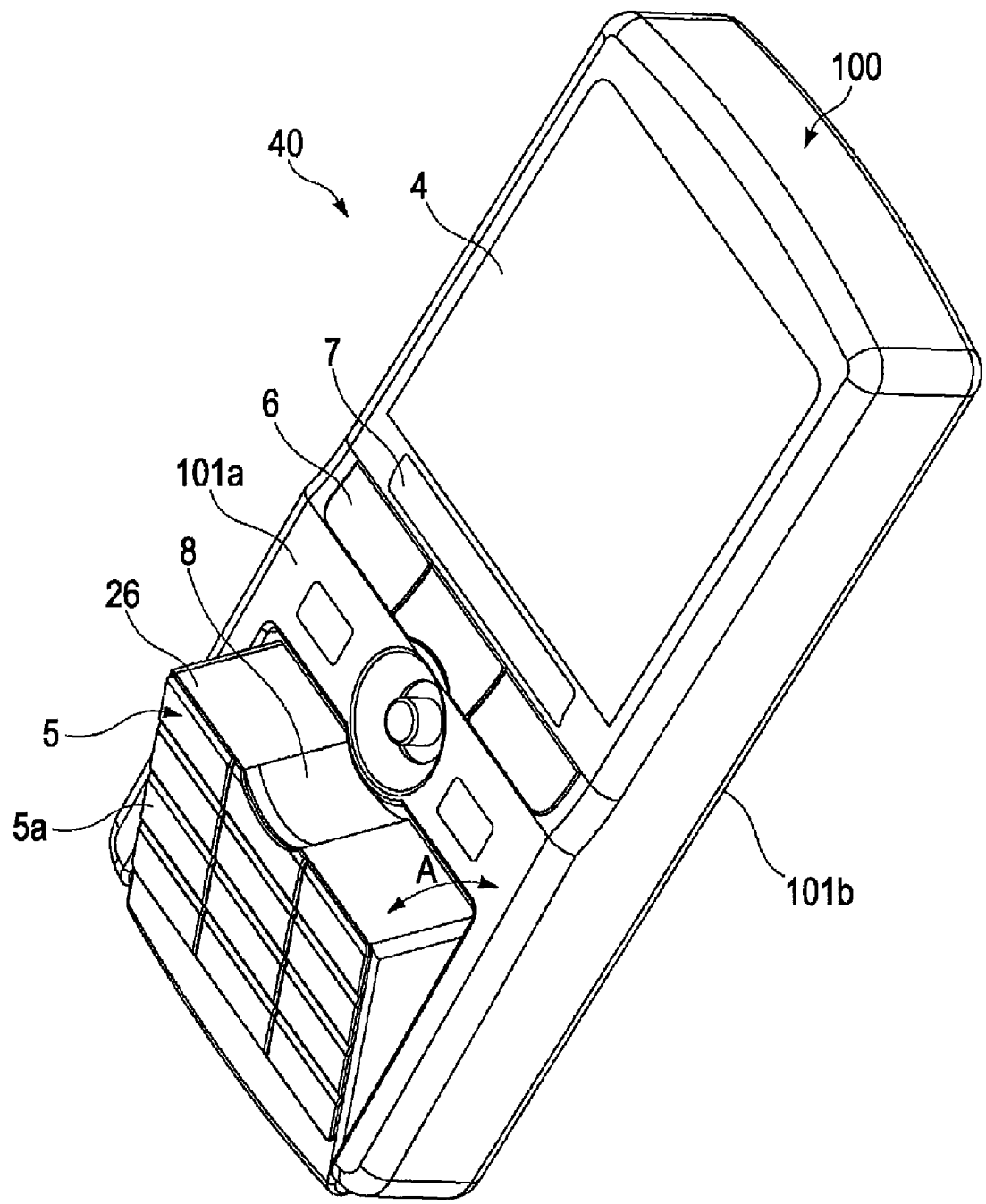
FIG. 17 is a perspective view showing the outward appearance of a portable telephone according to a fifth embodiment.

Next, a fifth embodiment will be described. FIG. 17 is a perspective view showing the outward appearance of a portable telephone 50 according to this embodiment.

In the above-mentioned fifth embodiment, in the same straight type portable telephone 50 as the portable telephone 30 according to the fourth embodiment mentioned above, the portion of the operating section 5 provided with the ten key section 5a is formed as a key block 26. The key block 26 is provided so as to be capable of projecting from the upper surface 101a through pivotal movement in the direction indicated by the arrow A in FIG. 17 about the lateral axis of the upper surface 101a, for example. The imaging section 8 is provided in the inner portion of the key block 26, and the finger guide section 6 and the illuminating section 7 are provided between the display section 4 and the operating section (key block 26). As the key block 26 pivotally moves and projects, the imaging section 8 is exposed from the upper surface 101a so as to face the palm portion of a finger placed on the finger guide section 6, thereby making it possible to perform imaging of the palm portion of the finger. The key block 26 may have, for example, a spring, an engaging section, and the like so that when not performing imaging, the key block 26 is accommodated by being brought into engagement with an inner portion of the casing 101 against the spring force, and when performing imaging, the key block 26 can be made to project by the spring force by the user depressing a button provided in a side surface or the like of the casing 101. The authentication operation in the portable telephone 50 is the same as that described with reference to each of the above-mentioned embodiments.

Due to the configuration as described above, by making a part of the operating section 5 be capable of projecting from the upper surface 101a as the key block 26, and providing the imaging section 8 in the key block 26, high accuracy authentication can be performed without changing the layout of the existing operating section 5 and display section, while securing the focal length between the imaging section 8 and the finger.

Figure 18:
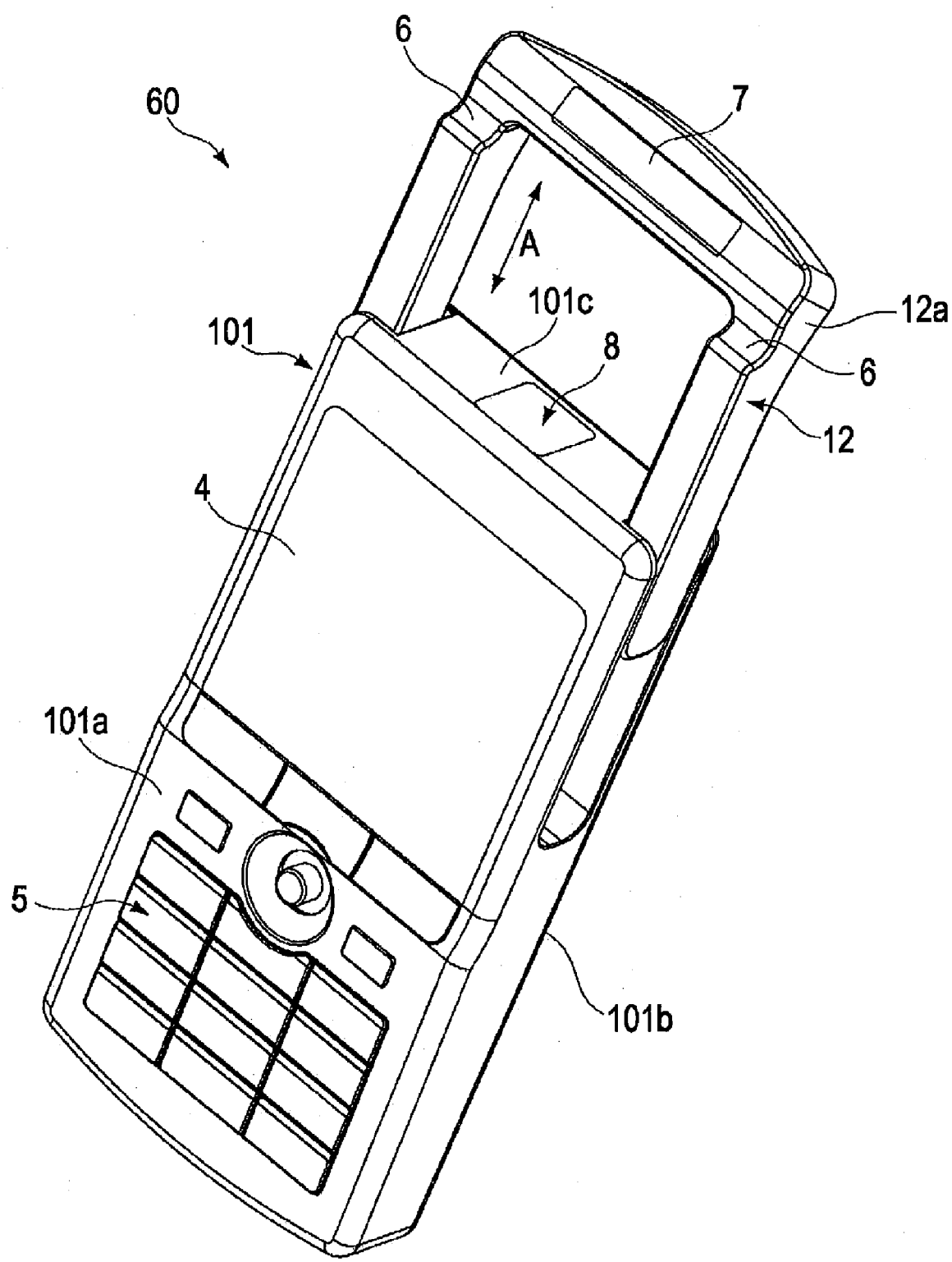
FIG. 18 is a perspective view showing the outward appearance of a portable telephone according to a sixth embodiment.

Next, a sixth embodiment will be described. FIG. 18 is a perspective view showing the outward appearance of a portable telephone 60 according to this embodiment, and FIG. 19 is a side view of the portable telephone 60 when performing authentication in the portable telephone 60 shown in FIG. 18.

Figure 19:
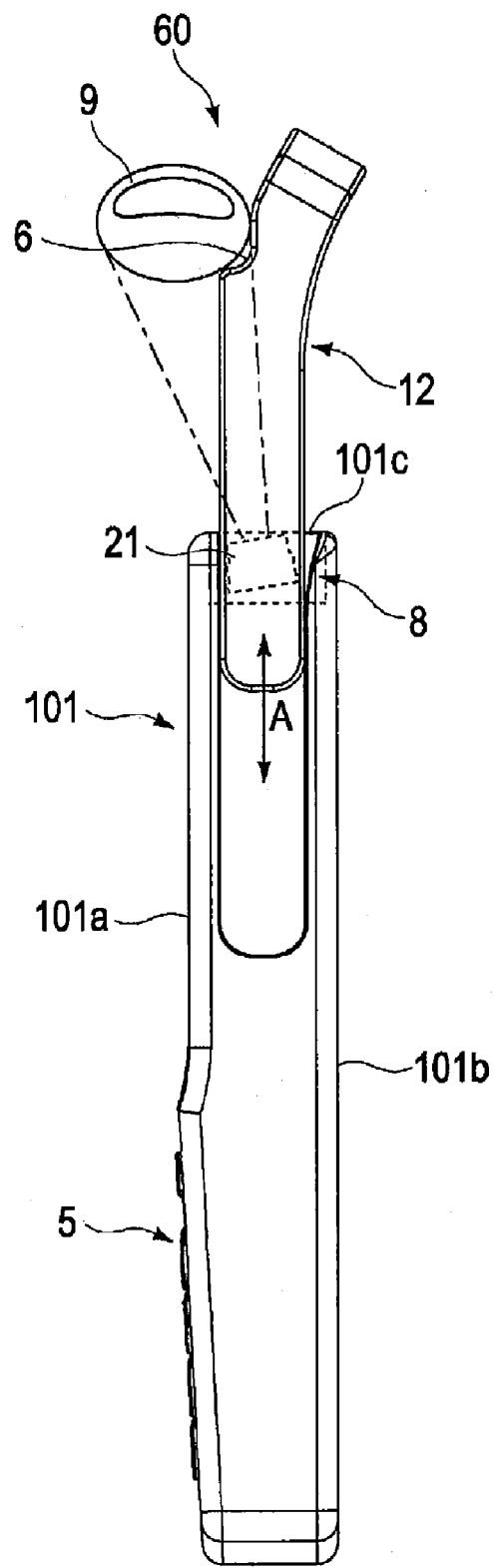
FIG. 19 is a side view of the portable telephone when performing authentication in the portable telephone shown in FIG. 18.

As shown in FIGS. 18 and 19, according to this embodiment, in the straight type portable telephone 60, an arch-shaped antenna 12 is provided at the upper end portion of the casing 101 so as to be slidable in the longitudinal direction of the casing 101 (the direction indicated by the arrow A in FIGS. 18 and 19). The antenna 12 has a curved section 12a at an end portion. The finger guide section 6 of a concave shape and the illuminating section 7 are provided in the curved section 12a. By sliding the antenna 12 so as to project from a side surface 101c of the casing 101, it is possible to enhance the radio wave reception sensitivity and also mitigate the influence of electromagnetic waves on the human body.

Further, by providing the imaging section 8 in the upper side surface 101c of the casing 101, and sliding the above-mentioned antenna 12 in the above-mentioned arrow A direction, it is possible to secure the focal length between the imaging section 8 and a finger placed on the finger guide section 6. It should be noted that as shown in FIG. 19, the camera module 21 of the imaging section 8 is provided such that its optical axis is inclined slightly with respect to the upper surface 101a, thereby making it possible to perform imaging of the palm portion of the finger 9. Further, as for the illuminating section 7 as well, the directivity of the infrared LED 43 is adjusted by the light guide 43 or the like so that infrared light is radiated toward the back side of the finger. The authentication operation in the portable telephone 60 is the same as that described with reference to each of the above-mentioned embodiments.

Due to the configuration as described above, by taking advantage of the slidability of the antenna 12, the finger guide section 6 and the illuminating section 7 are provided in the antenna 12, and the focal length between the imaging section 8 and the finger 9 necessary for performing authentication is secured, thereby making it possible to perform high accuracy authentication.

Figure 20:
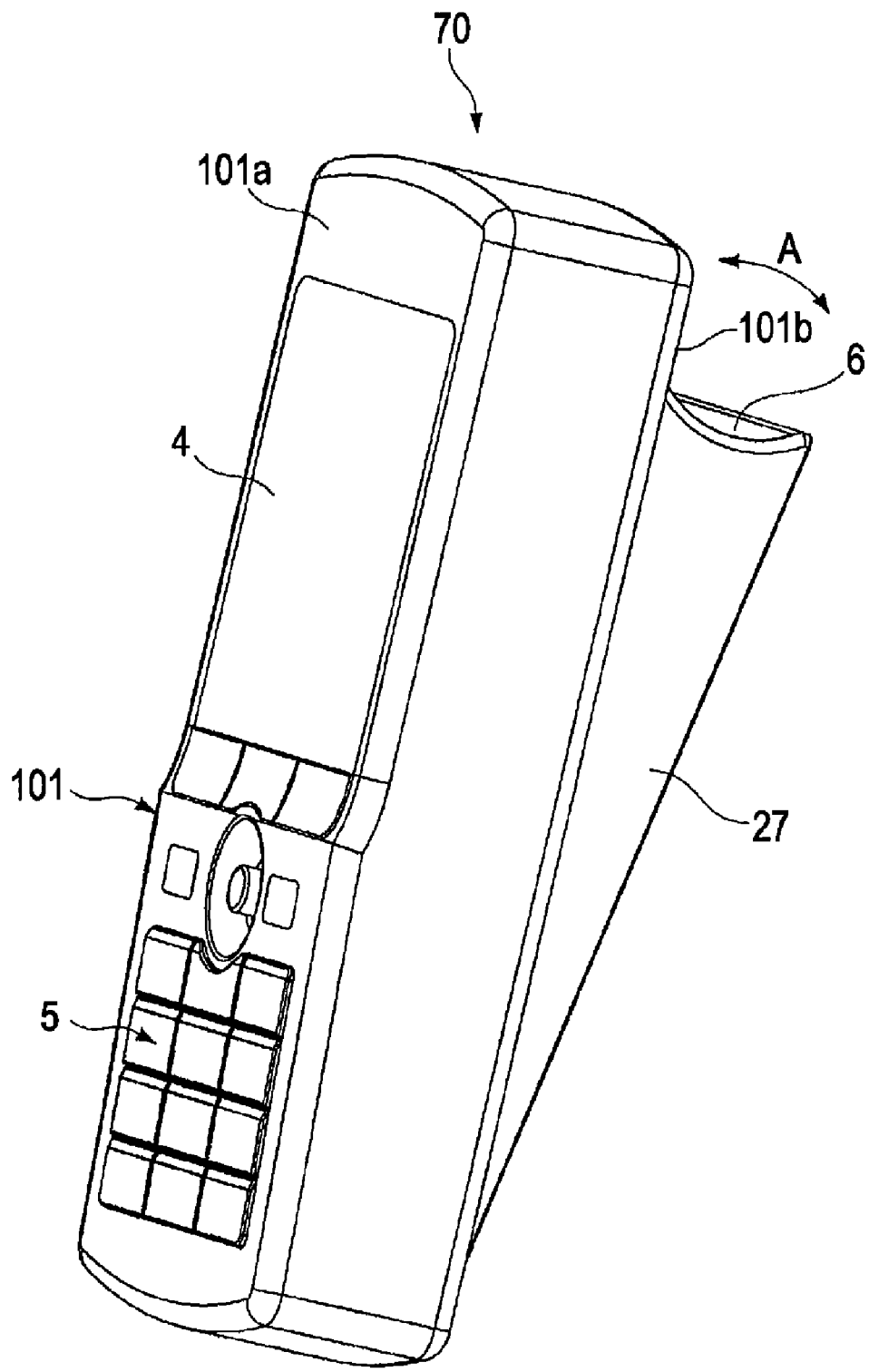
FIG. 20 is a perspective view showing the outward appearance of a portable telephone according to a seventh embodiment as seen from the top surface side.
Figure 21:
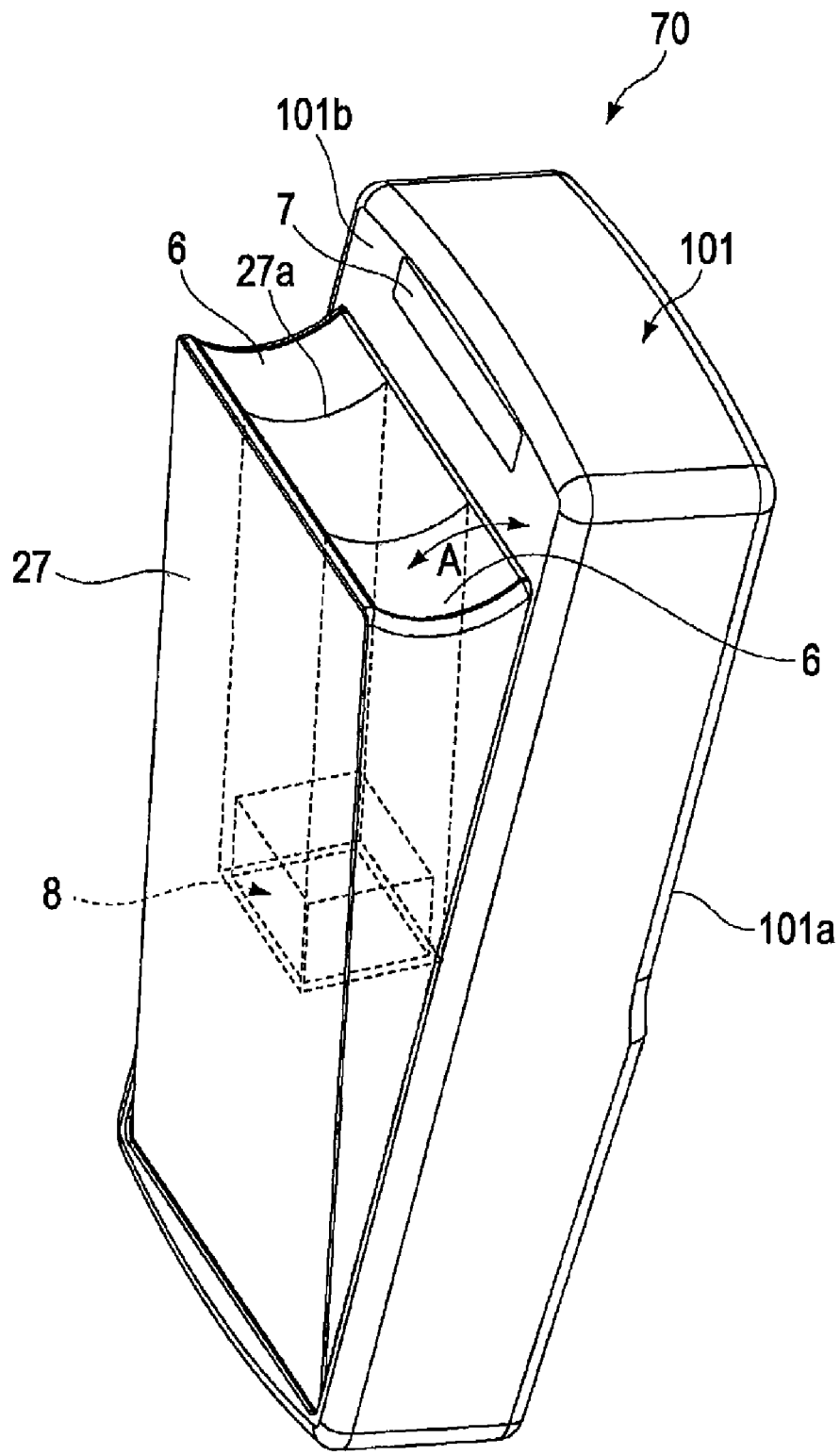
FIG. 21 is a perspective view showing the outward appearance of the portable telephone shown in FIG. 20 as seen from the back surface side.
Figure 22:
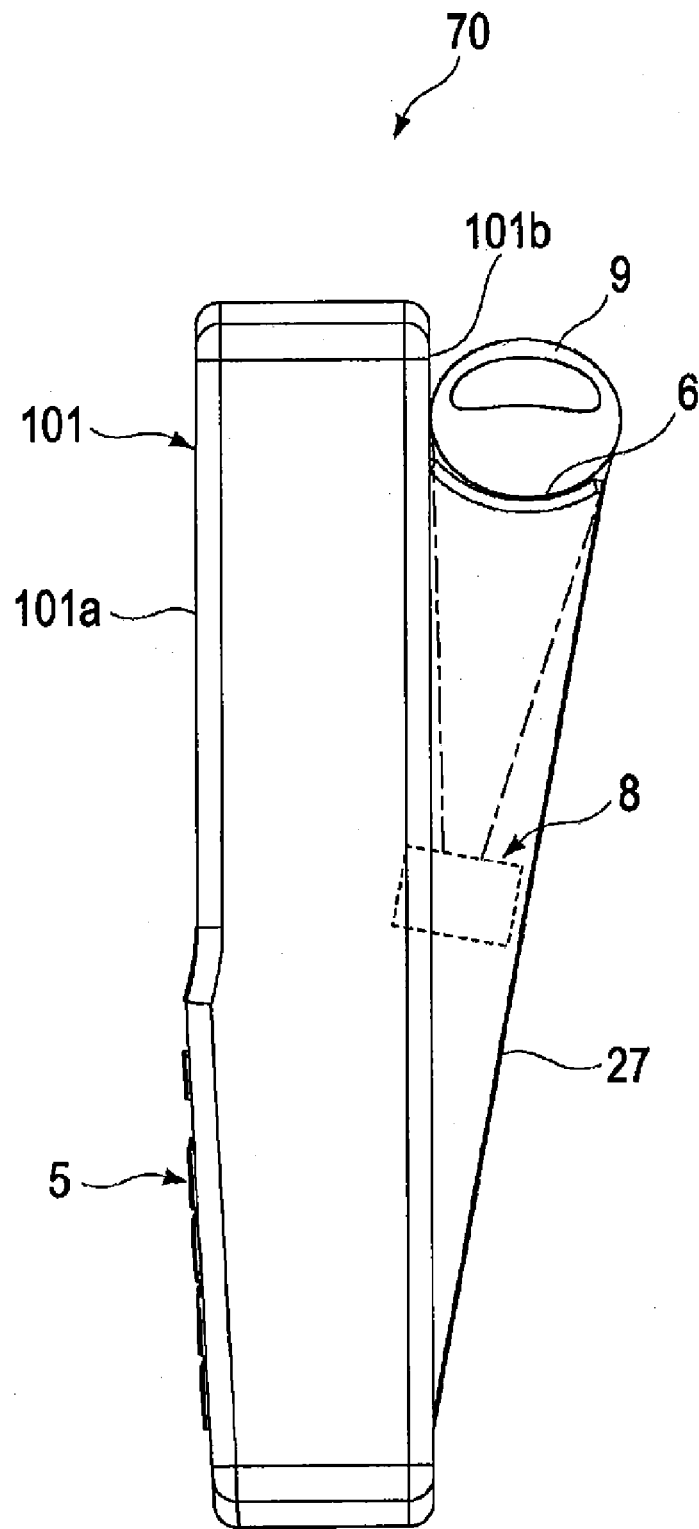
FIG. 22 is a side view of the portable telephone when performing authentication in the portable telephone shown in FIGS. 20 and 21.

Next, a seventh embodiment will be described. FIG. 20 is a perspective view showing the outward appearance of a portable telephone 70 according to this embodiment as seen from the top surface side. FIG. 21 is a perspective view showing the outward appearance of the portable telephone shown in FIG. 20 as seen from the back surface side. FIG. 22 is a side view of the portable telephone 70 when performing authentication in the portable telephone 70 shown in FIGS. 20 and 21.

As shown in FIGS. 20 to 22, according to this embodiment, in the straight type portable telephone 70, a retaining block 27 that retains the imaging section 8 is provided in a back surface 101b of the casing 101, and the retaining block 27 can be made to project from the back surface 101b through pivotal movement about the lateral axis of the casing 101.

Specifically, the imaging section 8 is provided in the inner portion of the retaining block 27, and an optical path 27a extending from the imaging section 8 to a side surface at an end portion of the retaining block 27 is formed. When not performing imaging, the retaining block 27 is accommodated in the casing 101, and when performing imaging, the imaging section 8 and the optical path 27 can be exposed from the back surface 101b through the above-mentioned pivotal movement. Further, a concave portion is provided in a side surface at an end portion of the retaining block 27 to serve as the finger guide section 6, and the illuminating section 7 is provided in the back surface 101b in proximity to the finger guide section 6. The authentication operation in the portable telephone 70 according to this embodiment is the same as that in each of the embodiments mentioned above.

Due to the configuration as described above, the imaging potion 8 is accommodated in the retaining block, and the optical path 27a of the retaining block 27 is covered with the palm portion of the finger at the time of authentication, thereby preventing external light from entering the imaging section 8 to enable high accuracy authentication. When not performing authentication, the finger guide section 6 can be accommodated into the casing 101, thereby enhancing the design of the portable telephone 70 as compared with the case where a concave portion, a convex portion, or the like is provided in the back surface 101b.

Figure 23:
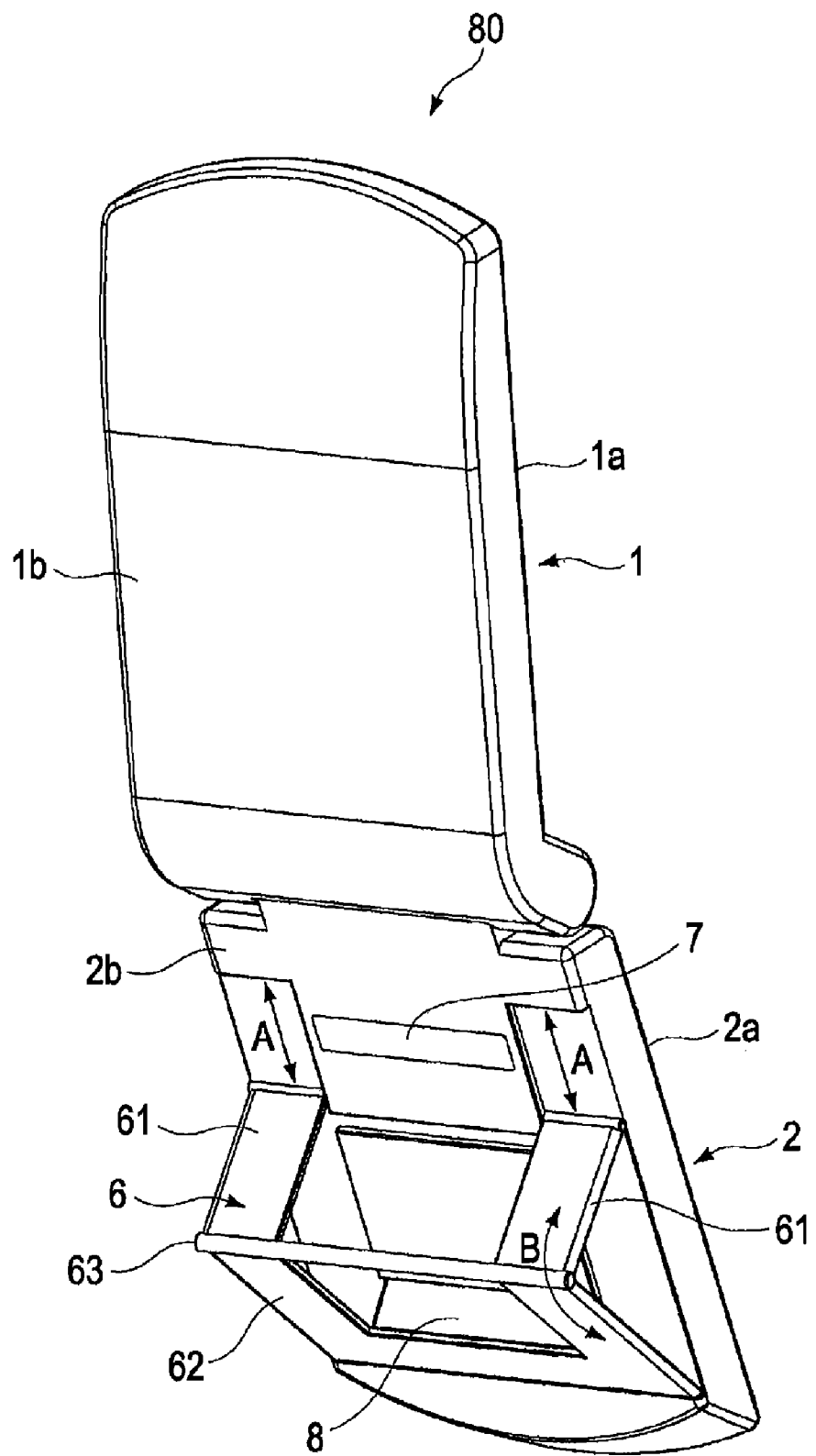
FIG. 23 is a perspective view showing the outward appearance of a portable telephone according to an eighth embodiment.

Next, an eighth embodiment will be described. FIG. 23 is a perspective view showing the outward appearance of a portable telephone 80 according to this embodiment, and FIG. 24 is a side view of the portable telephone 80 when performing authentication in the portable telephone 80 shown in FIG. 23.

Figure 24:
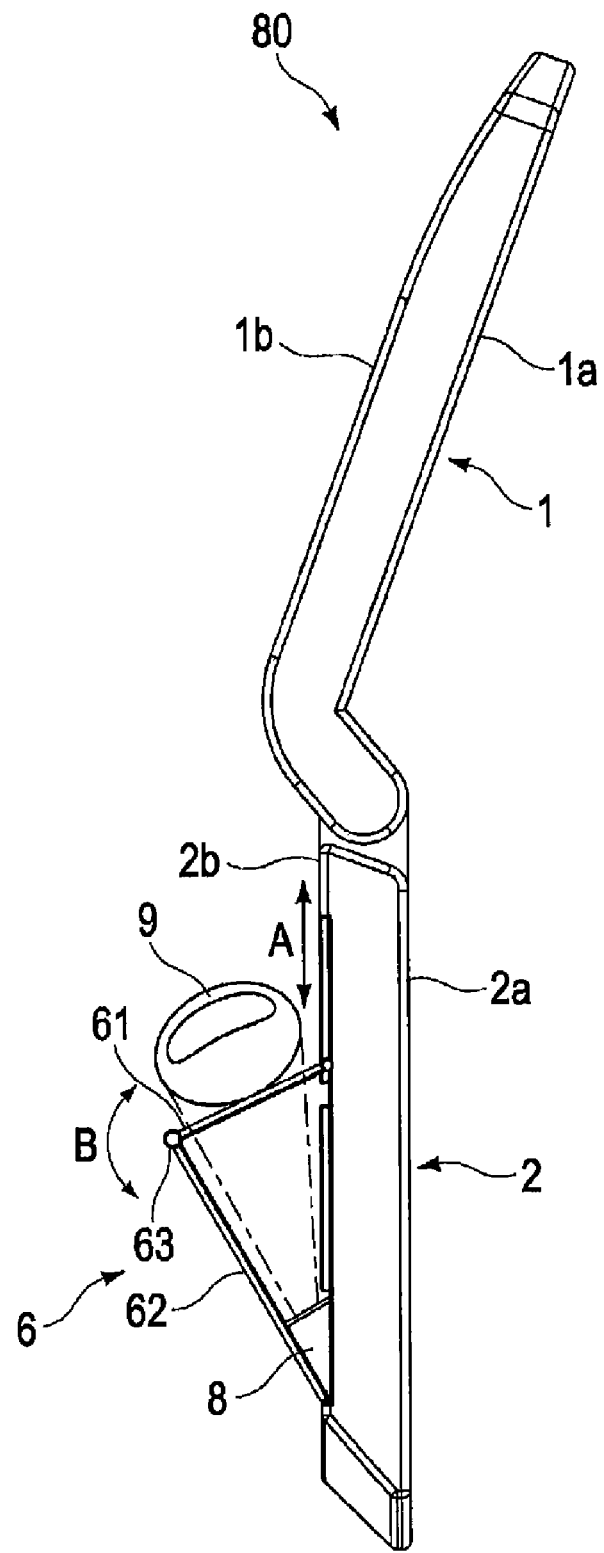
FIG. 24 is a side view of the portable telephone when performing authentication in the portable telephone shown in FIG. 23.

As shown in FIGS. 23 and 24, according to this embodiment, in the folding type portable telephone 80, the finger guide section 6 in the form of a plate frame is provided in the outer surface 2b of the second casing 2 so as to be capable of projecting from the outer surface 2b. That is, in the finger guide section 6, a first frame plate 61 and a second frame plate 62 are capable of pivotal movement in the direction indicated by the arrow B via a hinge 63. In accordance with this pivotal movement, an end portion of the first frame plate 61 slides in the direction indicated by the arrow A, thereby allowing both the frame plates 61 and 62 to project from the outer surface 2b with the above-mentioned hinge section 63 as the center. Further, the illuminating section 7 is provided in the portion of the outer surface 2b between the outer surface 2b and the second frame plate.

The imaging section 8 is provided in the back surface of the second frame plate 62. The imaging section 8 can project from the inner portion of the second casing 2 in accordance with the projecting movement of the finger guide section 6. As shown in FIG. 24, when, in the state with the finger guide section 6 and the imaging section 8 being projected, the user places a finger such that the palm portion of the finger faces the first frame plate 61 thus projected, it becomes possible to performing the imaging of the palm portion of the finger. Further, the illuminating section 7 is provided so as to be located below the finger being placed. When not performing imaging, the first frame plate 61 and the second frame plate 62 are accommodated in the outer surface 2b so as to be in parallel to the outer surface 2b, and the imaging section 8 is accommodated in the second casing 2. At the time of authentication, the finger placement method and authentication procedure are displayed on the main display section 4 provided in the inner surface 1a of the first casing 1, and the user performs authentication in accordance with this display. The authentication operation in the portable telephone 80 is the same as that described with reference to each of the above-mentioned embodiments.

Due to the configuration as described above, the finger guide section 6, the illuminating section 7, and the imaging section 8 are all provided in the outer surface 1b of the second casing 2, thereby making it possible to perform high accuracy authentication by securing a focal length required for authentication, irrespective of the components in the inner surfaces of the first casing 1 and second casing 2. Further, since authentication is performed while showing the user the main display section 4 in the inner surface 2a of the first casing, the imaging section 8 tends to lie in the shadow of the second casing 2, which also makes it possible to shield external light entering the imaging section 8. It is possible, of course, to provide the finger guide section 6 configured in the manner as in this embodiment to a straight type portable telephone.

Figure 25:
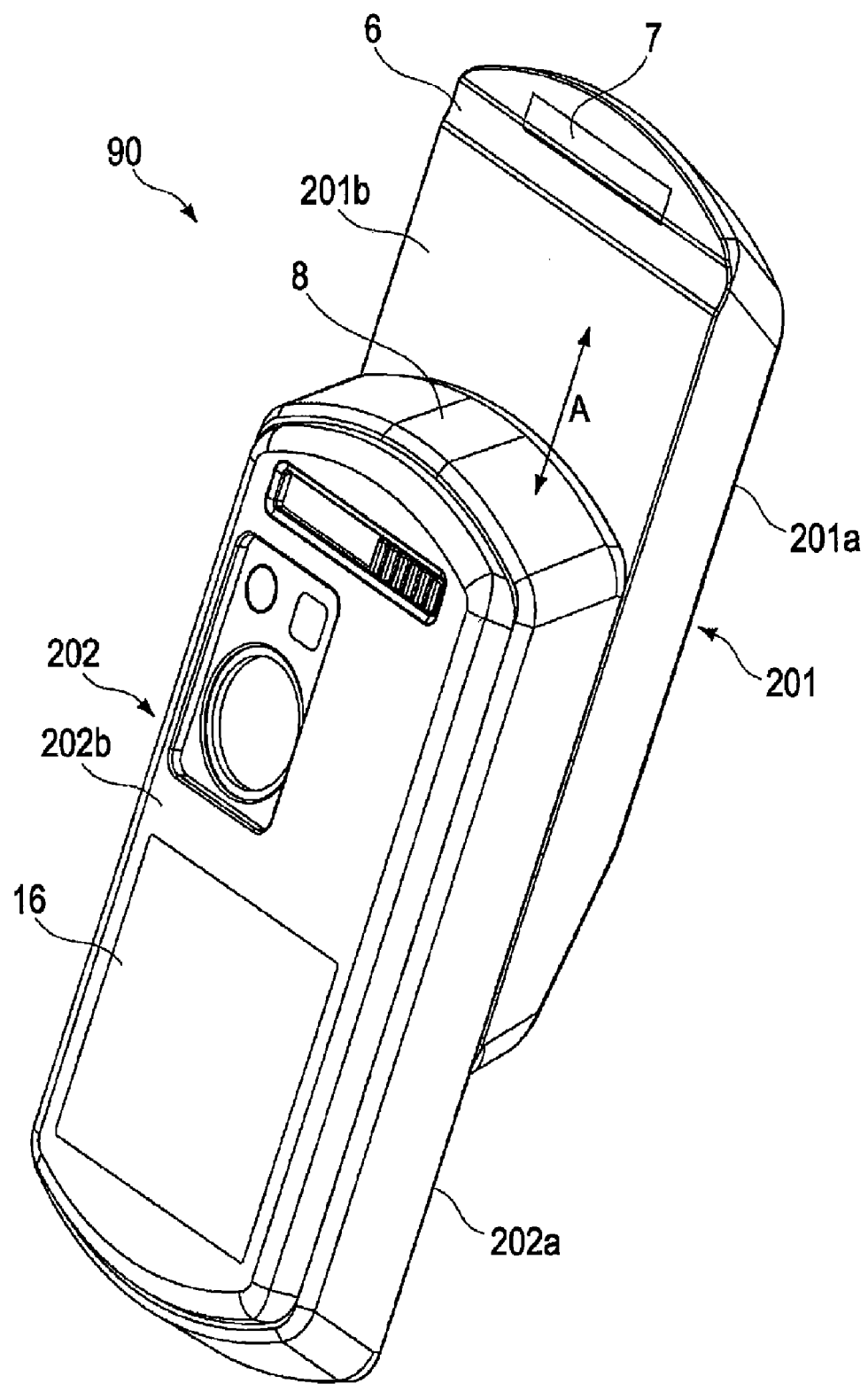
FIG. 25 is a perspective view showing the outward appearance of a portable telephone according to a ninth embodiment.

Next, a ninth embodiment will be described. FIG. 25 is a perspective view showing the outward appearance of a portable telephone 90 according to this embodiment.

As shown in FIG. 25, the portable telephone 90 according to this embodiment is a so-called slide type portable telephone which can be opened/closed as a first casing 201 and a second casing 202 slide in the direction indicated by the arrow A in FIG. 25. The main display section 4 (not shown) is provided in an upper surface 201a of the first casing 201, and the operating section 5 (not shown) is provided in an upper surface 202a of the second casing 202. The operating section 5 can be exposed from the upper surface 202a through sliding motion in the above-mentioned direction indicated by the arrow A.

The finger guide section 6 and the illuminating section 7 are provided at the upper end portion of a back surface 201b of the first casing 201, and the imaging section 8 is provided at the upper end portion of the second casing 202. At the time of authentication, the distance between a finger placed on the finger guide section 6 and the imaging section 8 can be secured through sliding motion of the first or second casing in the above-mentioned direction indicated by the arrow A. Further, at the time of authentication, the finger placement method and the authentication procedure are displayed in the sub display section 16 provided in a back surface 202b of the second casing 202. The authentication operation in the portable telephone 90 is the same as that in each of the above-mentioned embodiments.

Due to the configuration as described above, by taking advantage of the slidability of the first casing 201 and second casing 202, the focal length between the finger and the imaging section 8 is secured, thereby enabling high accuracy authentication. It should be noted that it is also possible to provide the finger guide section 6 and the illuminating section 7 in the upper surface 202a of the second casing, and provide the imaging section 8 at the lower end portion of the first casing 201. The same effect as that described above can be attained in this case as well.

It is a matter of course that the present application is not limited to the above-described embodiments but various modifications can be made to the present application without departing from the scope of the present application.

While in the above-mentioned embodiments the IR transmission filter 37 and the band-pass filter 38 are used in combination, it is also possible, for example, to use only the band-pass filter 38.

In the above-mentioned embodiments, the illuminating section 7 is provided so as to radiate infrared light in a direction substantially perpendicular to a predetermined surface (inner surface or outer surface, or upper surface or back surface) of the casing, and the finger is placed such that its placement angle becomes 0° to 40° with respect to the radiation direction. However, it is also possible to place the finger such that the palm portion of the finger (the above-mentioned centerline) becomes substantially perpendicular to each surface (such that the side portion of the finger becomes substantially parallel to each surface), and provide the illuminating section 7 such that the radiation angle of infrared light with respect to each surface is inclined within the above-mentioned angular range.

While in the above-described first embodiment the finger guide section 6 and the illuminating section 7 are separately provided, the finger guide section 6 may not be provided with a concave portion, and the convex portion of the light guide 41 may be used as the finger guide section 6 as it is. In this case, the user places a finger such that the side portion of the finger abuts the convex portion of the light guide 41.

In the folding type portable telephone according to the first to third embodiments mentioned above, the imaging section 8 may be configured so as to be capable of imaging a finger irrespective of whether the first casing 1 and the second casing 2 are open or closed. In this case, the imaging section 8 may be provided so as to pivot in accordance with the opening/closing of the casings so that its optical axis is always directed toward the palm portion of the finger.

Figure 26:
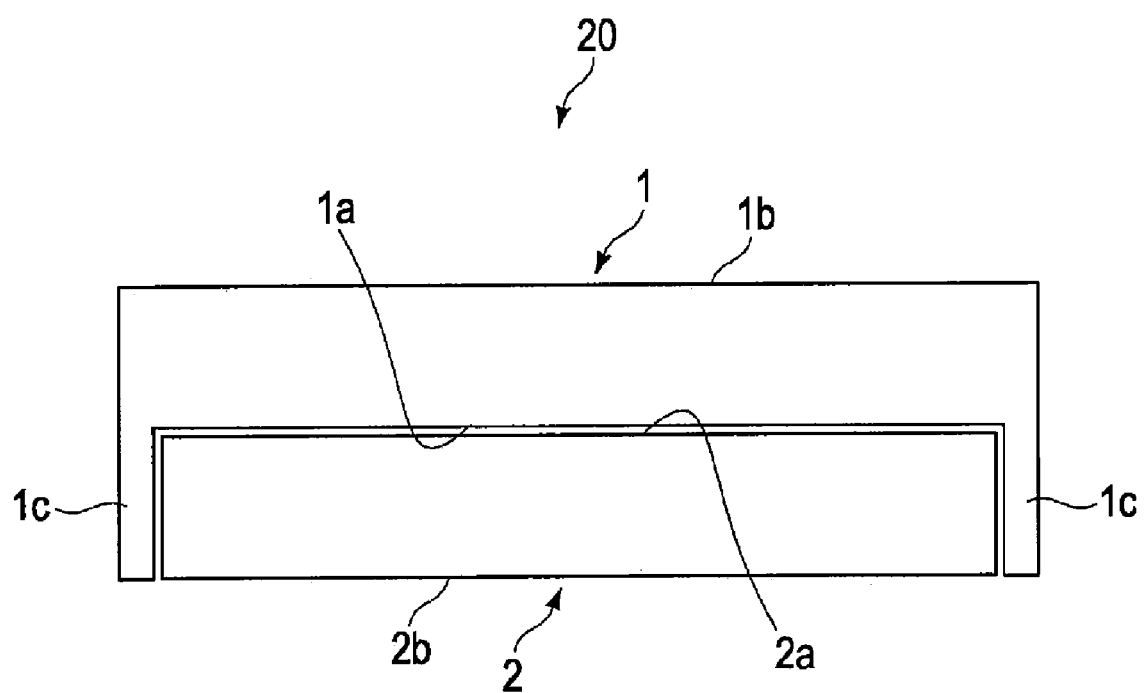
FIG. 26 is a view showing skirt sections provided in the first casing, according to a modification of the second embodiment.
Figure 27A:
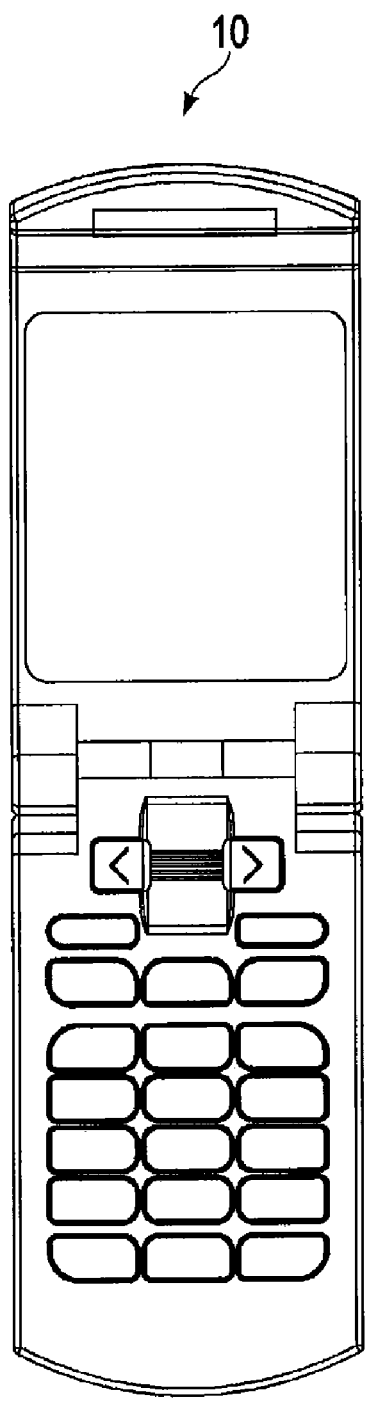
FIGS. 27A and 27B are a front view and a back view, respectively, of the portable telephone according to the first embodiment when opened.
Figure 27B:
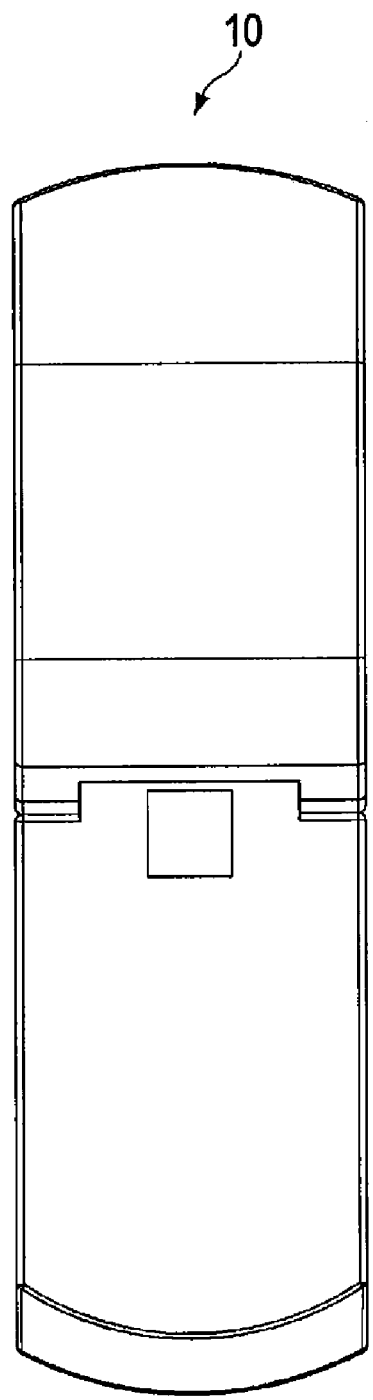
Figure 29A:
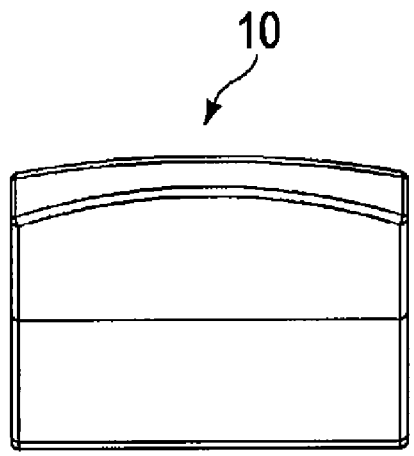
FIGS. 29A and 29B are a plan view and a bottom view, respectively, of the portable telephone according to the first embodiment when opened.
Figure 29B:
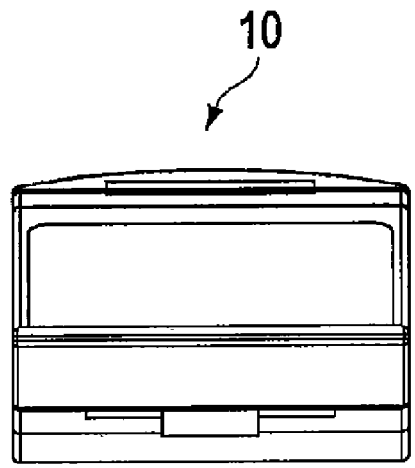
Figure 30A:
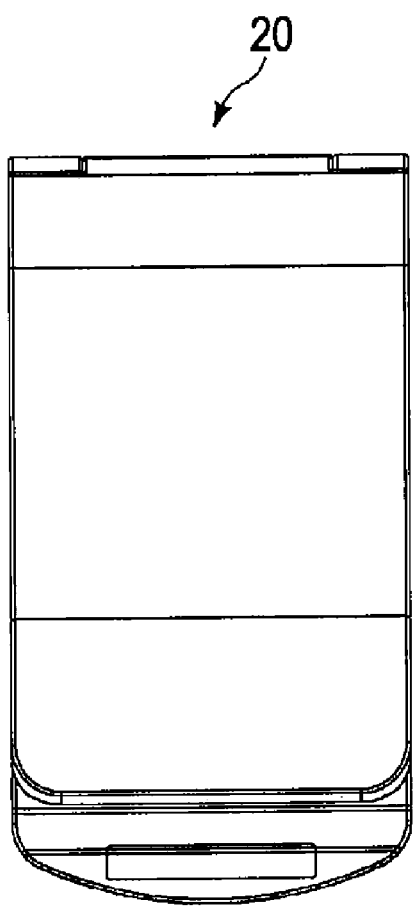
FIGS. 30A and 30B are a front view and a back view, respectively, of the portable telephone according to the second embodiment when closed by a predetermined angle.
Figure 30B:
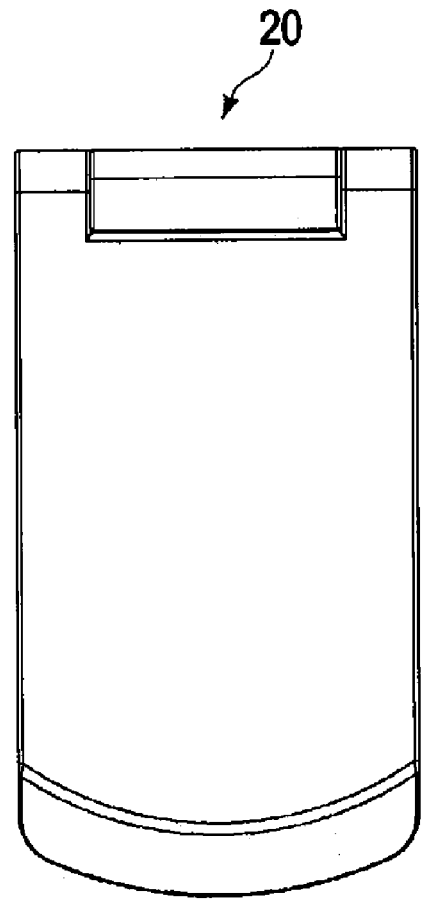
Figure 31A:
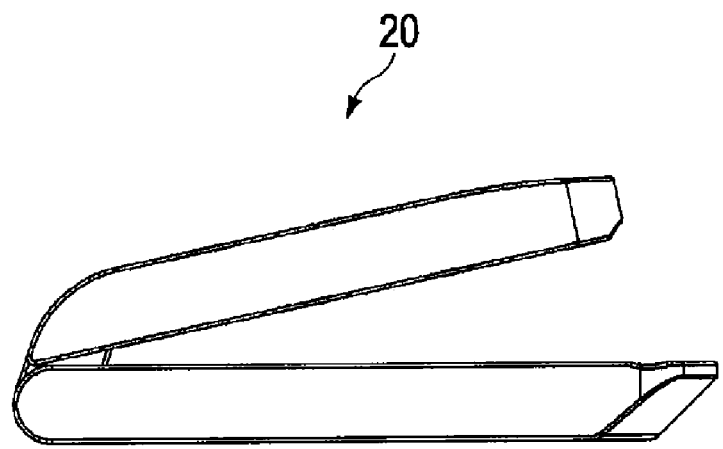
FIGS. 31A and 31B are a left side view and a right side view, respectively, of the portable telephone according to the second embodiment when closed by a predetermined angle.
Figure 31B:
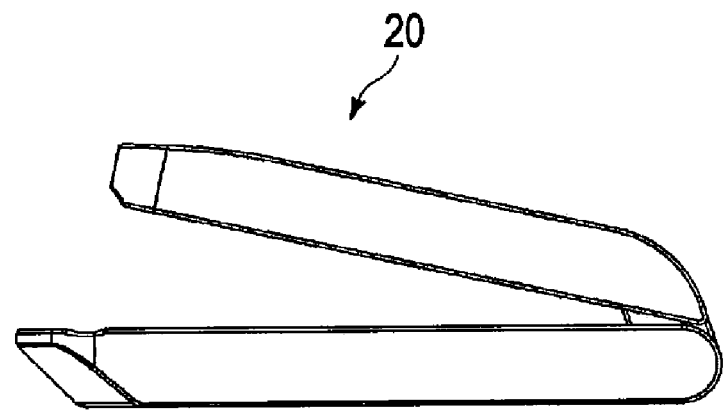
Figure 32A:
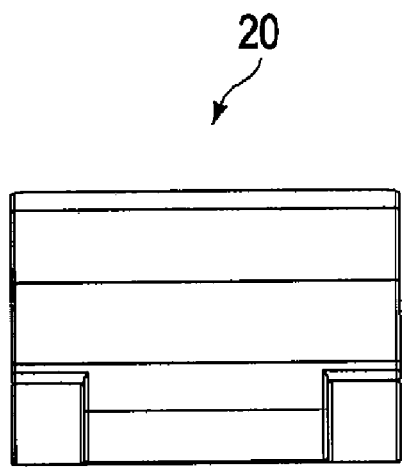
FIGS. 32A and 32B are a plan view and a bottom view, respectively, of the portable telephone according to the second embodiment when closed by a predetermined angle.
Figure 32B:
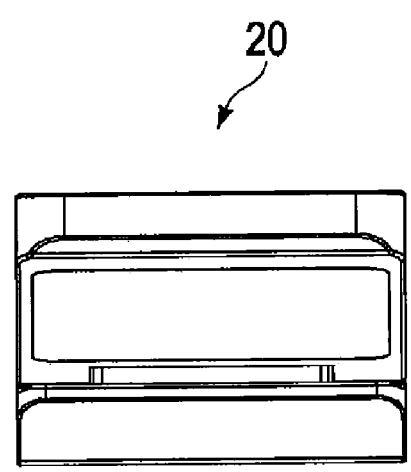
Figure 34A:
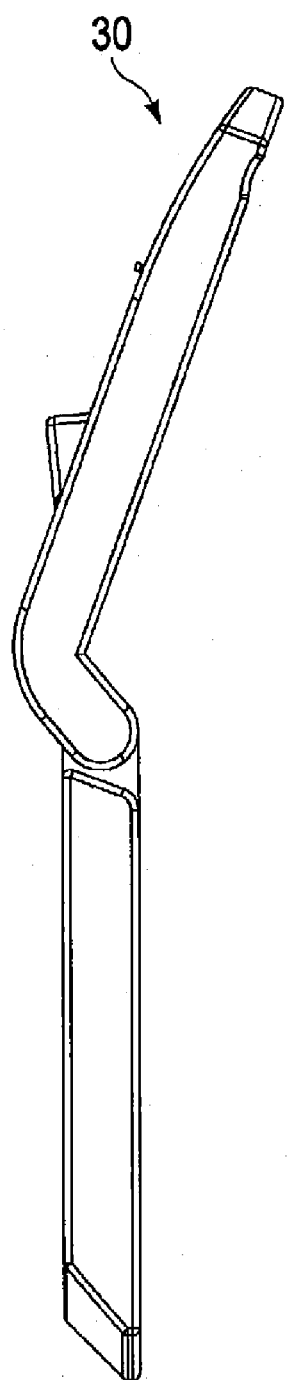
FIGS. 34A and 34B are a left side view and a right side view, respectively, of the portable telephone according to the third embodiment when opened.
Figure 34B:
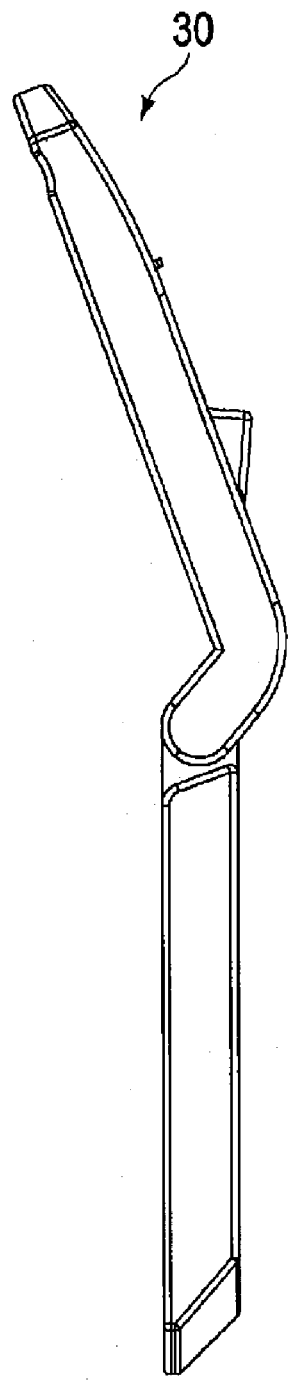
Figure 35A:
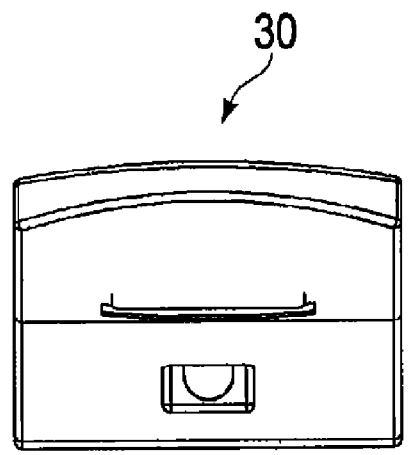
FIGS. 35A and 35B are a plan view and a bottom view, respectively, of the portable telephone according to the third embodiment when opened.
Figure 35B:
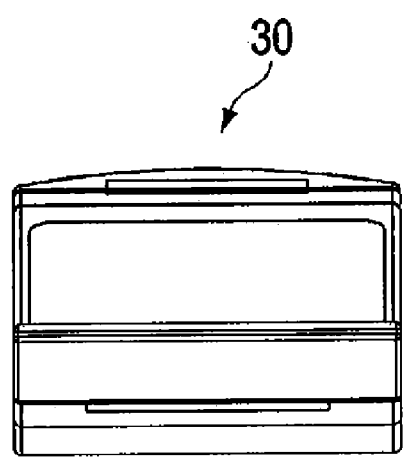
Figure 37A:
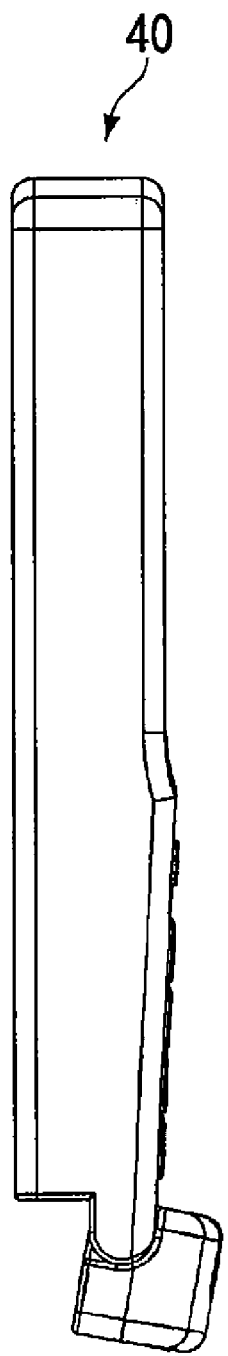
FIGS. 37A and 37B are a left side view and a right side view, respectively, of the portable telephone according to the fourth embodiment with the retaining block projected.
Figure 37B:
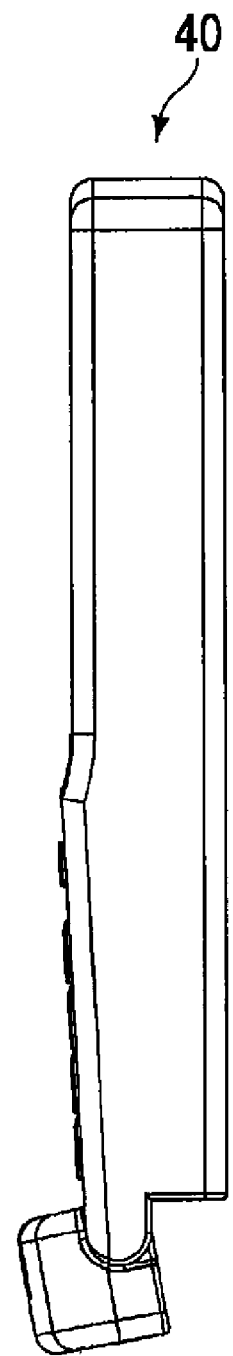
Figure 38A:
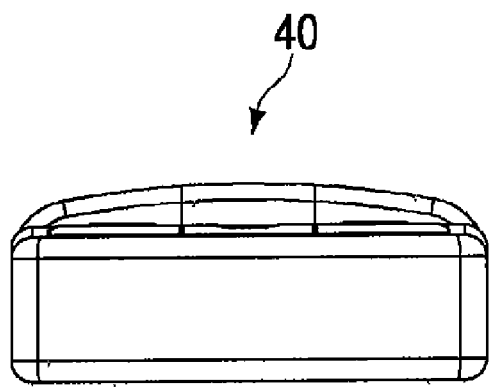
FIGS. 38A and 38B are a plan view and a bottom view, respectively, of the portable telephone according to the fourth embodiment with the retaining block projected.
Figure 38B:
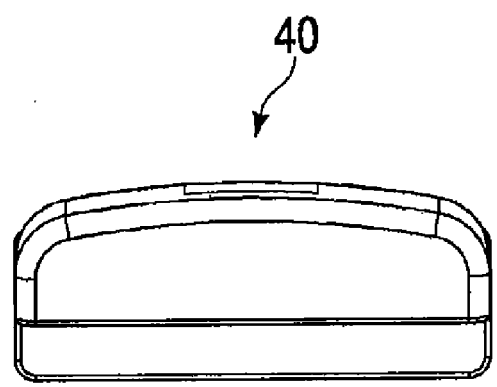
Figure 39A:
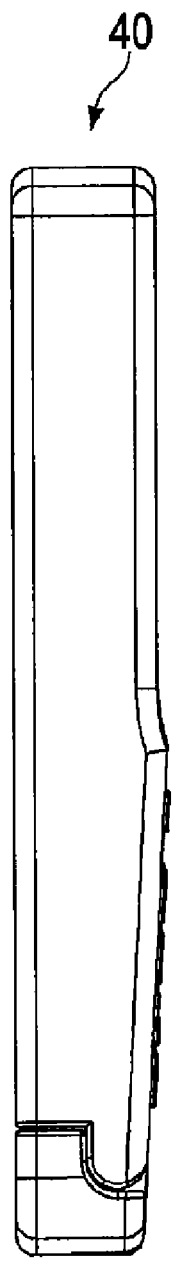
FIGS. 39A and 39B are a left side view and a right side view, respectively, of the portable telephone according to the fourth embodiment with the retaining block accommodated.
Figure 39B:
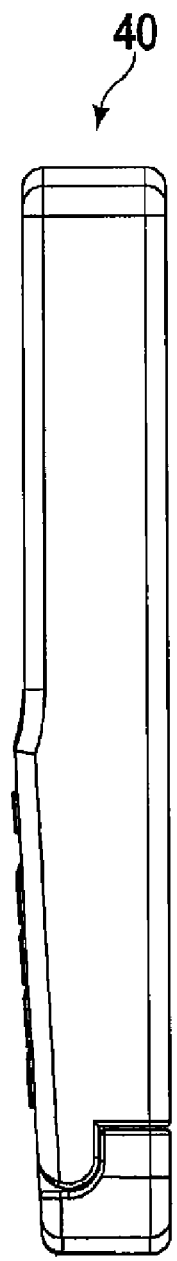
Figure 41A:
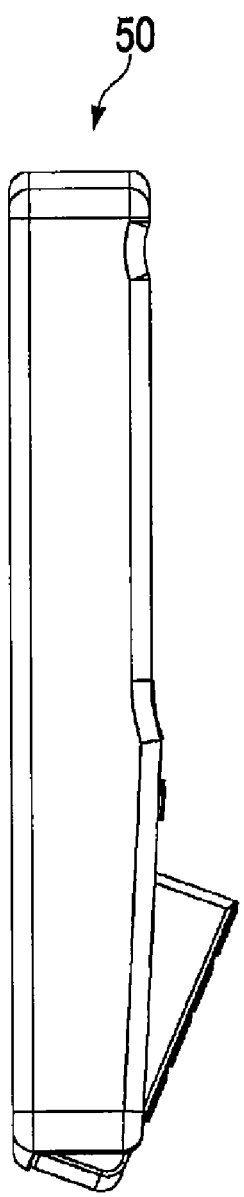
FIGS. 41A and 41B are a left side view and a right side view, respectively, of the portable telephone according to the fifth embodiment with the key block projected.
Figure 41B:
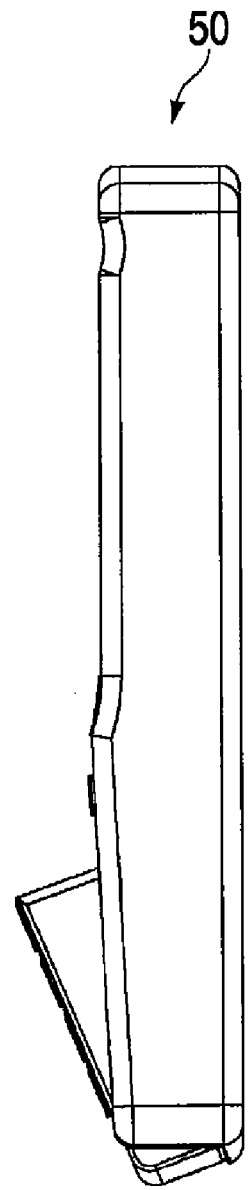
Figure 42A:
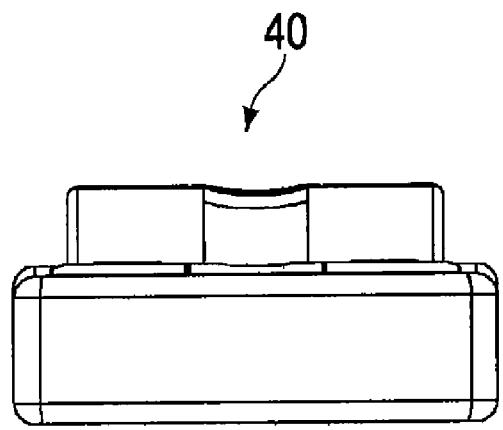
FIGS. 42A and 42B are a plan view and a bottom view, respectively, of the portable telephone according to the fifth embodiment with the key block projected.
Figure 42B:
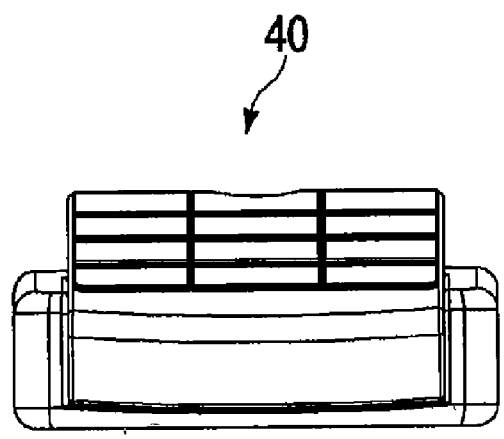
Figure 45A:
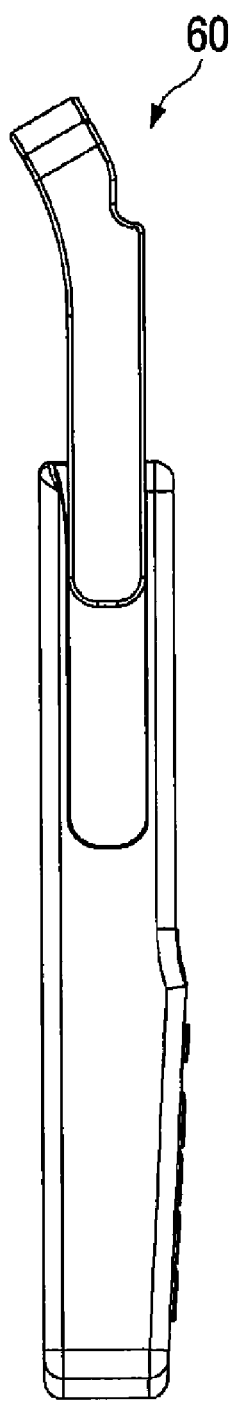
FIGS. 45A and 45B are a left side view and a right side view, respectively, of the portable telephone according to the sixth embodiment with the antenna projected.
Figure 45B:
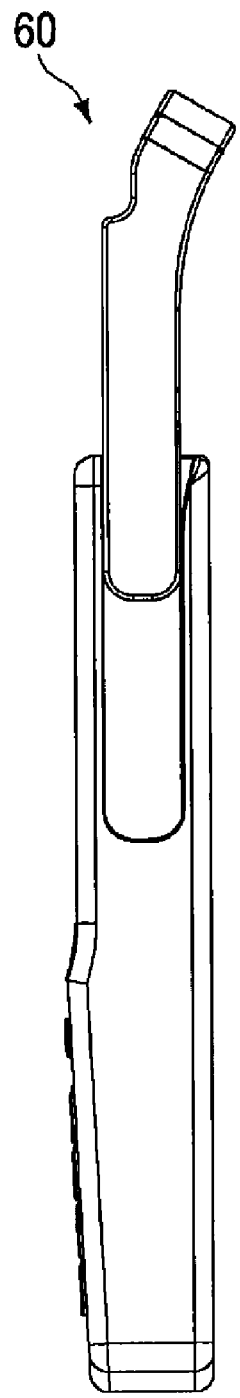
Figure 46A:
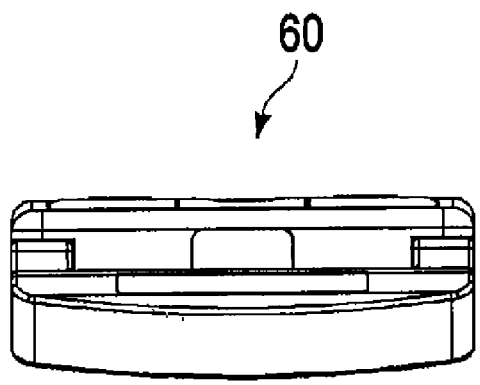
FIGS. 46A and 46B are a plan view and a bottom view, respectively, of the portable telephone according to the sixth embodiment with the antenna projected.
Figure 46B:
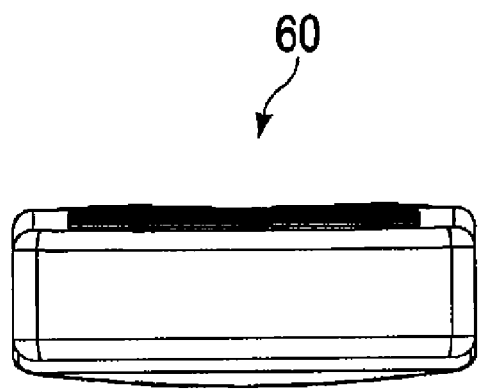
Figure 47A:
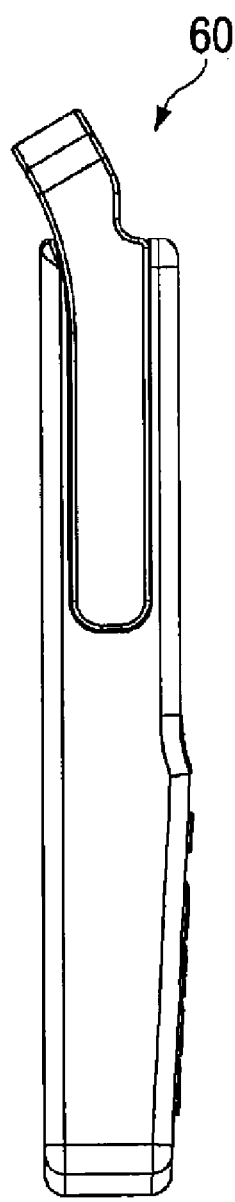
FIGS. 47A and 47B are a left side view and a right side view, respectively, of the portable telephone according to the sixth embodiment with the antenna accommodated.
Figure 47B:
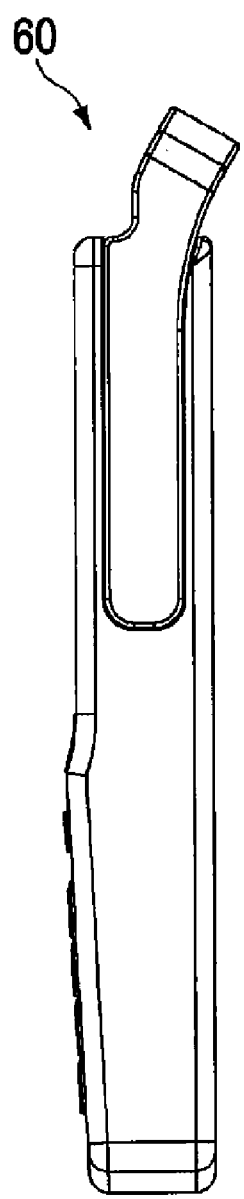
Figure 50A:
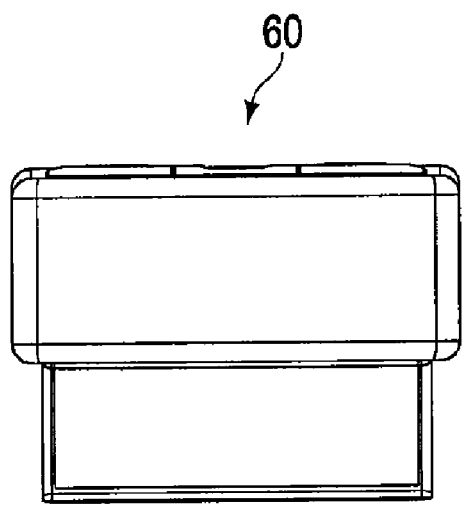
FIGS. 50A and 50B are a plan view and a bottom view, respectively, of the portable telephone according to the seventh embodiment with the retaining block projected.
Figure 50B:
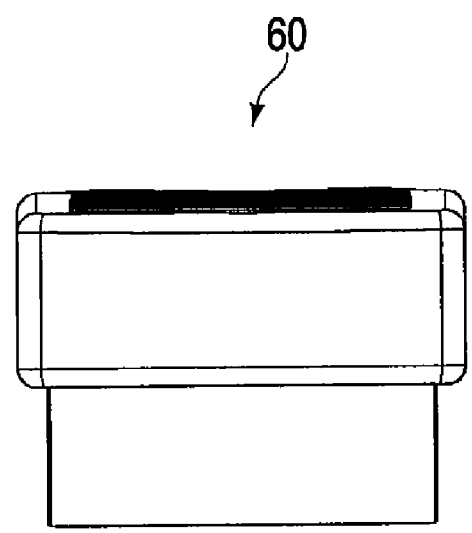
Figure 51A:
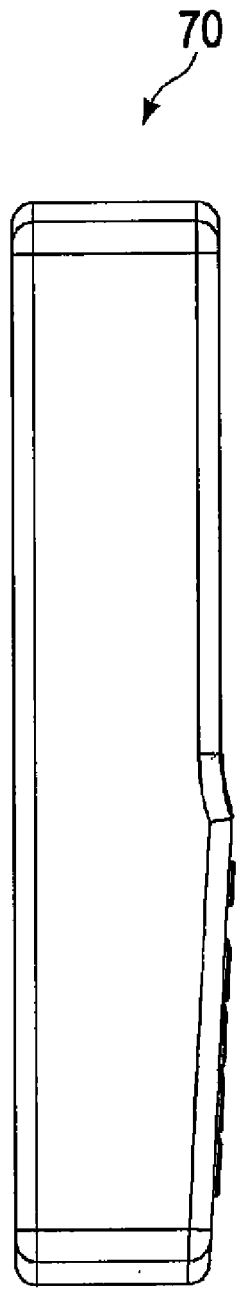
FIGS. 51A and 51B are a left side view and a right side view, respectively, of the portable telephone according to the seventh embodiment with the retaining block accommodated.
Figure 51B:
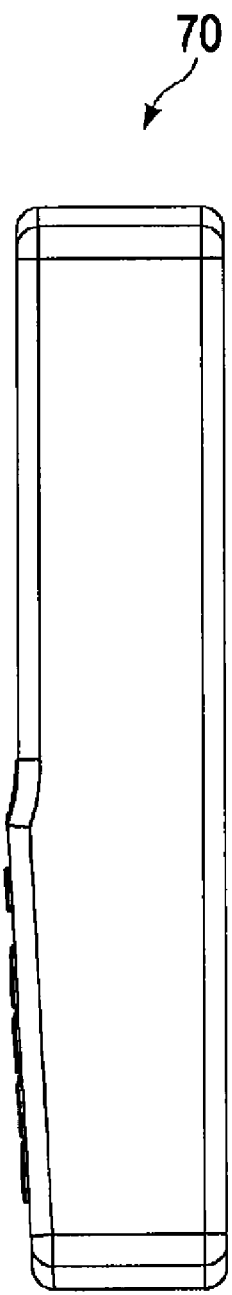
Figure 52A:
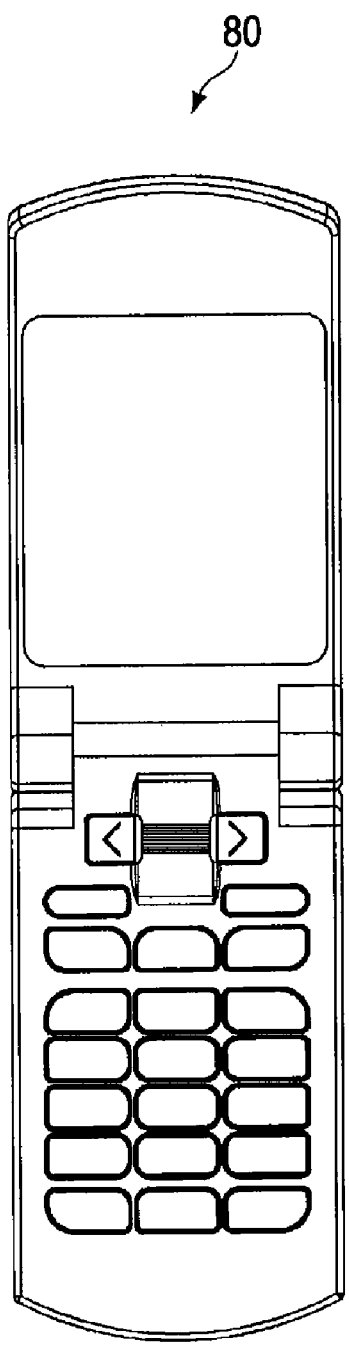
FIGS. 52A and 52B are a front view and a back view, respectively, of the portable telephone according to the eighth embodiment when opened and with a finger guide section projected.
Figure 52B:
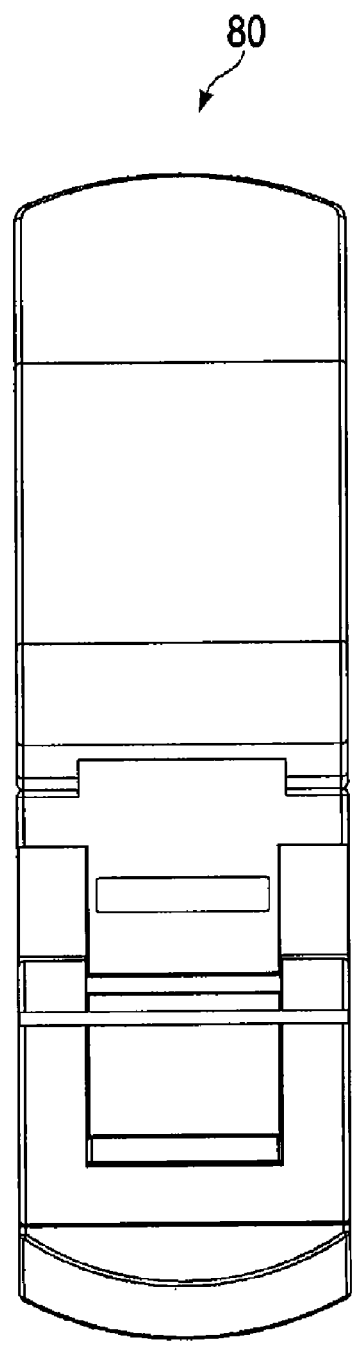
Figure 53A:
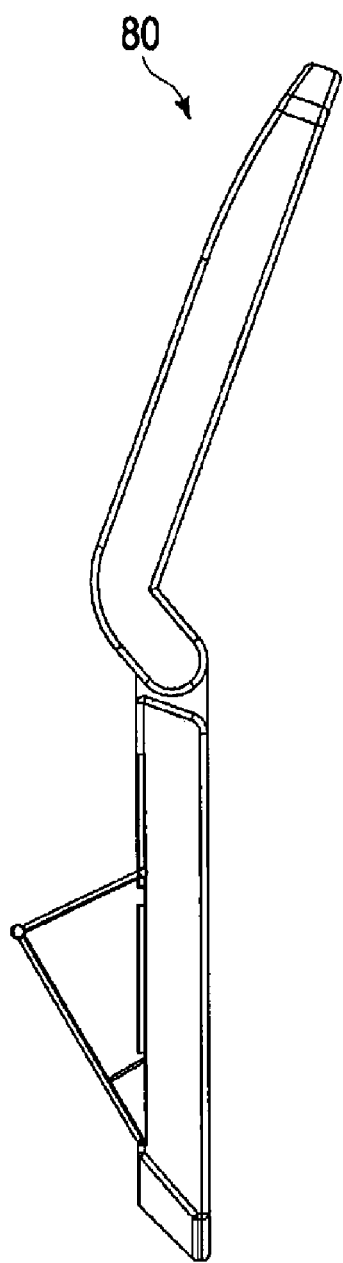
FIGS. 53A and 53B are a left side view and a right side view, respectively, of the portable telephone according to the eighth embodiment when opened and with the finger guide section projected.
Figure 53B:
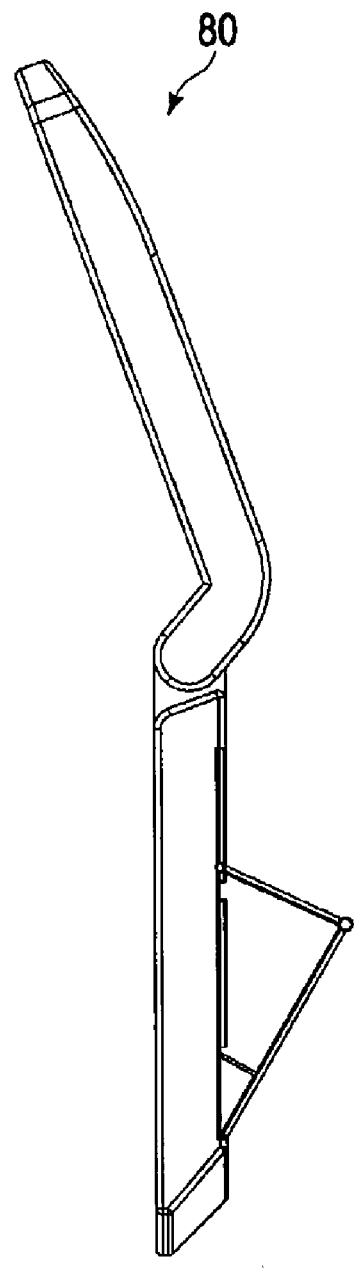
Figure 54A:
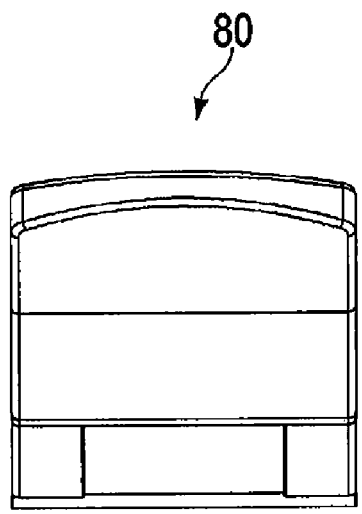
FIGS. 54A and 54B are a plan view and a bottom view, respectively, of the portable telephone according to the eighth embodiment when opened and with the finger guide section projected.
Figure 54B:
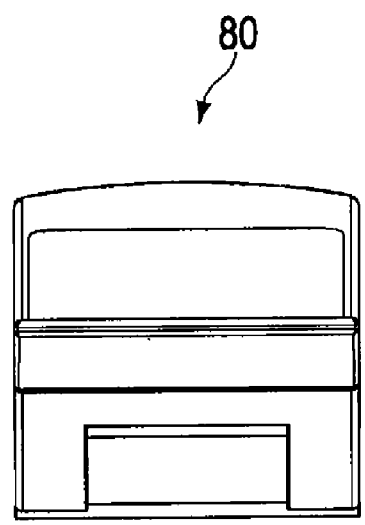
Figure 57A:
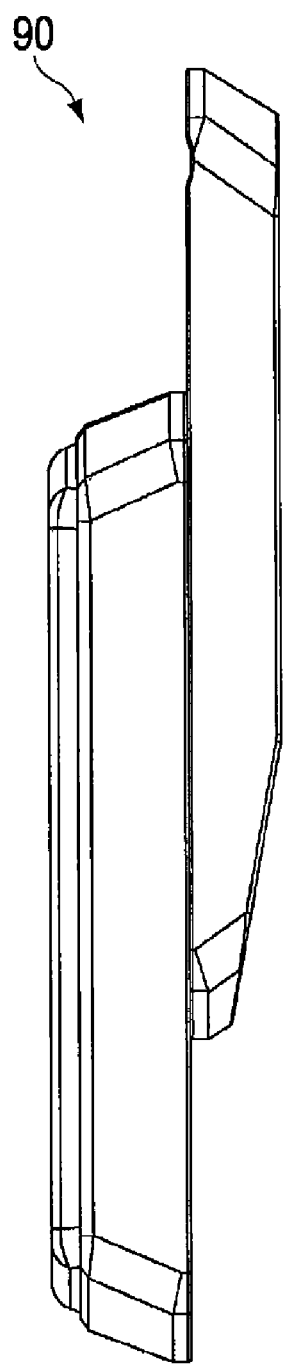
FIGS. 57A and 57B are a left side view and a right side view, respectively, of the portable telephone according to the ninth embodiment when opened.
Figure 57B:
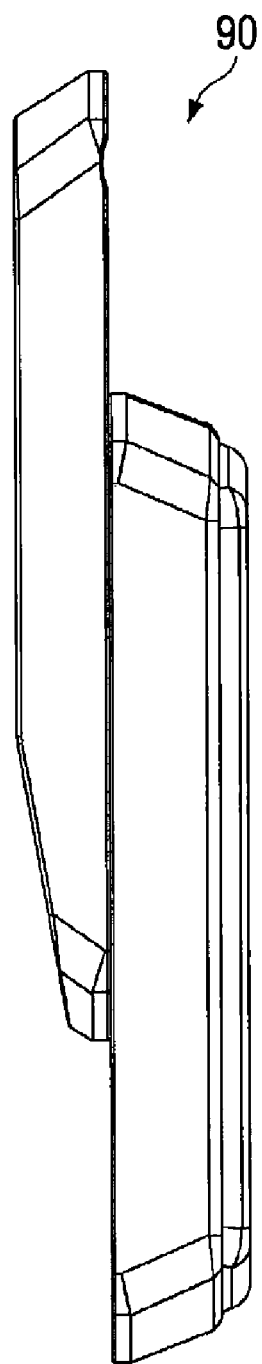
Figure 58A:
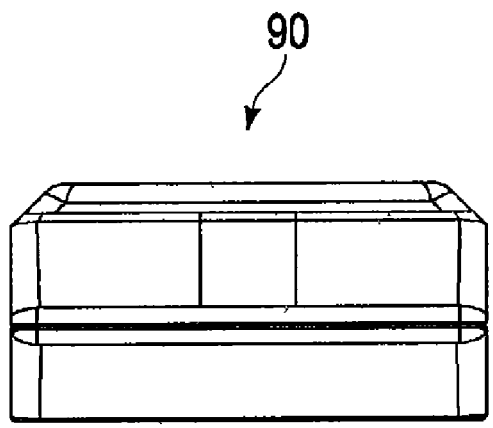
FIGS. 58A and 58B are a plan view and a bottom view, respectively, of the portable telephone according to the ninth embodiment when opened.
Figure 58B:
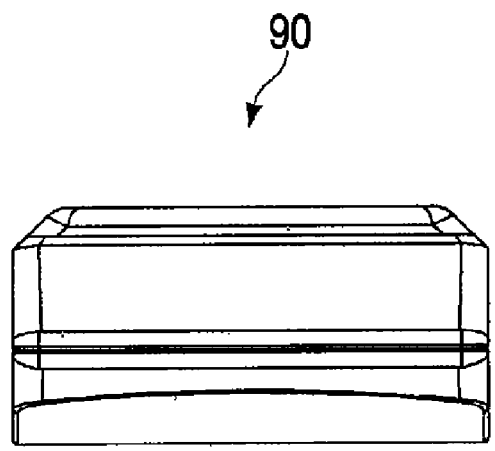

In the portable telephone 20 according to the second embodiment, plate-like skirt sections 1c may be provided in both lateral side faces of the inner surface 1a of the first casing 1 so as to project in a substantially perpendicular direction from the inner surface 1a. Accordingly, when performing authentication by closing the first casing 1 and the second casing 2 by a predetermined angle, external light entering from the direction of the side surfaces of the two casings is shielded, thereby allowing authentication to be performed with greater reliability. In this case, as shown in FIG. 26, for example, the width of the first casing 1 with respect to the lateral direction of the inner surface 1a may be designed to be larger than the width in the lateral direction of the inner surface 2a of the second casing 2, so that in the state where the first casing 1 is closed, the inner surface 2a and side surfaces of the second casing 2 are covered by the inner surface 1a and the skirt sections 1c (so that the skirt sections 1c and the side surfaces of the second casing 2 face each other).

While in the above-described embodiments the description is directed to the case where the present application is applied to each of the so-called folding type, straight type, and slide type portable telephones, other than these types of portable telephone, the present application is applicable to various types of portable telephone, such as a so-called rotary open type portable telephone, in which the first casing and the second casing are coupled together so as to be capable of pivotal movement about an axis perpendicular to the surface in which the display section is provided, or a portable telephone of a type using the combination of the folding type and rotary open type structures. Further, other than a portable telephone, the present application is also applicable to various types of portable electronic devices such as a PDA, a notebook PC (Personal Computer), an electronic dictionary, a camera, a portable audio/visual device, or a portable game device.

It should be noted that FIGS. 27 to 59 are views illustrating the six faces of each of the portable telephones 10 to 90 according to the above-mentioned first to ninth embodiments (including the states before and after an operation).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A portable telephone comprising:
   a casing having a first surface;
   a finger guide section that is provided in the first surface and guides a finger of a user to allow the finger to be placed so that a side portion of the finger faces the first surface;
   an illuminating section provided in the first surface so as to be adjacent to the finger guide section, the illuminating section being capable of radiating light of a predetermined wavelength that transmits through the placed finger;
   an imaging section provided in the casing so as to be spaced at a predetermined distance from the first surface with respect to a perpendicular direction, the imaging section being capable of imaging the light that has transmitted through the finger; and
   a control section that performs authentication of the user on the basis of an image obtained by the imaging.

2. The portable telephone according to claim 1, wherein the imaging section is provided so that when in a non-imaging state of not imaging the light, the imaging section is located on an inner side of the casing with respect to the first surface, and when in an imaging state of performing the imaging, the imaging section can be projected to a position spaced at the first distance from the first surface.

3. The portable telephone according to claim 2, further comprising a retaining block that is provided at a longitudinal end portion of the casing and retains the imaging section, the retaining block being configured to form a part of the first surface in the non-imaging state and to pivot about a lateral or longitudinal axis of the first surface in the imaging state to allow the imaging section to project.

4. The portable telephone according to claim 2, further comprising a display section and an operating section that are provided in the first surface,
   wherein the finger guide section and the illuminating section are provided between the operating section and the display section.

5. The portable telephone according to claim 4, wherein the operating section has an operation-key block that retains the imaging section and includes a plurality of key groups arrayed in a surface that forms a part of the first surface in the non-imaging state, the operation-key block being provided so that the operation-key block can be projected to expose the image section by pivoting about a lateral axis of the casing in the imaging state.

6. The portable telephone according to claim 2, further comprising:
   a display section and an operating section that are provided in a second surface opposed to the first surface; and
   a retaining block provided in the first surface so that one end of the retaining block is capable of pivotal movement about a lateral axis of the first surface, the retaining block retaining the imaging section and provided so that in the imaging state, the other end of the retaining block can be projected and exposed from the first surface through the pivotal movement,
   wherein the finger guide section is provided at the other end.

7. The portable telephone according to claim 2, further comprising a display section and an operating section that are provided in a second surface opposed to the first surface, wherein:
   the finger guide section has a projection member that becomes integral with the first surface in the non-imaging state and can be projected from the first surface in the imaging state, the projection member having a first plate having a first one end and a first other end, and a second plate having a second one end and a second other end, the first one end being connected to the first surface so as to be capable of pivotal movement about the lateral axis, the first other end and the second one end being coupled to each other so as to be capable of pivotal movement about the lateral axis, the second other end being capable of sliding in the longitudinal direction on the first surface in accordance with the pivotal movement; and
   the imaging section is provided integrally on a back surface of the first plate of the projection member and near the first one end so that the imaging section can be projected from the first surface as the projection member is projected.

8. The portable telephone according to claim 2, wherein:
   the casing has a display section provided in the first surface; and
   the finger guide section and the illuminating section, and the imaging section are provided in the first surface so as to be opposed to each other with the display section therebetween.

9. The portable telephone according to claim 4, wherein:
   the control section controls the display section to display information relating to a method of placing the finger and an authentication procedure.

10. The portable telephone according to claim 1, wherein:
    the finger guide section is provided so as to project from the first surface toward the imaging section with respect to the illuminating section.

11. The portable telephone according to claim 1, wherein:
    the imaging section has a first filter that can transmit only the light of the predetermined wavelength.

12. The portable telephone according to claim 11, wherein:
    the imaging section has a second filter that can absorb visible light.

13. The portable telephone according to claim 1, wherein:
    the illuminating section has a lens that can adjust directivity of the radiated light.

14. The portable telephone according to claim 13, wherein:
    the lens forms at least a part of the finger guide section.

15. A portable telephone comprising:
    a first casing having a first inner surface and a first outer surface opposed to the first inner surface;
    a second casing having a second inner surface and a second outer surface opposed to the second inner surface;
    a hinge section that pivotably couples the first casing and the second casing to each other so that the first casing and the second casing can be folded open and closed in half;
    a finger guide section that is provided in the first inner surface or the second inner surface and guides a finger of a user to allow the finger to be placed so that a side portion of the finger faces the first inner surface;
    an illuminating section provided in the first inner surface or the second inner surface so as to be adjacent to the finger guide section, the illuminating section being capable of radiating light that transmits through the placed finger;
    an imaging section provided in the hinge section and capable of imaging the light that has transmitted through the finger; and
    a control section that performs authentication of the user on the basis of an image obtained by the imaging.

16. The portable telephone according to claim 15, wherein:
    the first casing has a first display section provided in the first inner surface;

the second casing has an operating section provided in the second inner surface; and the finger guide section and the illuminating section are provided in the first inner surface so as to be opposed to the imaging section with the first display section therebetween.

17. The portable telephone according to claim 16, wherein:
in a state where the first casing is open, the control section controls the first display section to display information relating to a method of placing the finger and an authentication procedure.

18. The portable telephone according to claim 16, wherein:
the first display section has a liquid crystal panel, and a protective plate that covers the liquid crystal panel and whose end face is processed so as to be capable of shielding the light.

19. The portable telephone according to claim 16, wherein:
the first casing has a second display section provided in the first outer surface; and
the control section controls the second display section to display information relating to a method of placing the finger and an authentication procedure.

20. The portable telephone according to claim 15, wherein:
the first casing has a first display section provided in the first inner surface;
the second casing has an operating section provided in the second inner surface; and
the finger guide section and the illuminating section are provided in the second inner surface so as to be opposed to the imaging section with the operating section therebetween.

21. The portable telephone according to claim 20, wherein:
the imaging section is provided so as to be capable of pivotal movement in accordance with pivotal movement of the first or second casing.

22. The portable telephone according to claim 21, wherein:
the hinge section has a locking member for temporarily locking the pivotal movement in a state where the first casing is closed by a predetermined angle so that the first inner surface contacts the placed finger.

23. The portable telephone according to claim 21, wherein:
the first casing has a skirt section provided in each of side surfaces in a lateral direction of the first inner surface so as to project in a substantially perpendicular direction from the first inner surface.

24. The portable telephone according to claim 15, wherein:
the imaging section has a first filter that can transmit only the light of the predetermined wavelength.

25. The portable telephone according to claim 24, wherein:
the imaging section has a second filter that can absorb visible light.

26. The portable telephone according to claim 15, wherein:
the illuminating section has a lens that can adjust directivity of the radiated light.

27. The portable telephone according to claim 26, wherein:
the lens forms at least a part of the finger guide section.

28. A portable telephone comprising:
a first casing having a first inner surface having a first display section, and a first outer surface having a second display section and opposed to the first inner surface;
a second casing having a second inner surface having an operating section, and a second outer surface opposed to the second inner surface;
a hinge section that pivotably couples the first casing and the second casing to each other so that the first casing and the second casing can be folded open and closed in half;
a finger guide section that is provided in the first outer surface, and guides a finger of a user to allow the finger to be placed so that a side portion of the finger faces the first outer surface;
an illuminating section provided in the first outer surface so as to be adjacent to the finger guide section, the illuminating section being capable of radiating light that transmits through the placed finger;
an imaging section provided in the first outer surface so as to be opposed to the finger guide section and the illuminating section with the second display section therebetween and project from the first outer surface, the imaging section being capable of imaging the light that has transmitted through the finger; and
a control section that performs authentication of the user on the basis of an image obtained by the imaging, and controls the first display section to display information relating to a method of placing the finger and an authentication procedure.

29. A portable telephone comprising:
a first casing having a first front surface and a first back surface opposed to the first front surface;
a second casing having a second front surface and a second back surface opposed to the second front surface, the second casing being coupled to the first casing so as to be capable of sliding movement so that the first back surface and the second front surface face each other;
a finger guide section that is provided in the second front surface, and guides a finger of a user to allow the finger to be placed so that a side portion of the finger faces the second front surface;
an illuminating section provided in the second front surface so as to be adjacent to the finger guide section, the illuminating section being capable of radiating light of a predetermined wavelength that transmits through the placed finger;
an imaging section provided in a side surface between the first front surface and the first back surface in a direction of the sliding movement of the first casing, the imaging section being capable of imaging the light that has transmitted through the finger; and
a control section that performs authentication of the user on the basis of an image obtained by the imaging.

30. A portable telephone comprising:
a casing having a side surface;
an antenna section provided to the casing and can be projected from the side surface through sliding movement in a longitudinal direction, the antenna section having a first surface;
a finger guide section that is provided in the first surface of the antenna section, and guides a finger of a user to allow the finger to be placed so that a side portion of the finger faces the first surface;
an illuminating section provided in the first surface of the antenna section so as to be adjacent to the finger guide section, the illuminating section being capable of radiating light of a predetermined wavelength that transmits through the placed finger;
an imaging section provided in the side surface and capable of imaging the light that has transmitted through the finger; and
a control section that performs authentication of the user on the basis of an image obtained by the imaging.

31. A portable electronic device comprising:
a casing having a first surface;
a finger guide section that is provided in the first surface, and guides a finger of a user to allow the finger to be placed so that a side portion of the finger faces the first surface;
an illuminating section provided in the first surface so as to be adjacent to the finger guide section, the illuminating section being capable of radiating light of a predetermined wavelength that transmits through the placed finger;
an imaging section provided in the casing so as to be spaced at a predetermined distance from the first surface with respect to a perpendicular direction, the imaging section being capable of imaging the light that has transmitted through the finger; and
a control section that performs authentication of the user on the basis of an image obtained by the imaging.

* * * * *